(12) United States Patent
Yoeli

(10) Patent No.: US 7,806,362 B2
(45) Date of Patent: Oct. 5, 2010

(54) DUCTED FAN VTOL VEHICLES

(75) Inventor: Raphael Yoeli, Tel-Aviv (IL)

(73) Assignee: Urban Aeronautics Ltd., Yavne (IL)

( * ) Notice: Subject to any disclaimer, the term of this patent is extended or adjusted under 35 U.S.C. 154(b) by 517 days.

(21) Appl. No.: 11/794,906

(22) PCT Filed: Jan. 10, 2006

(86) PCT No.: PCT/IL2006/000032

§ 371 (c)(1),
(2), (4) Date: Oct. 17, 2007

(87) PCT Pub. No.: WO2006/072960

PCT Pub. Date: Jul. 13, 2006

(65) Prior Publication Data

US 2008/0283673 A1  Nov. 20, 2008

Related U.S. Application Data

(60) Provisional application No. 60/642,097, filed on Jan. 10, 2005.

(51) Int. Cl.
*B64C 29/04* (2006.01)
(52) U.S. Cl. .................... 244/23 A; 244/12.4
(58) Field of Classification Search .............. 244/12.1, 244/12.2, 12.5, 23 A, 23 C, 23 D
See application file for complete search history.

(56) References Cited

U.S. PATENT DOCUMENTS

| | | | |
|---|---|---|---|
| 1,287,076 A | 12/1918 | Moses | |
| 2,077,471 A | 4/1937 | Fink | |
| 2,138,999 A | 12/1938 | Clark | |
| 2,242,201 A | 5/1941 | Woods | |
| 2,273,724 A | 2/1942 | Nelson et al. | |
| D155,004 S | 8/1949 | Gluhareff | |
| 2,709,947 A | 6/1955 | Woods | |
| 2,734,705 A | 2/1956 | Robertson | |
| 2,777,649 A | 1/1957 | Williams | |
| 2,812,636 A | 11/1957 | Kadosch et al. | |
| 2,899,149 A | 8/1959 | Breguet | |

(Continued)

FOREIGN PATENT DOCUMENTS

EP    0 236583    9/1987

(Continued)

OTHER PUBLICATIONS

Corrected Written Opinion and Search Report of the International Searching Authority in International Application No. PCT/IL07/01475 (now WO 2008/065664 A2) (Yoeli) dated Jul. 27, 2009.

(Continued)

*Primary Examiner*—Timothy D Collins
(74) *Attorney, Agent, or Firm*—Nixon & Vanderhye, P.C.

(57) ABSTRACT

A vehicle including a fuselage having a longitudinal axis and a transverse axis, two Ducted Fan lift-producing propellers carried by the fuselage on each side of the transverse axis, and a body formed in the fuselage between the lift-producing propellers. Many variations are described enabling deflection and affection of flow streams and reduction of drag and momentum drag which improve speed and forward flight of the vehicle. Also described are unique features applicable in any single or multiple ducted fans and VTOL vehicles.

17 Claims, 45 Drawing Sheets

U.S. PATENT DOCUMENTS

| | | |
|---|---|---|
| 2,930,544 A | 3/1960 | Howell |
| 2,936,969 A | 5/1960 | Griffith et al. |
| 2,939,649 A | 6/1960 | Shaw |
| 2,951,661 A | 9/1960 | Dorman et al. |
| 2,955,780 A | 10/1960 | Hulbert |
| 2,968,453 A | 1/1961 | Bright |
| 2,973,921 A | 3/1961 | Price |
| 2,975,676 A | 3/1961 | Butler |
| 2,988,301 A | 6/1961 | Fletcher |
| 3,033,493 A | 5/1962 | Wilde et al. |
| 3,039,537 A | 6/1962 | Heidelberg |
| 3,082,977 A | 3/1963 | Arlin |
| 3,088,695 A | 5/1963 | Clark |
| 3,090,581 A | 5/1963 | Einarsson |
| 3,244,246 A | 7/1963 | Weiland |
| 3,116,898 A | 1/1964 | Clark et al. |
| 3,136,500 A | 6/1964 | Kerry |
| 3,139,244 A | 6/1964 | Bright |
| 3,161,374 A | 12/1964 | Allred et al. |
| 3,289,977 A | 1/1965 | Staats |
| 3,174,573 A | 3/1965 | Chaplin |
| 3,179,353 A | 4/1965 | Peterson |
| 3,179,354 A | 4/1965 | Alvarez-Calderon |
| 3,181,810 A | 5/1965 | Olson |
| 3,184,183 A | 5/1965 | Piasecki |
| 3,187,817 A | 6/1965 | Colley |
| 3,198,082 A | 8/1965 | Kerris |
| 3,201,067 A | 8/1965 | Meyerhoff |
| 3,203,645 A | 8/1965 | Shaw |
| 3,223,354 A | 12/1965 | Seibold et al. |
| 3,224,712 A | 12/1965 | Taylor et al. |
| 3,231,221 A | 1/1966 | Platt |
| 3,262,511 A | 7/1966 | Carr |
| 3,262,657 A | 7/1966 | Anker-Holth |
| 3,265,329 A | 8/1966 | Postelson-Apostolescu |
| 3,276,528 A | 10/1966 | Tucknott et al. |
| 3,383,074 A | 5/1968 | Coplin |
| 3,384,327 A | 5/1968 | Postelson-Apostolesc |
| 3,397,852 A | 8/1968 | Katzen |
| 3,397,854 A | 8/1968 | Reyle |
| 3,454,238 A | 7/1969 | Goodson |
| 3,463,420 A | 8/1969 | Butler et al. |
| 3,481,559 A | 12/1969 | Apostolescu |
| 3,519,224 A | 7/1970 | Boyd et al. |
| 3,559,921 A | 2/1971 | Timperman |
| 3,580,530 A | 5/1971 | Wada |
| 3,584,810 A | 6/1971 | Velton |
| 3,606,208 A | 9/1971 | Postelson-Apostolescu |
| 3,614,030 A | 10/1971 | Moller |
| 3,627,235 A | 12/1971 | Lippisch |
| 3,665,809 A | 5/1972 | Walker et al. |
| 3,752,417 A | 8/1973 | Lagace |
| 3,827,527 A | 8/1974 | Bertelsen |
| 3,873,049 A | 3/1975 | Horsdal |
| 3,904,155 A | 9/1975 | Chavis |
| 3,912,201 A | 10/1975 | Bradbury |
| 3,955,780 A | 5/1976 | Postelson |
| 3,972,490 A | 8/1976 | Zimmermann et al. |
| 4,022,405 A | 5/1977 | Peterson |
| 4,043,421 A | 8/1977 | Smith |
| 4,149,688 A | 4/1979 | Miller, Jr. |
| 4,194,707 A | 3/1980 | Sharpe |
| 4,469,294 A | 9/1984 | Clifton |
| 4,505,442 A | 3/1985 | Kirsch et al. |
| 4,505,443 A | 3/1985 | Bradfield et al. |
| 4,537,372 A | 8/1985 | Forizs |
| 4,598,890 A | 7/1986 | Herzog et al. |
| 4,701,602 A | 10/1987 | Schaefer et al. |
| 4,754,940 A | 7/1988 | Deter |
| 4,757,962 A | 7/1988 | Grant |
| 4,765,568 A | 8/1988 | Carl et al. |
| 4,795,111 A | 1/1989 | Moller |
| 4,796,836 A | 1/1989 | Buchelt |
| 4,824,048 A | 4/1989 | Kim |
| 4,834,319 A | 5/1989 | Ewy et al. |
| 4,856,732 A | 8/1989 | Eickmann |
| 4,880,071 A | 11/1989 | Tracy |
| 4,892,274 A | 1/1990 | Pohl et al. |
| 4,934,629 A | 6/1990 | Brant |
| 5,064,143 A | 11/1991 | Bucher |
| 5,101,927 A | 4/1992 | Murtuza |
| 5,297,761 A | 3/1994 | Kendall, Jr. et al. |
| 5,419,514 A | 5/1995 | Ducan |
| 5,454,531 A | 10/1995 | Melkuti |
| 5,505,407 A | 4/1996 | Chiappetta et al. |
| 5,666,483 A | 9/1997 | McClary |
| 5,738,302 A | 4/1998 | Freeland |
| 5,746,390 A | 5/1998 | Chiappetta et al. |
| 5,806,805 A | 9/1998 | Elbert et al. |
| 5,890,441 A | 4/1999 | Swinson et al. |
| 6,089,501 A | 7/2000 | Frost |
| 6,105,901 A | 8/2000 | Ulanoski et al. |
| 6,119,985 A | 9/2000 | Clapp et al. |
| 6,170,778 B1 | 1/2001 | Cycon et al. |
| 6,254,032 B1 | 7/2001 | Bucher |
| 6,270,038 B1 | 8/2001 | Cycon et al. |
| 6,318,668 B1 | 11/2001 | Ulanoski et al. |
| 6,371,406 B1 | 4/2002 | Corcoran |
| 6,382,559 B1 | 5/2002 | Sutterfield et al. |
| 6,431,494 B1 | 8/2002 | Kinkead et al. |
| 6,446,911 B1 | 9/2002 | Yount et al. |
| 6,457,670 B1 | 10/2002 | Geranio |
| 6,464,166 B1 | 10/2002 | Yoeli |
| 6,474,598 B2 | 11/2002 | Carter, Jr. |
| 6,520,449 B2 | 2/2003 | Illingworth |
| 6,568,630 B2 | 5/2003 | Yoeli |
| 6,616,094 B2 | 9/2003 | Illingworth |
| 6,644,598 B2 | 11/2003 | Glezer et al. |
| 6,704,624 B2 | 3/2004 | Ortega et al. |
| 6,708,920 B2 | 3/2004 | Fukuyama |
| 6,745,977 B1 | 6/2004 | Long et al. |
| 6,751,530 B2 | 6/2004 | Seifert et al. |
| D496,606 S | 9/2004 | Sanders, Jr. |
| 6,808,140 B2 | 10/2004 | Moller |
| 6,817,570 B2 | 11/2004 | Yoeli |
| 6,824,095 B2 | 11/2004 | Mao |
| 6,834,832 B2 | 12/2004 | Jamgarov |
| 6,843,447 B2 | 1/2005 | Morgan |
| 6,883,748 B2 | 4/2005 | Yoeli |
| 6,886,776 B2 | 5/2005 | Wagner et al. |
| 6,892,979 B2 | 5/2005 | Milde |
| 6,892,980 B2 | 5/2005 | Kawai |
| 6,913,226 B2 | 7/2005 | Huynh |
| 6,926,322 B2 | 8/2005 | Browne et al. |
| 6,974,105 B2 | 12/2005 | Pham |
| 7,246,769 B2 | 7/2007 | Yoeli |
| 7,249,732 B2 | 7/2007 | Sanders, Jr. et al. |
| 7,267,300 B2 | 9/2007 | Heath et al. |
| 7,275,712 B2 | 10/2007 | Yoeli |
| 7,717,368 B2 | 5/2010 | Yoeli |
| 2002/0161488 A1 | 10/2002 | Guillemin et al. |
| 2003/0038213 A1 | 2/2003 | Yoeli |
| 2003/0062442 A1 | 4/2003 | Milde, Jr. |
| 2003/0062443 A1 | 4/2003 | Wagner et al. |
| 2003/0085319 A1 | 5/2003 | Wagner et al. |
| 2003/0127559 A1 | 7/2003 | Walmsley |
| 2003/0195673 A1 | 10/2003 | Foch et al. |
| 2004/0026563 A1 | 2/2004 | Moller |
| 2004/0104303 A1 | 6/2004 | Mao |
| 2004/0149857 A1 | 8/2004 | Yoeli |
| 2004/0155143 A1 | 8/2004 | Yoeli |
| 2005/0029407 A1 | 2/2005 | Pohl et al. |
| 2005/0040283 A1 | 2/2005 | Frazer |
| 2005/0065669 A1 | 3/2005 | Roux et al. |

| | | |
|---|---|---|
| 2005/0178881 A1 | 8/2005 | Yoeli |
| 2005/0242231 A1 | 11/2005 | Yoeli |
| 2006/0113426 A1 | 6/2006 | Yoeli |
| 2006/0231675 A1 | 10/2006 | Bostan |
| 2007/0034734 A1 | 2/2007 | Yoeli |
| 2007/0034739 A1 | 2/2007 | Yoeli |
| 2007/0095971 A1 | 5/2007 | Yoeli |
| 2007/0158494 A1 | 7/2007 | Burrage |
| 2008/0054121 A1 | 3/2008 | Yoeli |
| 2008/0142643 A1 | 6/2008 | Yoeli |
| 2009/0084907 A1 | 4/2009 | Yoeli |
| 2009/0140102 A1 | 6/2009 | Yoeli |
| 2009/0159757 A1 | 6/2009 | Yoeli |
| 2010/0051740 A1 | 3/2010 | Yoeli |
| 2010/0051753 A1 | 3/2010 | Yoeli |
| 2010/0076625 A1 | 3/2010 | Yoeli |

FOREIGN PATENT DOCUMENTS

| | | |
|---|---|---|
| EP | 0 922925 | 6/1999 |
| GB | 935884 A | 9/1963 |
| GB | 951186 A | 3/1964 |
| IT | 666076 | 8/1964 |
| IT | 666076 A | 8/1964 |
| SE | 184314 | 6/1963 |
| WO | WO 01/93039 A1 | 12/2001 |
| WO | WO 02/096750 A2 | 12/2002 |
| WO | WO 02/098732 A2 | 12/2002 |
| WO | WO 03/016134 A1 | 2/2003 |
| WO | WO 2004/012993 A1 | 2/2004 |
| WO | WO 2004/031876 A1 | 4/2004 |
| WO | WO 2005/039972 A2 | 5/2005 |
| WO | WO 2006/072960 A2 | 7/2006 |
| WO | WO 2006/131920 | 12/2006 |
| WO | WO 2007/052271 A2 | 5/2007 |
| WO | WO 2007/099543 A2 | 9/2007 |
| WO | WO 2007/129313 A2 | 11/2007 |
| WO | WO 2008/065654 A2 | 6/2008 |
| WO | WO 2008/065664 A2 | 6/2008 |
| WO | 2008/135973 A2 | 11/2008 |
| WO | WO 2009/077968 A2 | 6/2009 |
| WO | 2009/147630 A1 | 12/2009 |
| WO | 2010/026517 A2 | 3/2010 |

OTHER PUBLICATIONS

Written Opinion and International Search Report of the International Searching Authority in International Application No. PCT/IB08/055301 (now WO 2009/077968) (Yoeli) dated Aug. 14, 2009.
Written Opinion and International Search Report of the International Searching Authority in International Application No. PCT/IB09/052346 (Yoeli) dated Oct. 20, 2009.
U.S. Appl. No. 12/549,872 (Yoeli) filed Aug. 28, 2009.
U.S. Appl. No. 12/598,514 (Yoeli) filed Nov. 2, 2009.
U.S. Appl. No. 12/224,549 (Yoelij filed Nov. 4, 2008.
U.S. Appl. No. 12/226,952 (Yoeli) filed Feb. 27, 2009.
Written Opinion and Search Report of the International Searching Authority in International Application No. PCT/IL07/00271 (now WO 2007/099543 A2) (Yoeli) dated Oct. 28, 2008.
Written Opinion and Search Report of the International Searching Authority in International Application No. PCT/IL07/01475 (now WO 2008/065664 A2) (Yoeli) dated Sep. 2, 2008.
U.S. Appl. No. 12/516,257 (Yoeli) filed May 26, 2009.
U.S. Appl. No. 12/516,743 (Yoeli) filed May 28, 2009.
De Lorean DMC-12, alleged to have first been produced in 1981 (images available from Wikipedia, the free encyclopedia, at http://en.wikipedia.org/wiki/De_Lorean_DMC-12).
International Search Report for International Application No. PCT/IL06/01264 (now WO 2007/052271 A2) (Yoeli) dated Aug. 5, 2008.
Written Opinion of the International Searching Authority in International Application No. PCT/IL06/01264 (now WO 2007/052271 A2) (Yoeli) dated Aug. 5, 2008.
International Search Report for International Application No. PCT/IL07/00544 (now WO 2007/129313) (Yoeli) dated Jul. 7, 2008.
Written Opinion of the International Searching Authority in International Application No. PCT/IL07/00544 (now WO 2007/129313) (Yoeli) dated Jul. 7, 2008.
Co-Pending U.S. Appl. No. 11/798,187 (Yoeli) filed at the U.S. Patent Office May 10, 2007.
Co-Pending U.S. Appl. No. 11/826,202 (Yoeli) filed at the U.S. Patent Office Jul. 12, 2007.
Co-Pending U.S. Appl. No. 11/892,414 (Yoeli) filed at the U.S. Patent Office Aug. 22, 2007.
Edward D. Flinn, "Revolutionary X-Hawk Hovers Near Success," Aerospace America, Jul. 2003, pp. 26-28.
Raymond L. Robb, "Driving on Air: $20^{th}$ Century Flying Carpets," VERTIFLITE, vol. 51, No. 1, Spring 2005, pp. 2-11.
Urban Aeronautics Ltd., "The X-Hawk VTOL Utility Vehicle"—product description and specifications, 2004.
Piasecki Aircraft Corporation Product Description and History for Piasecki VZ-8 VTOL research vehicle (undated).
International Search Report for International Application No. PCT/IL02/00417 (now WO 02/096750 (Yoeli)), dated May 23, 2003, published Oct. 2, 2003.
Written Opinion in International Application No. PCT/IL02/00417 (now WO 02/096750 (Yoeli)), Aug. 19, 2003.
International Preliminary Examination Report for International Application No. PCT/IL02/00417 (now WO 02/096750 (Yoeli)), Oct. 20, 2003.
Corrected International Preliminary Examination Report for International Application No. PCT/IL02/00417 (now WO 02/096750 (Yoeli)), Jul. 25, 2004.
International Search Report for International Application No. PCT/IL02/000439 (now WO 2002/098732 (Yoeli)), dated Apr. 28, 2003, published Mar. 18, 2004.
International Preliminary Examination Report in International Application No. PCT/IL02/000439 (now WO 2002/098732 (Yoeli)), Jul. 26, 2004.
International Search Report for International Application No. PCT/IL02/00682 (now WO 03/016134 (Yoeli)), dated Dec. 6, 2002.
International Search Report for International Application No. PCT/IL03/00640 (now WO 2004/012993 (Yoeli)), dated Jan. 2, 2004.
International Search Report for International Application No. PCT/IL03/00786 (now WO 2004/031876 (Yoeli)), Feb. 9, 2004.
International Search Report for International Application No. PCT/IL04/00984 (now WO 2005/039972 (Yoeli)), dated Dec. 6, 2005, published Jan. 26, 2006.
Written Opinion of the International Searching Authority in International Application No. PCT/IL04/00984 (now WO 2005/039972 (Yoeli)), dated Dec. 6, 2005.
International Preliminary Report on Patentability in International Application No. PCT/IL04/00984 (now WO 2005/039972 (Yoeli)), dated May 1, 2006.
U.S. Appl. No. 10/987,321 (Yoeli) filed Nov. 15, 2004.
U.S. Appl. No. 10/523,609 (Yoeli) filed Feb. 7, 2005 (International Application date Aug. 5, 2003).
U.S. Appl. No. 11/061,652 (Yoeli) filed Feb. 22, 2005.
U.S. Appl. No. 11/447,311 (Yoeli) filed Jun. 6, 2006.
U.S. Appl. No. 11/405,003 (Yoeli) filed Apr. 17, 2006.
U.S. Appl. No. 11/411,243 (Yoeli) filed Apr. 26, 2006.
International Search Report for PCT/IL2006/000032 mailed Sep. 11, 2006.
Written Opinion for PCT/IL2006/000032 mailed Sep. 11, 2006 (3 pages).
International Search Report for PCT/IL06/00663 (Yoeli) dated Dec. 19, 2006.
Written Opinion for PCT/IL06/00663 (Yoeli) dated Dec. 19, 2006.
English Abstract of Italian Patent No. 666076, dated Aug. 1964.
International Search Report for International Application No. PCT/IL0701465 (now WO 2008/065654) (Yoeli) dated Sep. 30, 2008.
Written Opinion of the International Searching Authority in International Application No, PCT/IL0701465 (now WO 2008/065654) (Yoeli) dated Sep. 30, 2008.
International Search Report for International Application No. PCT/IL08/00575 (now WO 2008/135973) (Yoeli) dated Oct. 28, 2008.

Written Opinion of the International Searching Authority in International Application No, PCT/IL08/00575 (now WO 2008/135973) (Yoeli) dated Oct. 28, 2008.

Written Opinion and International Search Report of the International Searching Authority in International Application No. PCT/IB09/053768 (Yoeli) (now WO 2010-026517 A2) dated Mar. 3, 2010.

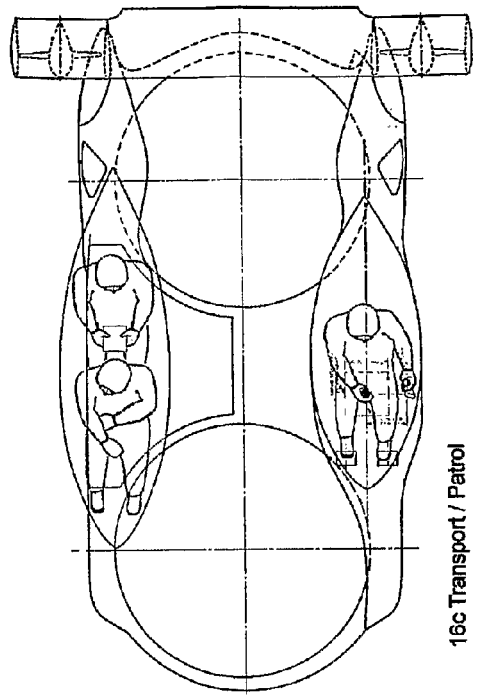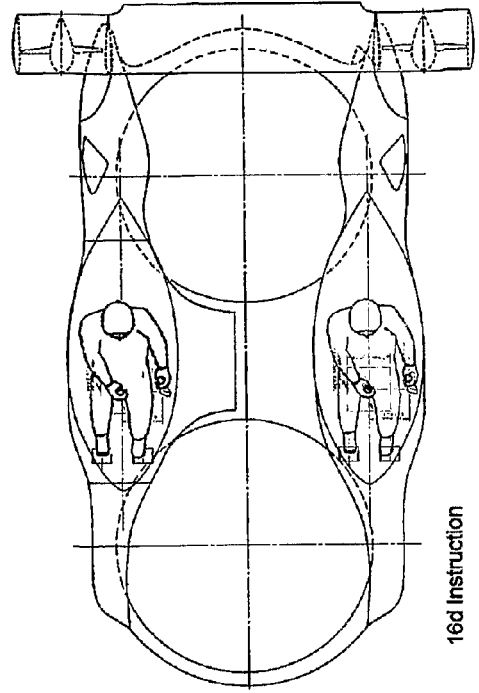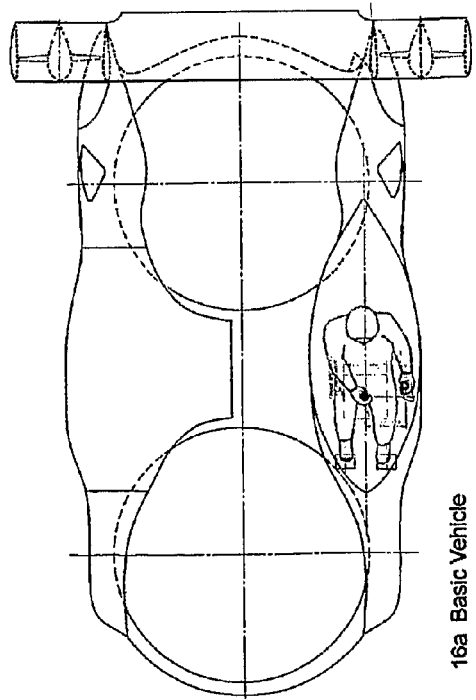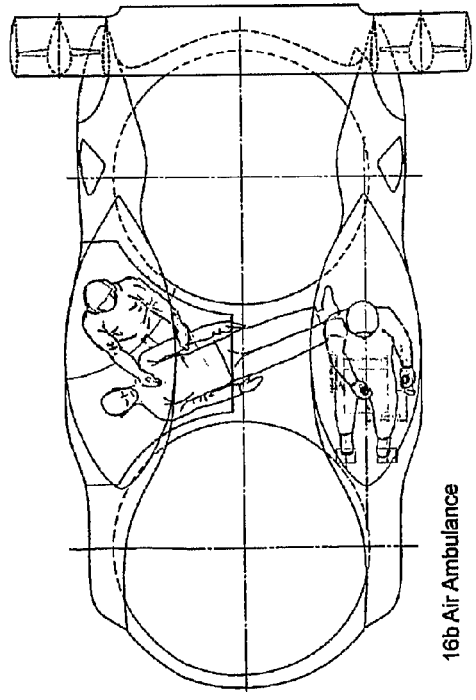
Fig. 16

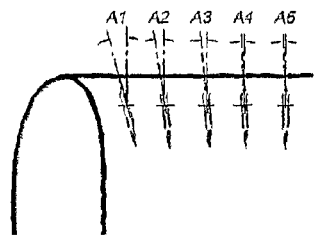
Detail A
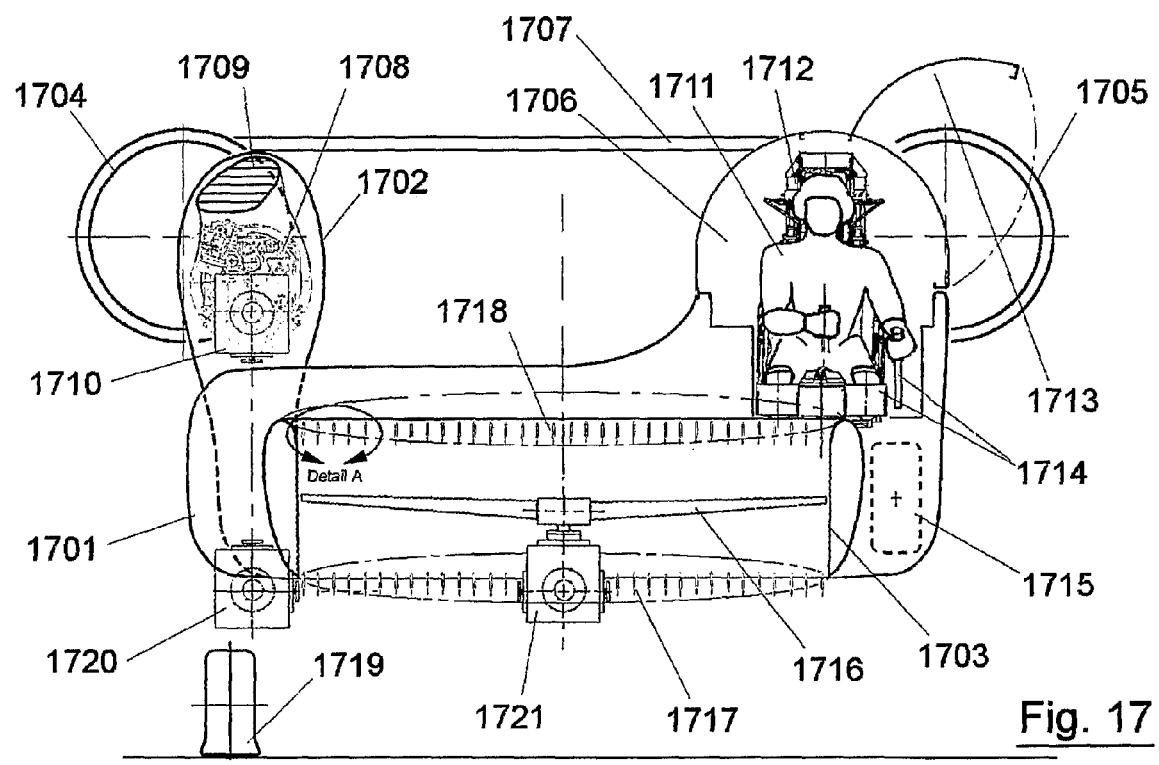
Fig. 17

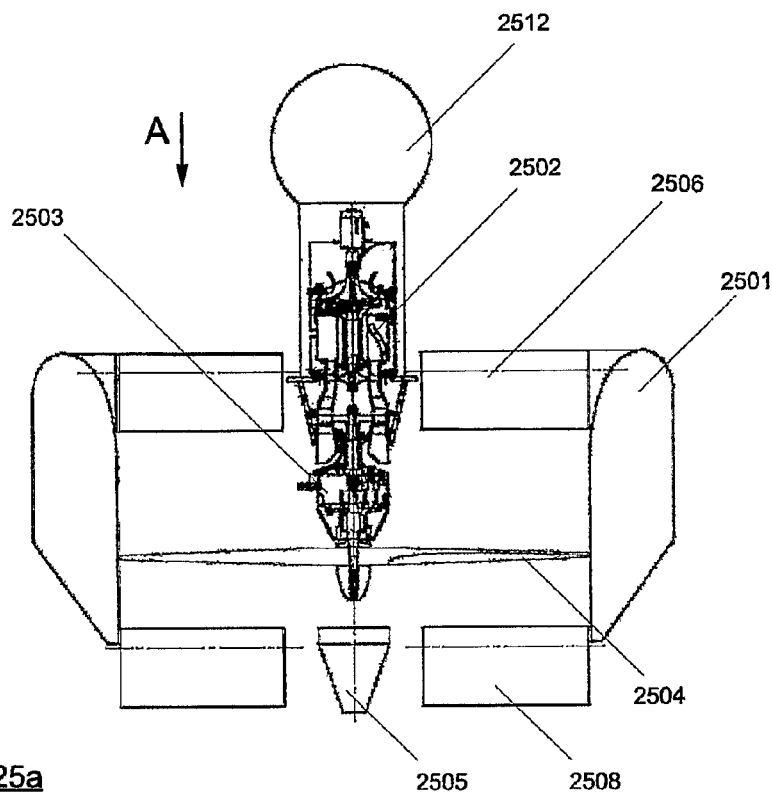
Fig. 25a
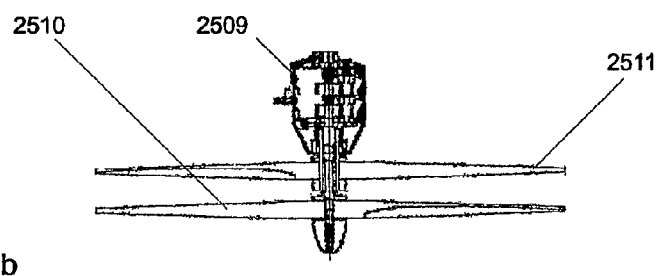
Fig. 25b
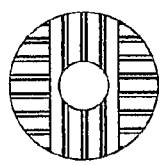
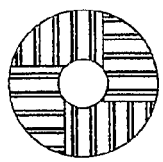
 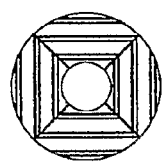 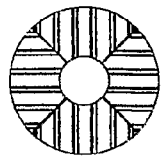
Fig. 25c

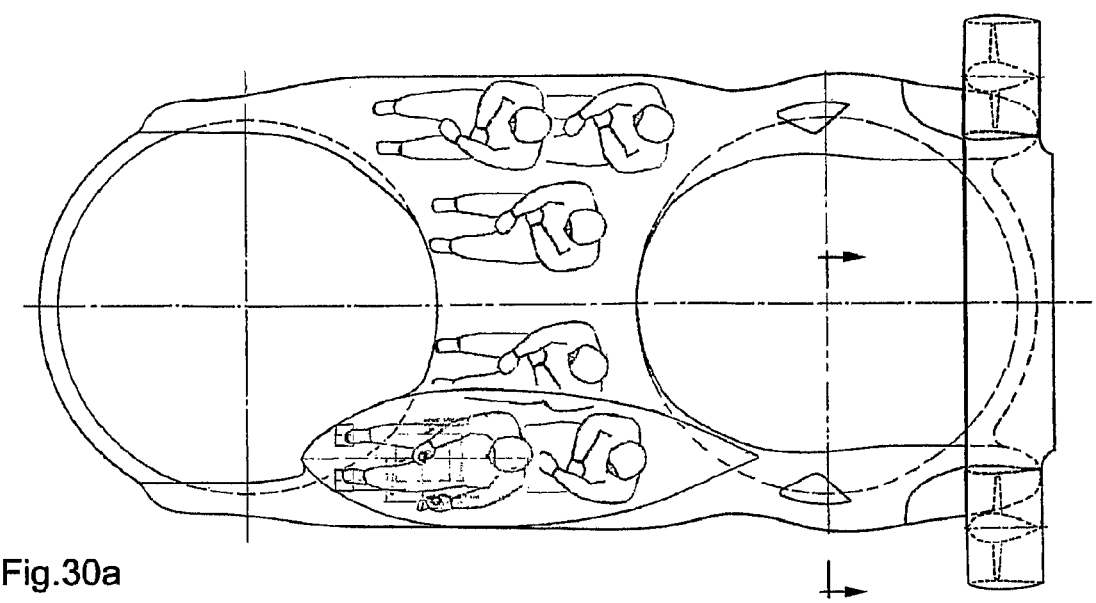
Fig.30a
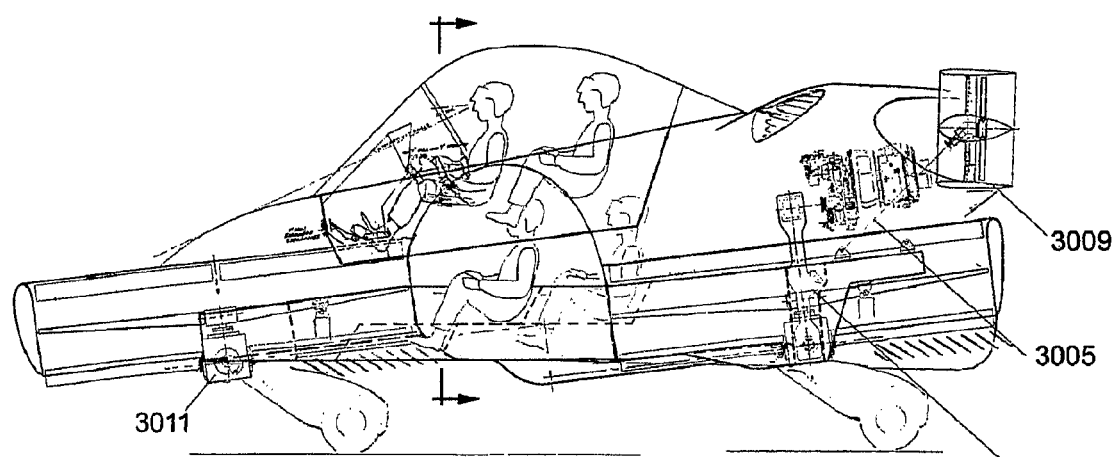
Fig.30b
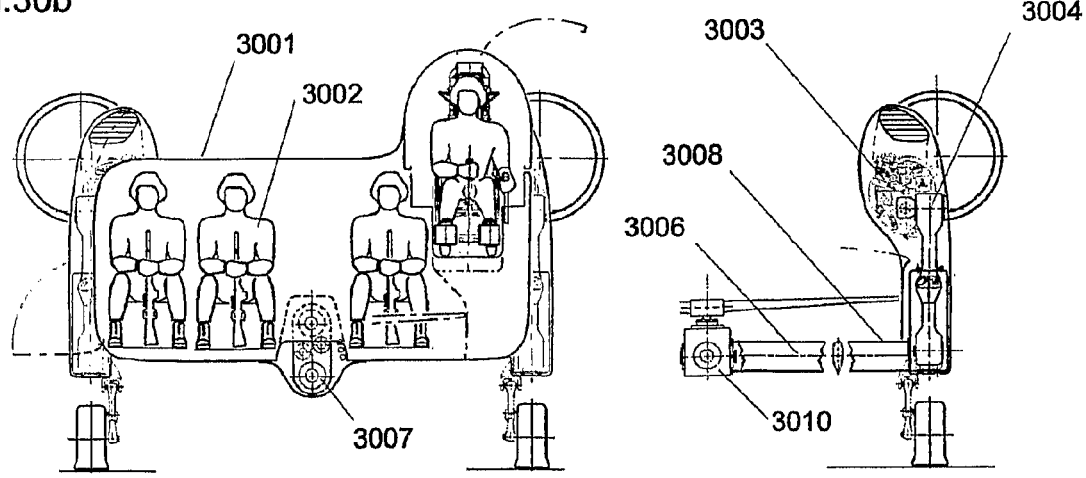
Fig.30c
Fig.30d

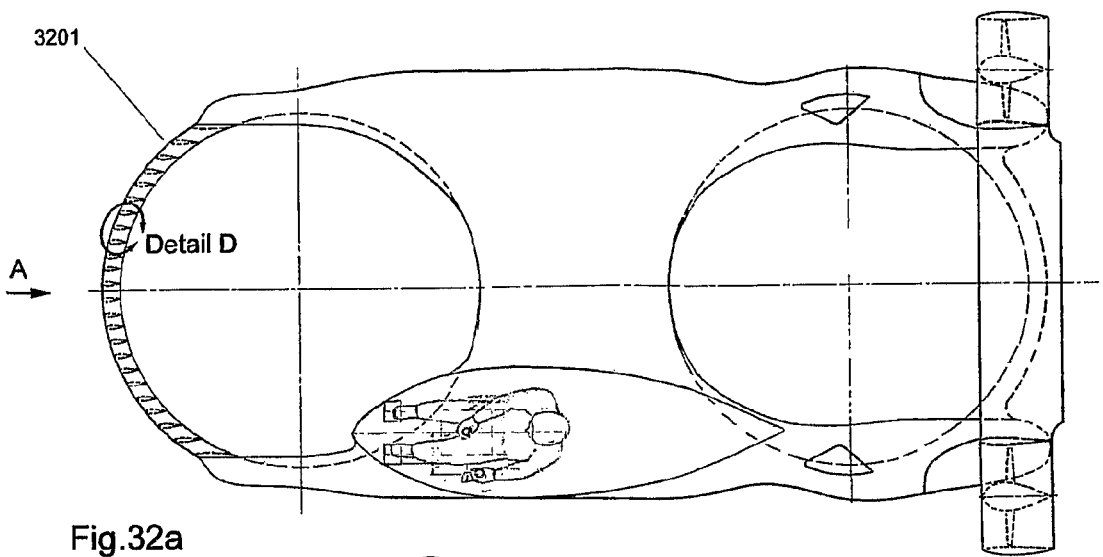
Fig.32a
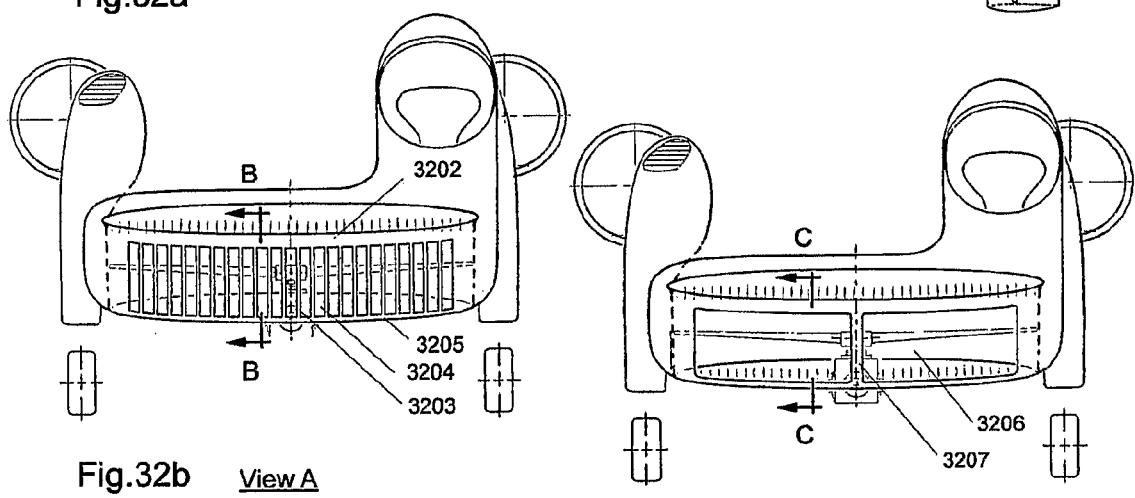
Fig.32b  View A
Fig.32c  View A (optional)
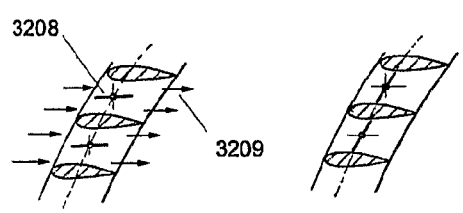
Fig.32d   Fig.32e
Detail D
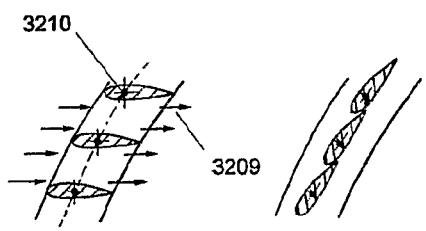
Fig.32f   Fig.32g
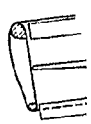
B-B
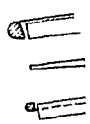
C-C

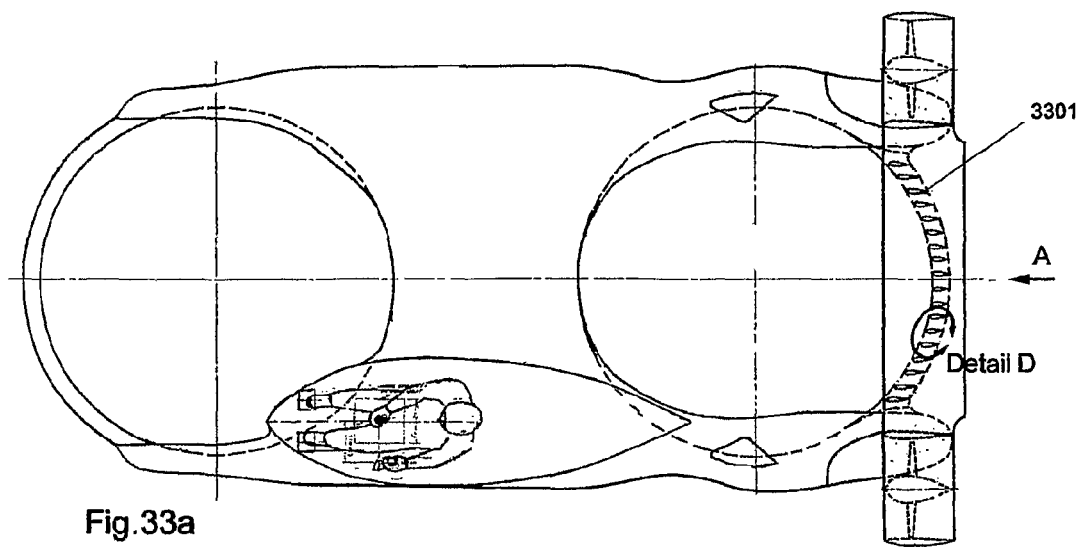
Fig.33a
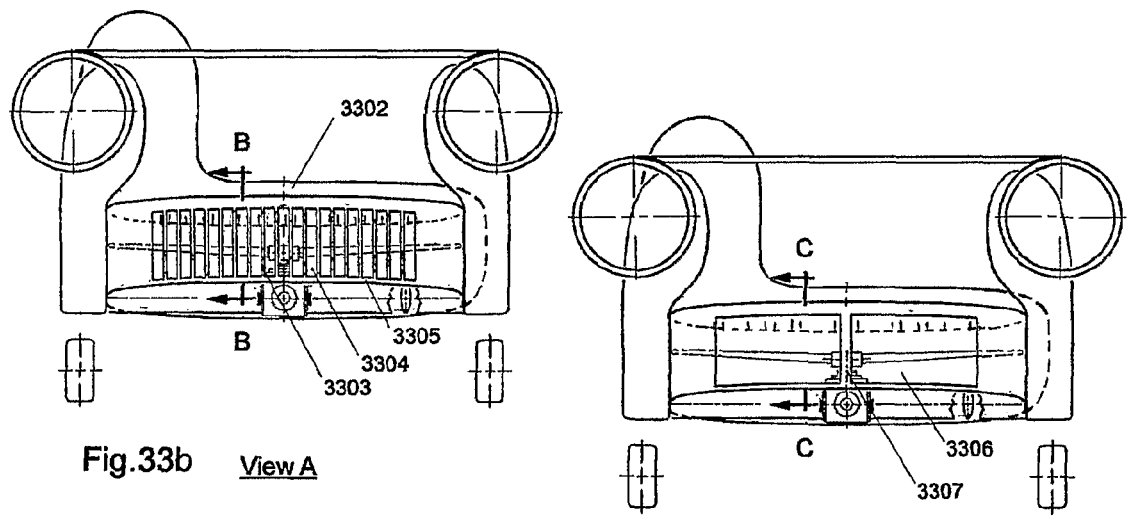
Fig.33b View A
Fig.33c View A (optional)
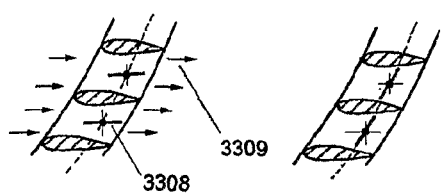
Fig.33d   Fig.33e
Detail D
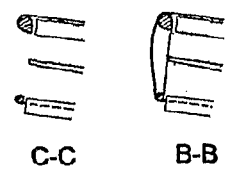
C-C   B-B
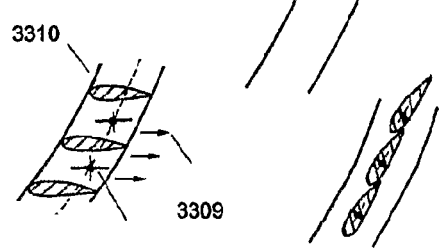
Fig.33f
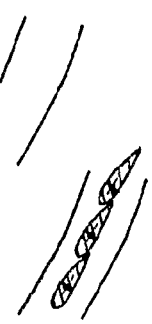
Fig.33g

Section A-A

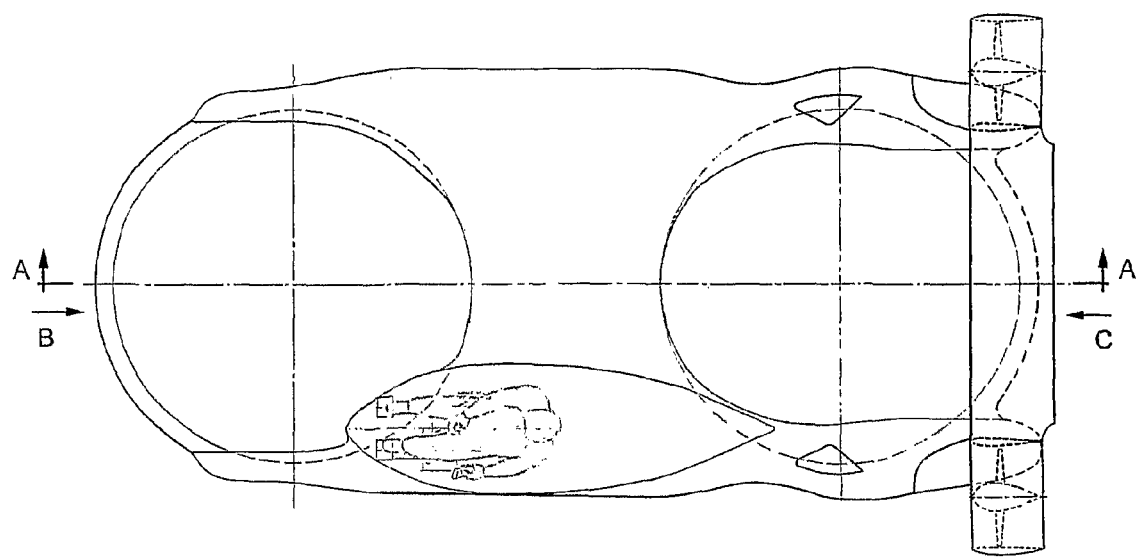
Fig.35a
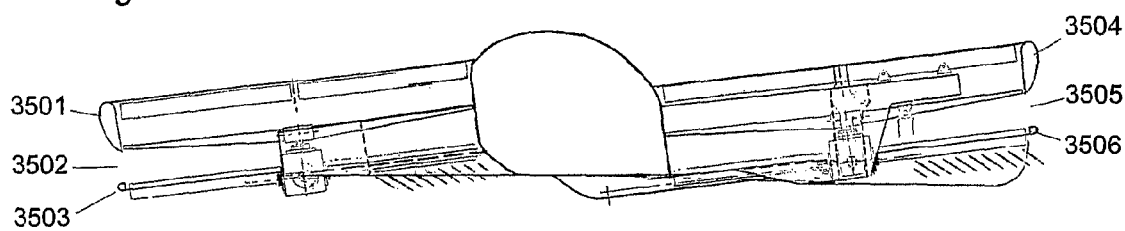
Section A-A
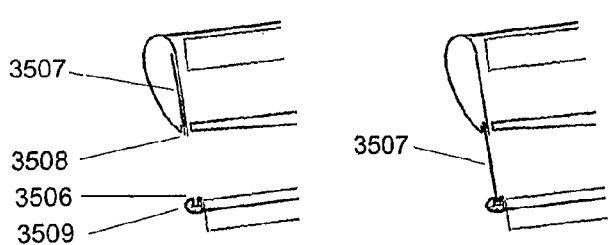
Fig.35b    Fig.35c
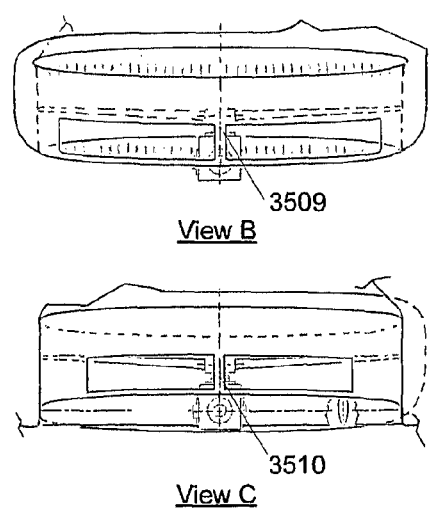
View B
View C Section A-A Section C-C Section B-B View B

DUCTED FAN VTOL VEHICLES

CROSS-REFERENCE TO RELATED APPLICATIONS

The present application is the US national phase of international application PCT/IL2006/000032, filed 10 Jan. 2006, which designated and U.S. and claims priority from U.S. Provisional Patent Application No. 60/642,097, filed Jan. 10, 2005, the entire contents of each of which is incorporated herein by reference in its entirety.

FIELD AND BACKGROUND OF THE INVENTION

The present invention relates to vehicles, and particularly to Vertical Take-Off and Landing (VTOL) vehicles having multi-function capabilities.

VTOL vehicles rely on direct thrust from propellers or rotors, directed downwardly, for obtaining lift necessary to support the vehicle in the air. Many different types of VTOL vehicles have been proposed where the weight of the vehicle in hover is carried directly by rotors or propellers, with the axis of rotation perpendicular to the ground. One well known vehicle of this type is the conventional helicopter which includes a large rotor mounted above the vehicle fuselage. Other types of vehicles rely on a multitude of propellers that are either exposed (e.g., unducted fans), or installed inside circular cavities, shrouds, ducts or other types of nacelle (e.g., ducted fans), where the flow of air takes place inside ducts. Some VTOL vehicles (such as the V-22) use propellers having their axes of rotation fully rotatable (up to 90 degrees or so) with respect to the body of the vehicle; these vehicles normally have the propeller axis perpendicular to the ground for vertical takeoff and landing, and then tilt the propeller axis forward for normal flight. Other vehicles use propellers having nearly horizontal axes, but include aerodynamic deflectors installed behind the propeller which deflect all or part of the flow downwardly to create direct upward lift.

A number of VTOL vehicles have been proposed in the past where two or four propellers, usually mounted inside ducts (i.e., ducted fans), were placed forwardly of, and rearwardly of, the main payload of the vehicle. One typical example is the Piasecki VZ-8 'Flying Jeep' which had two large ducts, with the pilots located to the sides of the vehicle, in the central area between the ducts. A similar configuration was used on the Chrysler VZ-6 and on the CityHawk flying car. Also the Bensen 'Flying Bench' uses a similar arrangement. The Curtiss Wright VZ-7 and the Moller Skycar use four, instead of two, thrusters where two are located on each side (forward and rear) of the pilots and the payload, the latter being of fixed nature at the center of the vehicle, close to the vehicle's center of gravity.

The foregoing existing vehicles are generally designed for specific functions and are therefore not conveniently capable of performing a multiplicity of functions.

SUMMARY OF THE INVENTION

In one aspect of the present invention a vehicle is provided of a relatively simple inexpensive construction and yet capable of performing a multiplicity of different functions.

In another aspect of the present invention, there is provided a vehicle, comprising: a fuselage having a longitudinal axis and a transverse axis; at least one lift-producing propeller carried by the fuselage on each side of the transverse axis; a pilot's compartment formed in the fuselage between the lift-producing propellers and substantially aligned with the longitudinal axis; and a pair of payload bays formed in the fuselage between the lift-producing propellers and on opposite sides of the pilot's compartment.

In another aspect of the present invention each of the payload bays includes a cover deployable to an open position providing access to the payload bay, and to a closed position covering the payload bay. In some described preferred embodiments, the cover of each of the payload bays is pivotally mounted to the fuselage along an axis parallel to the longitudinal axis of the fuselage at the bottom of the respective payload bay, such that when the cover is pivoted to the open position it also serves as a support for supporting the payload or a part thereof in the respective payload bay.

In another aspect of the present invention the lift propellers are ducted or unducted fans, and wherein the fuselage carries a pair of the lift producing propellers on each side of the transverse axis, a vertical stabilizer at the rear end of the fuselage, or a horizontal stabilizer at the rear end of the fuselage.

In another aspect of the present invention the fuselage further carries a pair of pusher propellers at the rear end of the fuselage, on opposite sides of the longitudinal axis. In the described embodiments, the fuselage carries two engines, each for driving one of the lift-producing propellers and pusher propellers with the two engines being mechanically coupled together in a common transmission. In one described preferred embodiment, the two engines are located in engine compartments in pylons formed in the fuselage on opposite sides of its longitudinal axis. In another described embodiment, the two engines are located in a common engine compartment aligned with the longitudinal axis of the fuselage and underlying the pilot's compartment.

In another aspect of the present invention the vehicle is a vertical take-off and landing (VTOL) vehicle and includes a pair of stub wings each pivotally mounted under one of the payload bays to a retracted, stored position, and to an extended, deployed position for enhancing lift. Another embodiment is described wherein the vehicle includes a flexible skirt extending below the fuselage enabling the vehicle to be used as, or converted to, a hovercraft for movement over ground or water. A further embodiment is described wherein the vehicle includes large wheels attachable to the rear end of the fuselage for converting the vehicle to an all terrain vehicle (ATV).

As will be described more particularly below, a vehicle constructed in accordance with the foregoing aspects may be of a relatively simple and inexpensive construction capable of conveniently performing a host of different functions besides the normal functions of a VTOL vehicle. Thus, the foregoing aspects enable the vehicle to be constructed as a utility vehicle for a large array of tasks including serving as a weapons platform; transporting personnel, weapons, and/or cargo; evacuating medically wounded, etc., without requiring major changes in the basic structure of the vehicle when transferring from one task to another.

In another aspect of the present invention an alternative vehicle arrangement is described wherein the vehicle is relatively small in size, having insufficient room for installing a cockpit in the middle of the vehicle and where the pilot's cockpit is therefore installed to one side of the vehicle, thereby creating a large, single payload bay in the remaining area between the two lift-producing propellers.

In another aspect of the present invention an alternative vehicle arrangement is described wherein the vehicle does not aspect any form of pilot's enclosure, for use in an unmanned role, piloted by suitable on-board electronic computers or being remotely controlled from the ground.

In another aspect of the present invention a ducted fan vehicle is provided including a forward duct and an aft duct disposed in a fuselage and defining a center body between the ducts, at least two lift-producing propellers, each disposed in one of the ducts, and means for causing an air flow portion close to the center body inside the aft duct to separate from the center body.

In another aspect of the present invention the means includes at least one slot formed in a forward-facing wall of the aft duct.

In another aspect of the present invention the vehicle further includes a plurality of the slots arranged circumferentially along the forward-facing wall of the aft duct.

In another aspect of the present invention the means is operative to cause the air flow inside the aft duct to exit the duct at a direction that is generally similar to the direction it had prior to contacting the vehicle's surface.

In another aspect of the present invention the means includes means for introducing air flow into any of the ducts.

In another aspect of the present invention the means for introducing air flow is a turbine engine compressor of the vehicle.

In another aspect of the present invention the means for introducing air flow is either of an air pump and a compressor.

In another aspect of the present invention the means for introducing air flow is at least one air scoop connected to any of the ducts.

In another aspect of the present invention the slots are located between the plane of the lift-producing propellers and the exit from the duct.

In another aspect of the present invention the slots are located between the plane of the lift-producing propellers and the exit from the duct.

In another aspect of the present invention the means for introducing air flow is at least one air scoop connected to any of the ducts and where any of the air scoops, ducts and slots employ varying cross sectional areas such as to cause related air flow to accelerate and exit at higher velocity through the slots than the free stream velocity of the air when entering through the scoops.

In another aspect of the present invention an aperture is formed in a rearward-facing wall of the aft duct.

In another aspect of the present invention an aperture is formed in a forward-facing wall of the forward duct.

In another aspect of the present invention a first aperture is formed in a rearward-facing wall of the aft duct, and a second aperture is formed in a forward-facing wall of the forward duct.

In another aspect of the present invention the bottom of the fuselage is sufficiently curved to reduce the momentum drag of the vehicle.

In another aspect of the present invention the vehicle further includes a curved cutout employed by the lower forward facing body section of the vehicle and configured to affect air flow thereat to assume a general direction that is similar to the direction it had prior to contacting the vehicle's surface.

In another aspect of the present invention a ducted fan is provided including a hollow duct, at least one lift-producing propeller disposed in the duct, where at least one aperture is formed in a wall of the duct allowing air to flow between the interior of the duct and the exterior of the duct, and a curved barrier operative to slide inside the wall between an opened and a closed position thereby controlling the amount of airflow through the aperture.

In another aspect of the present invention the slot is selectably variable in either of geometry and position.

Further features and advantages of the invention will be apparent from the description below. Some of those describe unique features applicable in any single or multiple ducted fan and VTOL vehicles.

BRIEF DESCRIPTION OF THE DRAWINGS

The invention is herein described, by way of example only, with reference to the accompanying drawings, wherein:

FIGS. 16a-16d show top views of the vehicle of FIGS. 14a-14e with several payload arrangements;

FIG. 17 is a see-through front view of the vehicle of FIG. 16a showing various additional features and internal arrangement details of the vehicle;

FIGS. 25a-25c show schematic cross sections and design details of an optional single duct Unmanned vehicle;

FIGS. 30a-d show a vehicle generally similar to that shown in FIG. 18, however having alternative internal arrangements for various elements including cabin arrangement geometry to enable carriage of 5 passengers or combatants;

FIGS. 32a-g illustrate means for enabling the external airflow to penetrate the walls of the forward ducted fan of the vehicles described in FIGS. 1-21 and FIGS. 30-31 while in forward flight, for the purpose of minimizing the momentum drag of the vehicle;

FIGS. 33a-g illustrate means for enabling the internal airflow to exit through the walls of the aft ducted fan of the vehicles described in FIGS. 1-21 and FIGS. 30-31, while in forward flight, for the purpose of minimizing the momentum drag of the vehicle;

FIGS. 35a-c illustrate additional optional means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle.

It is to be understood that the foregoing drawings, and the description below, are provided primarily for purposes of facilitating understanding the conceptual aspects of the invention and various possible embodiments thereof, including what is presently considered to be a preferred embodiment. In the interest of clarity and brevity, no attempt is made to provide more details than necessary to enable one skilled in the art, using routine skill and design, to understand and practice the described invention. It is to be further understood that the embodiments described are for purposes of example only, and that the invention is capable of being embodied in other forms and applications than described herein.

DETAILED DESCRIPTION OF PREFERRED EMBODIMENTS

As indicated earlier, the present invention provides a vehicle of a novel construction which permits it to be used for a large variety of tasks and missions with no changes, or minimum changes, required when converting from one mission to another.

Figure 1:
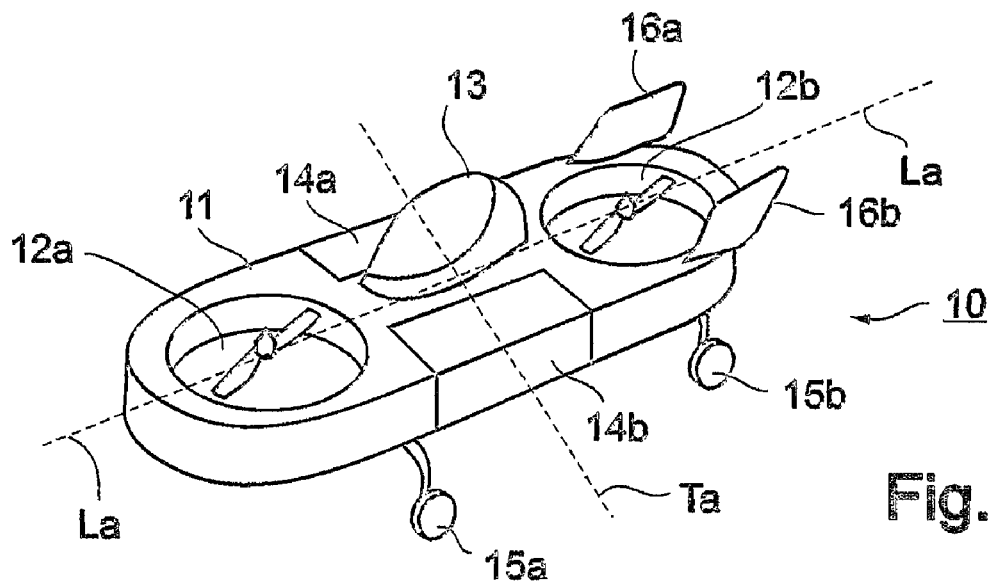
FIG. 1 illustrates one form of VTOL vehicle constructed in accordance with present invention with two ducted fans.

The basic construction of such a vehicle is illustrated in FIG. 1, and is therein generally designated 10. It includes a fuselage 11 having a longitudinal axis LA and a transverse axis TA. Vehicle 10 further includes two lift-producing propellers 12a, 12b carried at the opposite ends of the fuselage 11 along its longitudinal axis LA and on opposite sides of its transverse axis TA. Lift-producing propellers 12a, 12b are ducted fan propulsion units extending vertically through the fuselage and rotatable about vertical axes to propel the air downwardly and thereby to produce an upward lift.

Vehicle 10 further includes a pilot's compartment 13 formed in the fuselage 11 between the lift-producing propellers 12a, 12 and substantially aligned with the longitudinal axis LA and transverse axis TA of the fuselage. The pilot's compartment 13 may be dimensioned so as to accommodate a single pilot or two (or more) pilots, as shown, for example, in FIG. 6a.

Vehicle 10 illustrated in FIG. 1 further includes a pair of payload bays 14a, 14b formed in the fuselage 11 laterally on the opposite sides of the pilot's compartment 13 and between the lift-producing propellers 12a, 12b. The payload bays 14a, 14b shown in FIG. 1 are substantially flush with the fuselage 11, as will be described more particularly below with respect to FIGS. 6a-6c and the pictorial illustration in FIGS. 8a-8d. Also described below, particularly with respect to the pictorial illustrations of FIGS. 8a-8d, are the wide variety of tasks and missions capable of being accomplished by the vehicle when constructed as illustrated in FIG. 1 (and in the later illustrations), and particularly when provided with the payload bays corresponding to 14a, 14b of FIG. 1.

Vehicle 10 illustrated in FIG. 1 further includes a front landing gear 15a and a rear landing gear 15b mounted at the opposite ends of its fuselage 11. In FIG. 1 the landing gears are non-retractable, but could be retractable as in later described embodiments. Aerodynamic stabilizing surfaces may also be provided, if desired, as shown by the vertical stabilizers 16a, 16b carried at the rear end of fuselage 11 on the opposite sides of its longitudinal axis LA.

Figure 2:
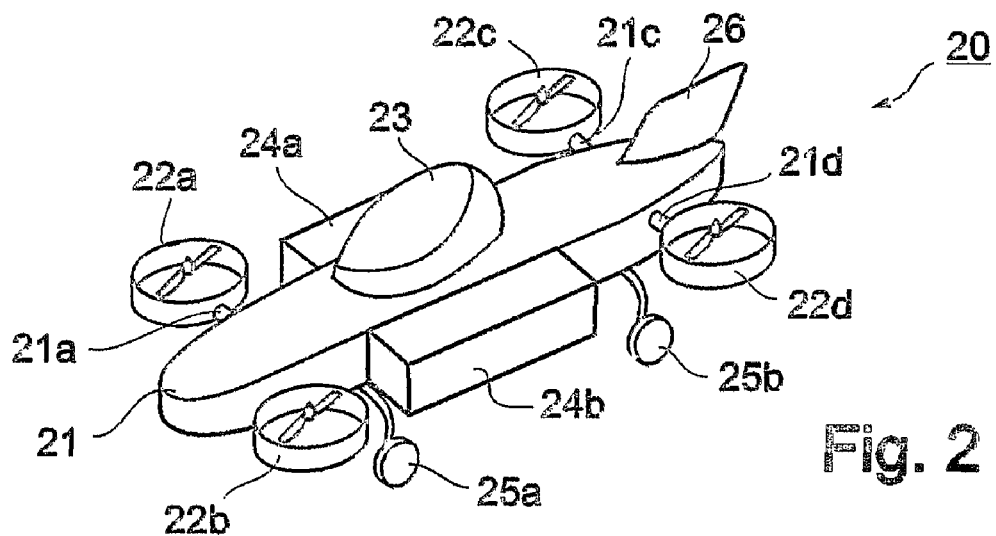
FIG. 2 illustrates an alternative construction with four ducted fans.

FIG. 2 illustrates another vehicle construction in accordance with the present invention. In the vehicle of FIG. 2, therein generally designated 20, the fuselage 21 is provided with a pair of lift-producing propellers on each side of the transverse axis of the fuselage. Thus, as shown in FIG. 2, the vehicle includes a pair of lift-producing propellers 22a, 22b at the front end of the fuselage 21, and another pair of lift-producing propellers 22c, 22d at the rear end of the fuselage. The lift-producing propellers 22a-22d shown in FIG. 2 are also ducted fan propulsion units. However, instead of being formed in the fuselage 21, they are mounted on mounting structures 21a-21d to project laterally of the fuselage.

Vehicle 20 illustrated in FIG. 2 also includes the pilot's compartment 23 formed in the fuselage 21 between the two pairs of lift-producing propellers 22a, 22b and 22c, 22d, respectively. As in the case of the pilot's compartment 13 in FIG. 1, the pilot's compartment 23 in FIG. 2 is also substantially aligned with the longitudinal axis LA and transverse axis TA of the fuselage 21.

Vehicle 20 illustrated in FIG. 2 further includes a pair of payload bays 24a, 24b formed in the fuselage 21 laterally of the pilot's compartment 23 and between the two pairs of lift-producing propellers 22a-22d. In FIG. 2, however, the payload bays are not formed integral with the fuselage, as in FIG. 1, but rather are attached to the fuselage so as to project laterally on opposite sides of the fuselage. Thus, payload bay 24a is substantially aligned with the lift-producing propellers 22a, 22c on that side of the fuselage; and payload bay 24b is substantially aligned with the lift-producing propellers 22b and 22d at that side of the fuselage.

Vehicle 20 illustrated in FIG. 2 also includes a front landing gear 25a and a rear landing gear 25b, but only a single vertical stabilizer 26 at the rear end of the fuselage aligned with its longitudinal axis. It will be appreciated however, that vehicle 20 illustrated in FIG. 2 could also include a pair of vertical stabilizers, as shown at 16a and 16b in FIG. 1, or could be constructed without any such aerodynamic stabilizing surface.

Figure 3:
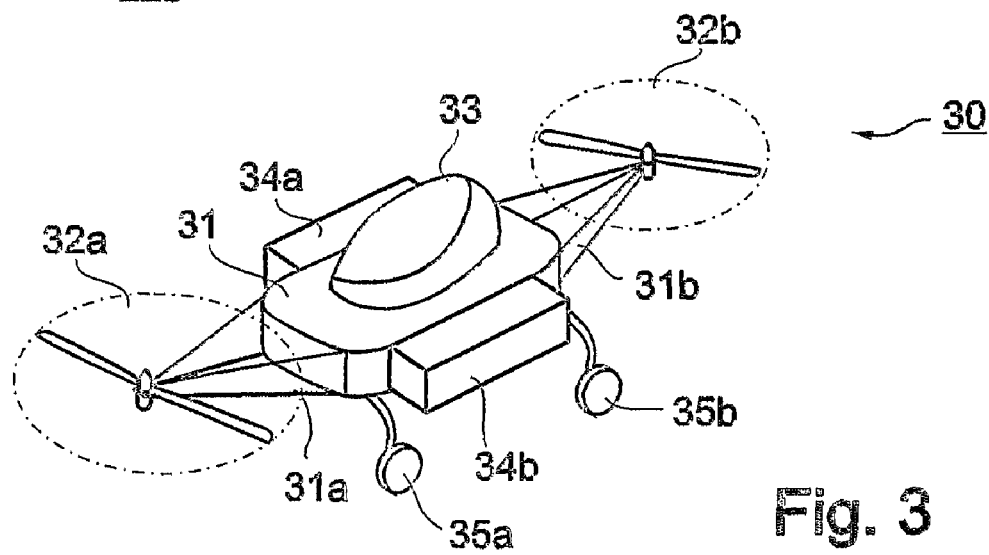
FIG. 3 illustrates a construction similar to FIG. 1 with free propellers, i.e., unducted fans.

FIG. 3 illustrates a vehicle 30 also including a fuselage 31 of a very simple construction having a forward mounting structure 31a for mounting the forward lift-producing propeller 32a, and a rear mounting structure 31b for mounting the rear lift-producing propeller 32b. Both propellers are unducted, i.e., free, propellers. Fuselage 31 is formed centrally thereof with a pilots compartment 33 and carries the two payload bays 34a, 34b on its opposite sides laterally of the pilot's compartment.

Vehicle 30 illustrated in FIG. 3 also includes a front landing gear 35a and a rear landing gear 35b, but for simplification purposes, it does not include an aerodynamic stabilizing surface corresponding to vertical stabilizers 16a, 16b in FIG. 1.

Figure 4:
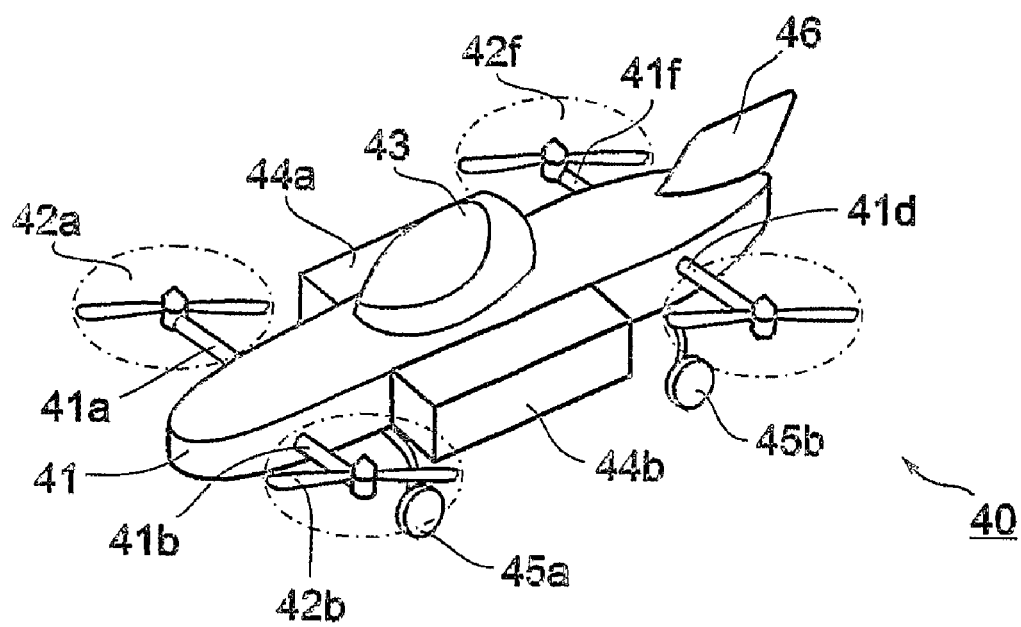
FIG. 4 illustrates a construction similar to FIG. 2 with free propellers.

FIG. 4 illustrates a vehicle, generally designated 40, of a similar construction as in FIG. 2 but including a fuselage 41 mounting a pair of unducted propellers 42a, 42b at its front end, and a pair of unducted propellers 42c, 42d at its rear end by means of mounting structures 41a-41d, respectively. Vehicle 40 further includes a pilot's compartment 43 centrally of the fuselage, a pair of payload bays 44a, 44b laterally of the pilot's compartment, a front landing gear 45a, a rear landing gear 45b, and a vertical stabilizer 46 at the rear end of the fuselage 41 in alignment with its longitudinal axis.

Figure 5:
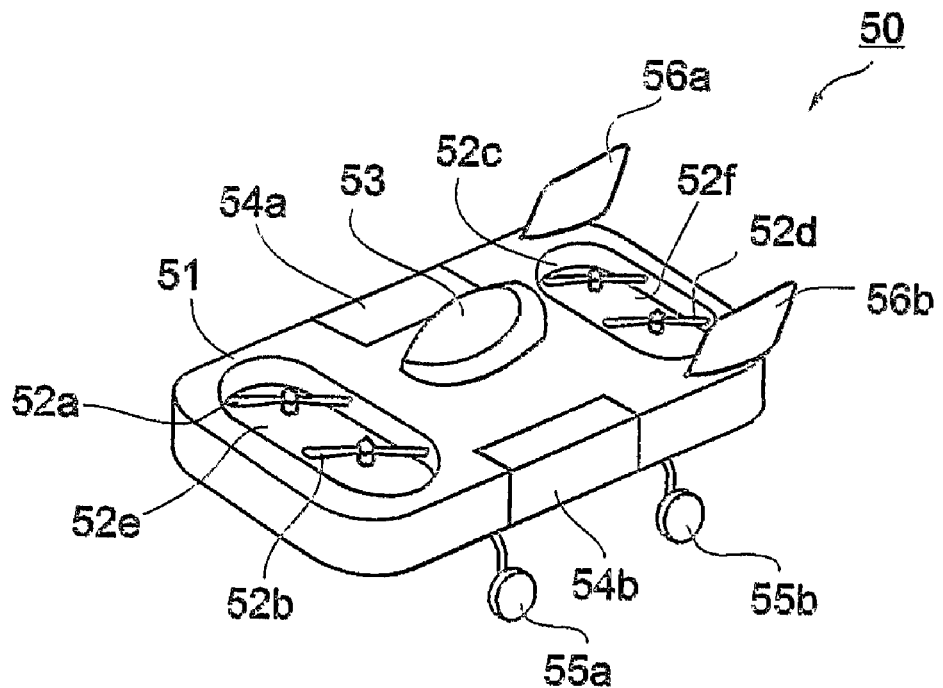
FIG. 5 illustrates a construction similar to that of FIG. 1 but including two propellers, instead of a single propeller, mounted side-by-side in a single, oval shaped duct at each end of the vehicle.

FIG. 5 illustrates a vehicle, generally designated 50, including a fuselage 51 mounting a pair of lift-producing propellers 52a, 52b at its front end, and another pair 52c, 52d at its rear end. Each pair of lift-producing propellers 52a, 52b and 52c, 52d is enclosed within a common oval-shaped duct 52e, 52f at the respective end of the fuselage.

Vehicle 50 illustrated in FIG. 5 further includes a pilot' compartment 53 formed centrally of the fuselage 51, a pair of payload bays 54a, 54b laterally of the pilot's compartment 53, a front landing gear 55a, a rear landing gear 55b, and vertical stabilizers 56a, 56b carried at the rear end of the fuselage 51.

Figure 6A:
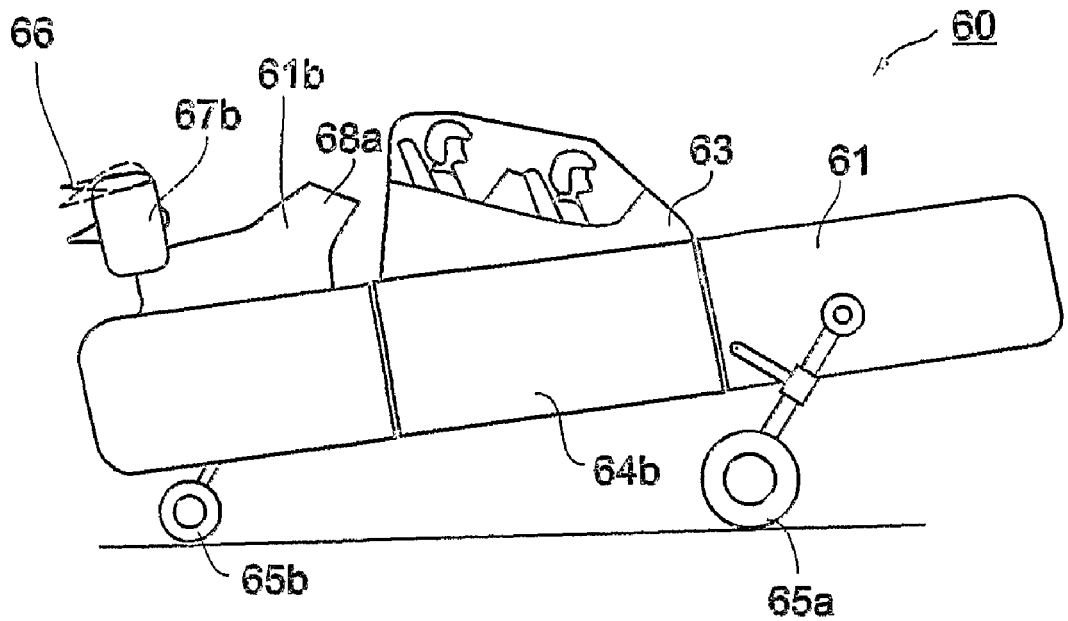
FIGS. 6a, 6b and 6c are side, top and rear views, respectively, illustrating another VTOL vehicle constructed in accordance with the present invention and including pusher propellers in addition to the lift-producing propellers.
Figure 6B:
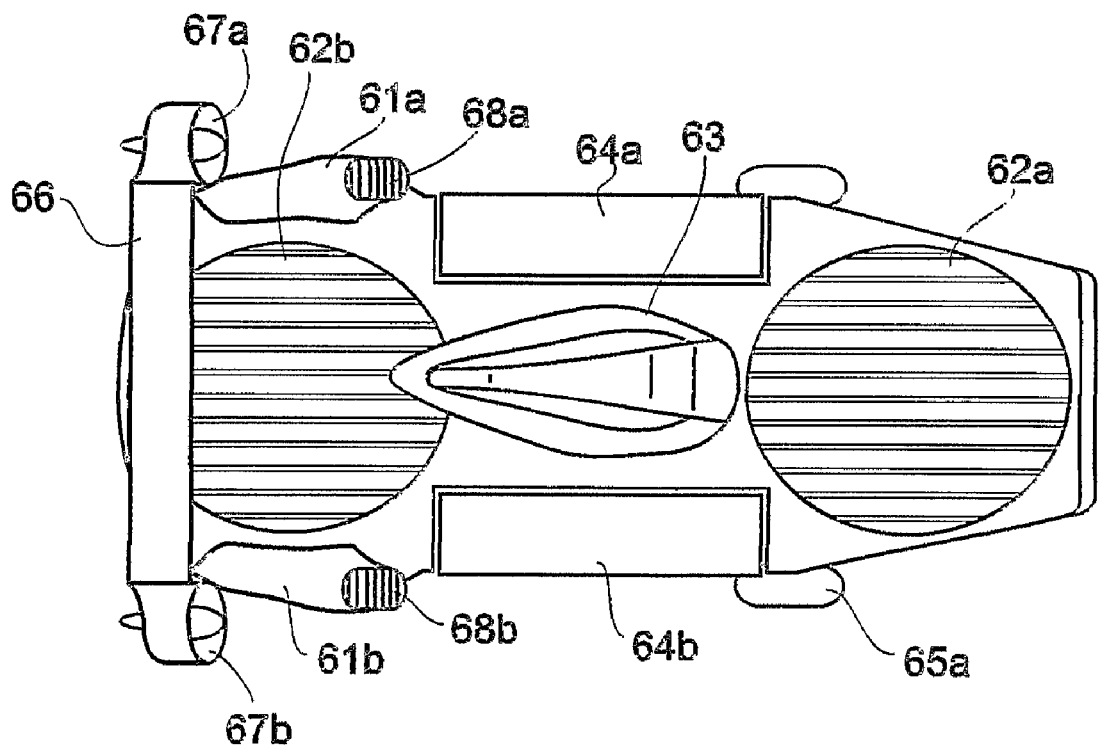
Figure 6C:
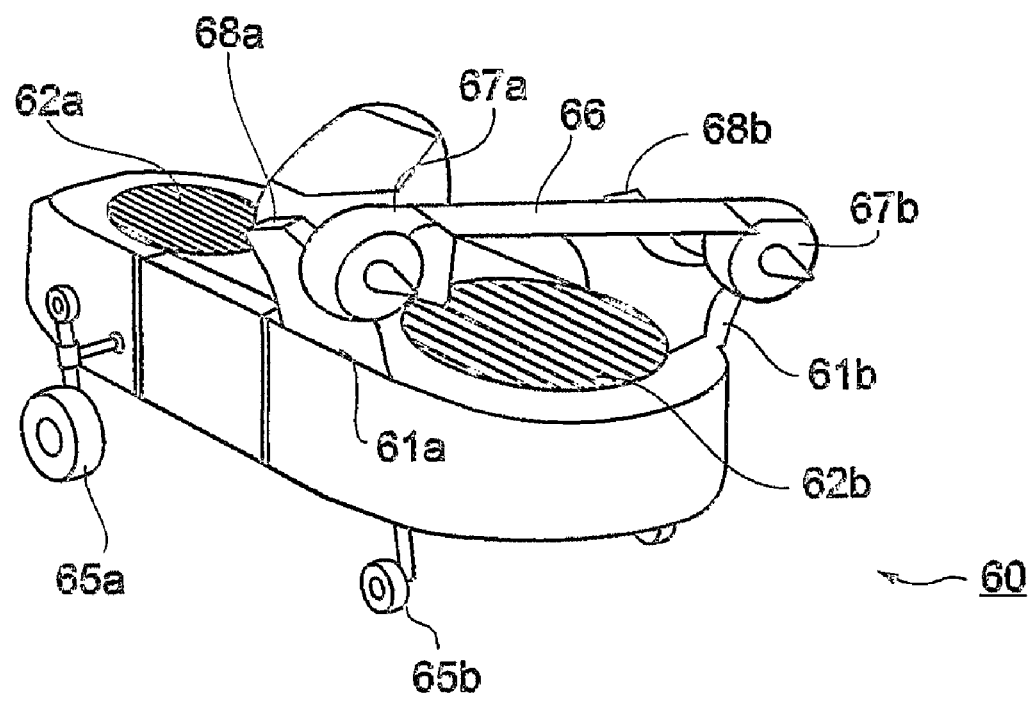

FIGS. 6a, 6b and 6c are side, top and rear views, respectively, of another vehicle constructed in accordance with the present invention. The vehicle illustrated in FIGS. 6a-6c, therein generally designated 60, also includes a fuselage 61 mounting a lift-producing propeller 62a, 62b at its front and rear ends, respectively. The latter propellers are preferably ducted units as in FIG. 1.

Vehicle 60 further includes a pilot's compartment 63 centrally of the fuselage 61, a pair of payload bays 64a, 64b laterally of the fuselage and of the pilot's compartment, a front landing gear 65a, a rear landing gear 65b, and a stabilizer, which, in this case, is a horizontal stabilizer 66 extending across the rear end of the fuselage 61.

Vehicle 60 illustrated in FIGS. 6a-6c further includes a pair of pusher propellers 67a, 67b, mounted at the rear end of the fuselage 61 at the opposite ends of the horizontal stabilizer 66. As shown particularly in FIG. 6c the rear end of the fuselage 61 is formed with a pair of pylons 61a, 61b, for mounting the two pusher propellers 67a, 67b, together with the horizontal stabilizer 66.

The two pusher propellers 67a, 67b are preferably variable-pitch propellers enabling the vehicle to attain higher horizontal speeds. The horizontal stabilizer 66 is used to trim the vehicle's pitching moment caused by the ducted fans 62a, 62b, thereby enabling the vehicle to remain horizontal during high speed flight.

Each of the pusher propellers 67a-67b is driven by an engine enclosed within the respective pylon 61a, 61b. The two engines are preferably turbo-shaft engines. Each pylon is thus formed with an air inlet 68a, 68b at the forward end of the respective pylon, and with an air outlet (not shown) at the rear end of the respective pylon.

Figure 7:
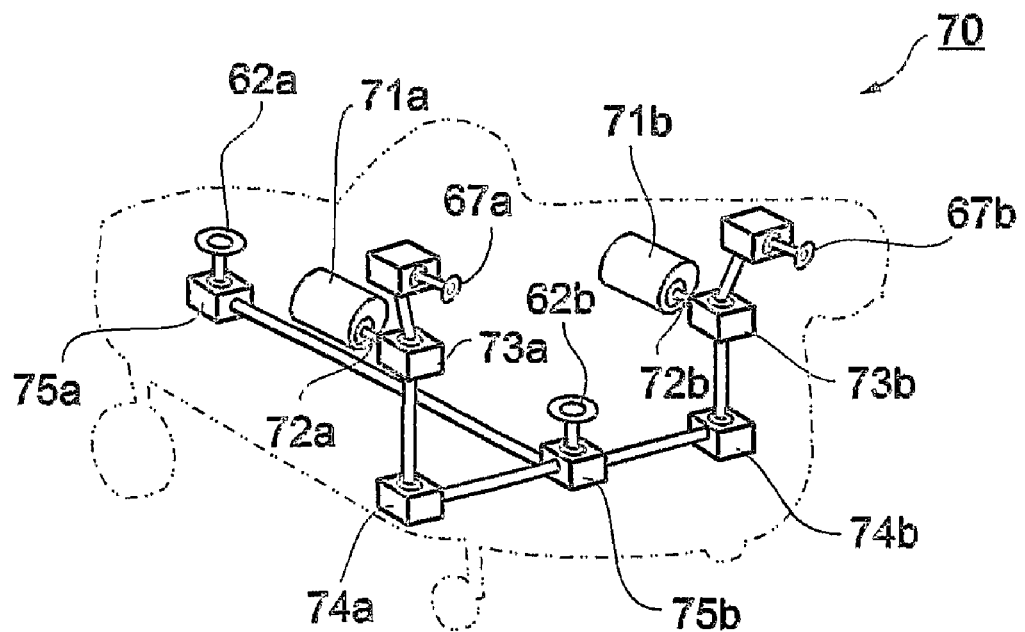
FIG. 7 is a diagram illustrating the drive system in the vehicle of FIGS. 6a-6c.

FIG. 7 schematically illustrates the drive within the vehicle 60 for driving the two ducted fans 62a, 62b as well as the pusher propellers 67a, 67b. The drive system, generally designated 70, includes two engines 71, 71b, each incorporated in an engine compartment within one of the two pylons 61a, 61b. Each engine 71a, 71b, is coupled by an over-running clutch 72a, 72b, to a gear box 73a, 73b coupled on one side to the respective thrust propeller 67a, 67b, and on the opposite side to a transmission for coupling to the two ducted fans 62a, 62b at the opposite ends of the fuselage. Thus, as schematically shown in FIG. 7, the latter transmission includes additional gear boxes 74a, 74b coupled to rear gear box 75b for driving the rear ducted fan 62b, and front gear box 75a for driving the front ducted fan 62b.

Figure 8:
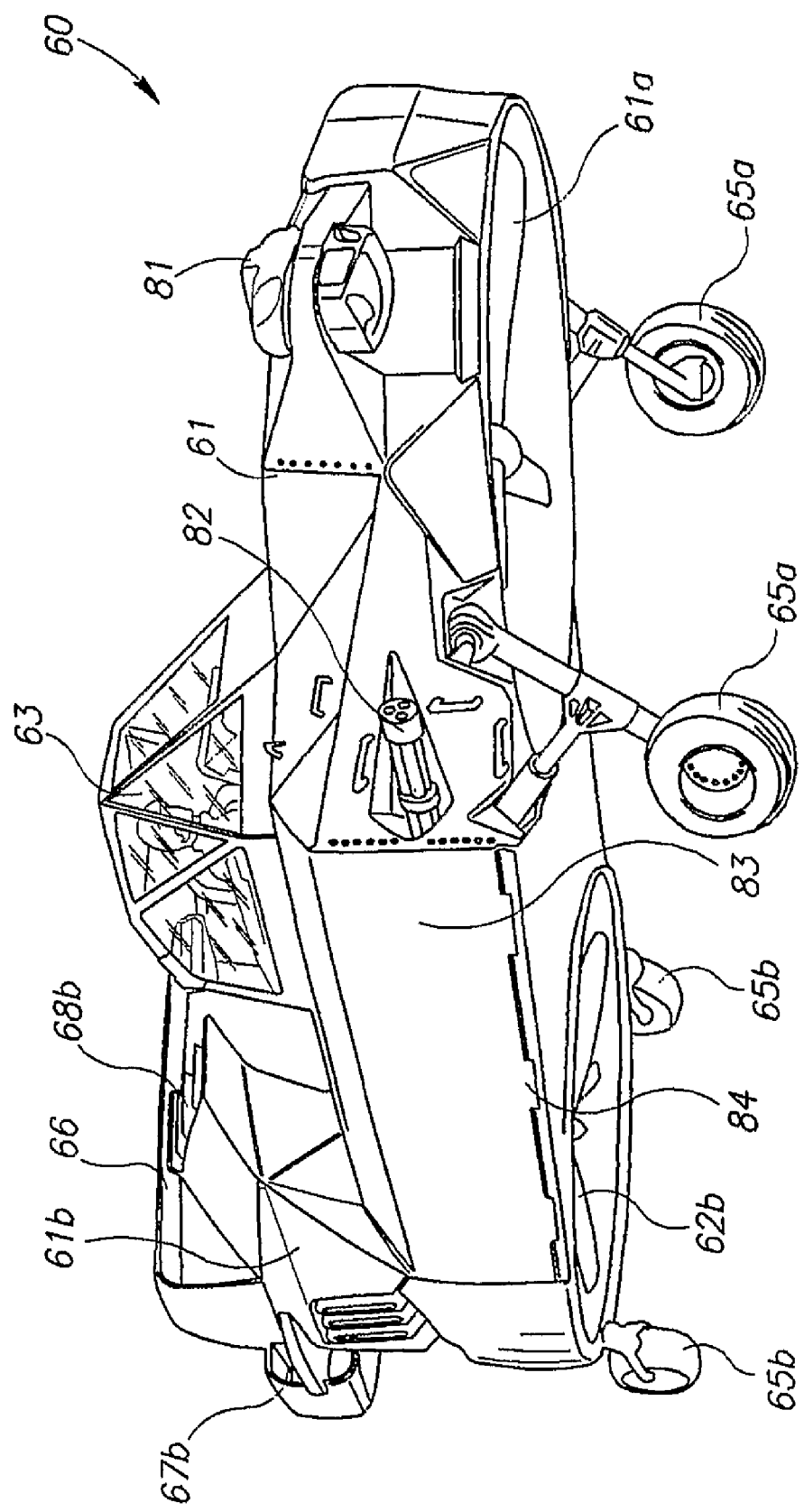
FIG. 8 is a pictorial illustration of a vehicle constructed in accordance with FIGS. 6a-6c and 7.

FIG. 8 pictorially illustrates an example of the outer appearance that vehicle 60 may take.

In the pictorial illustration of FIG. 8, those parts of the vehicle which correspond to the above-described parts in FIGS. 6a-6c are identified by the same reference numerals in order to facilitate understanding. FIG. 8, however, illustrates a number of additional features which may be provided in such a vehicle.

Thus, as shown in FIG. 8, the front end of the fuselage 61 may be provided with a stabilized sight and FLIR (Forward Looking Infra-Red) unit, as shown at 81, and with a gun at the forward end of each payload bay, as shown at 82. In addition, each payload bay may include a cover 83 deployable to an open position providing access to the payload bay, and to a closed position covering the payload bay with respect to the fuselage 61.

In FIG. 8, cover 83 of each payload bay is pivotally mounted to the fuselage 61 along an axis 84 parallel to the longitudinal axis of the fuselage at the bottom of the respective bay. The cover 83, when in its closed condition, conforms to the outer surface of the fuselage 61 and is flush therewith.

When the cover 83 is pivoted to its open position, it serves as a support for supporting the payload, or a part thereof, in the respective payload bay.

Figure 8A:
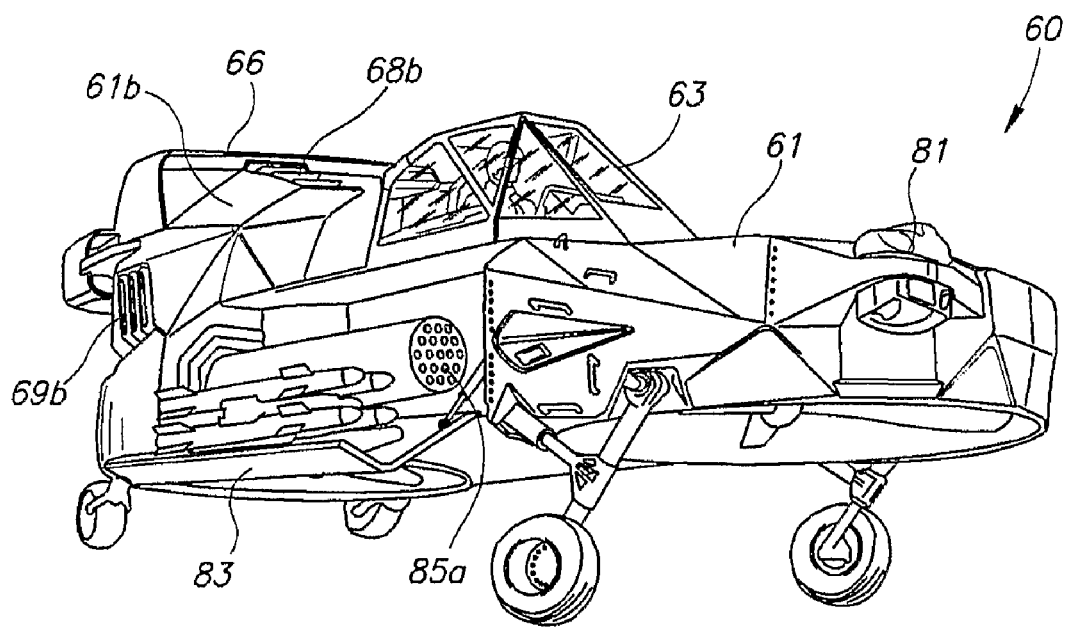
FIG. 8a-8d illustrate examples of various tasks and missions capable of being accomplished by the vehicle of FIG. 8.
Figure 8B:
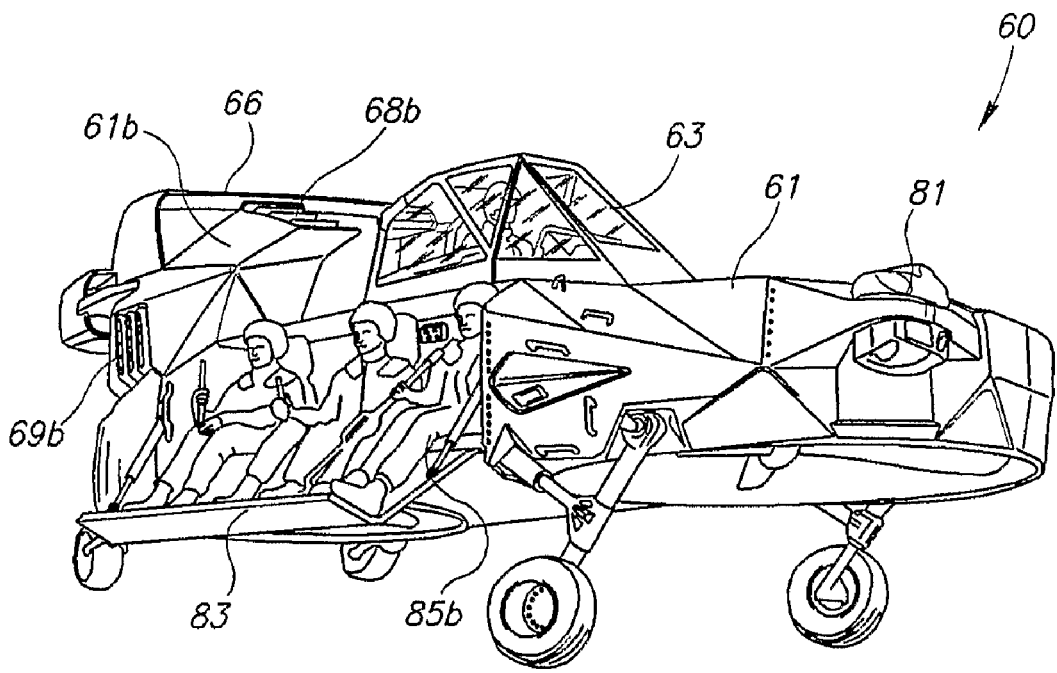
Figure 8C:
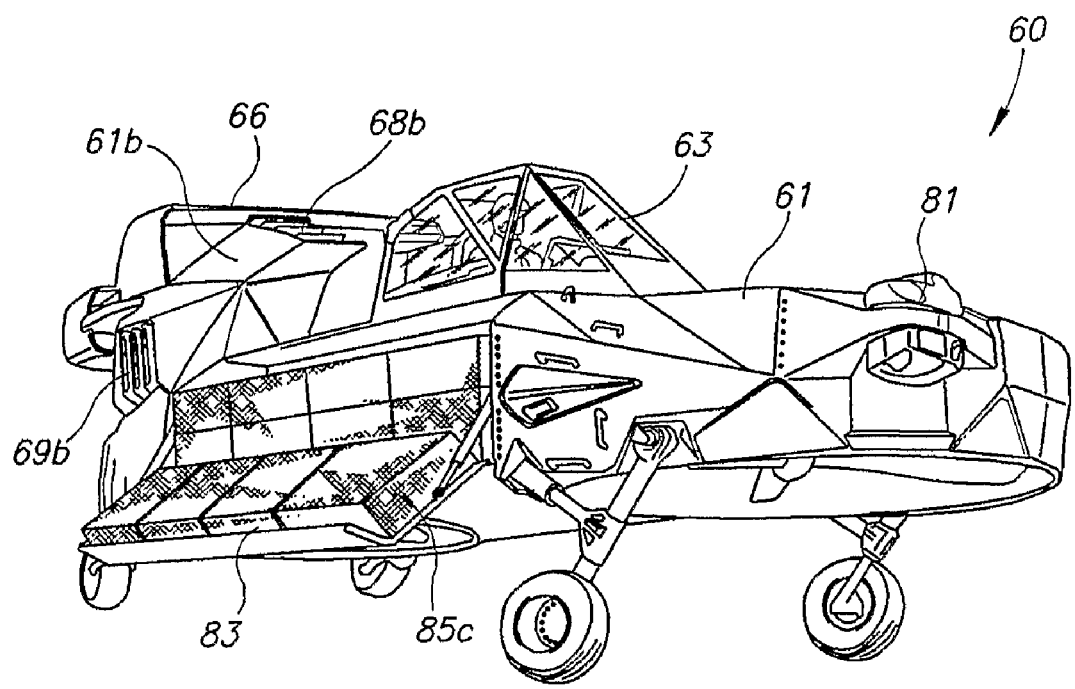
Figure 8D:
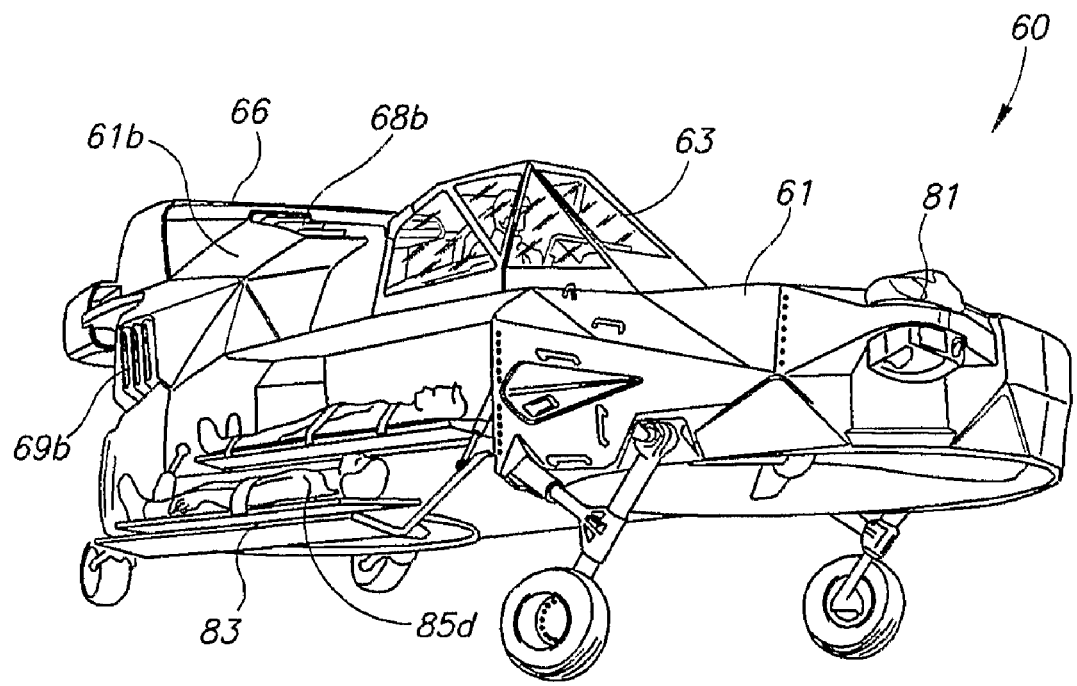

The latter feature is more particularly shown in FIGS. 8a-8d which illustrate various task capabilities of the vehicle as particularly enabled by the pivotal covers 83 for the two payload bays. Thus, FIG. 8a illustrates the payload bays used for mounting or transporting guns or ammunition 85a; FIG. 8b illustrates the use of the payload bays for transporting personnel or troops 85b; FIG. 8c illustrates the use of the payload bays for transporting cargo 85c; and FIG. 8d illustrates the use of the payload bays for evacuating wounded 85d. Many other task or mission capabilities will be apparent.

Figure 9A:
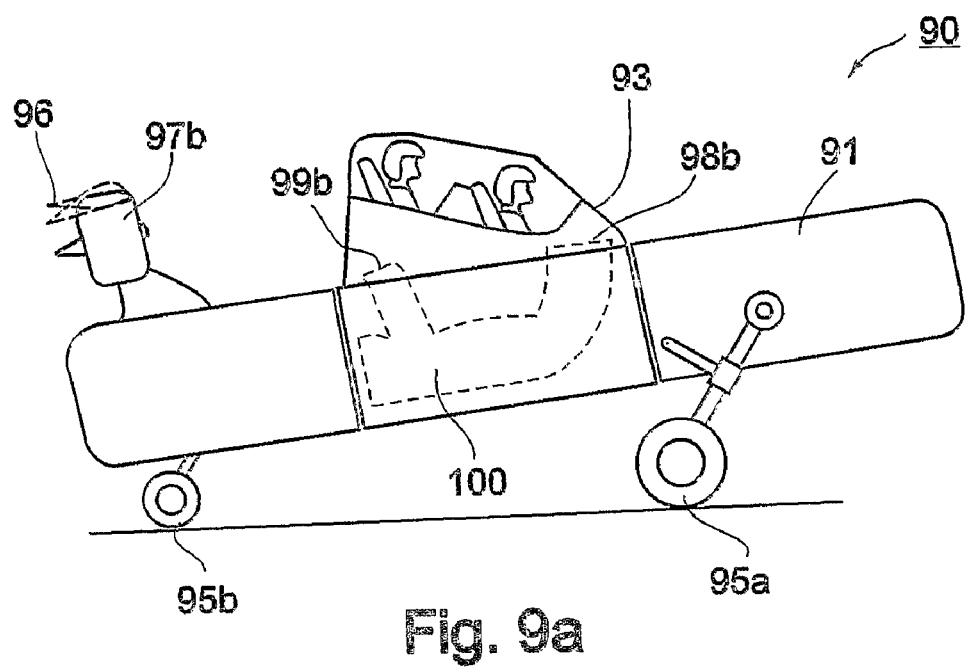
FIGS. 9a and 9b are side and top views, respectively, illustrating another VTOL vehicle constructed in accordance with the present invention.
Figure 9B:
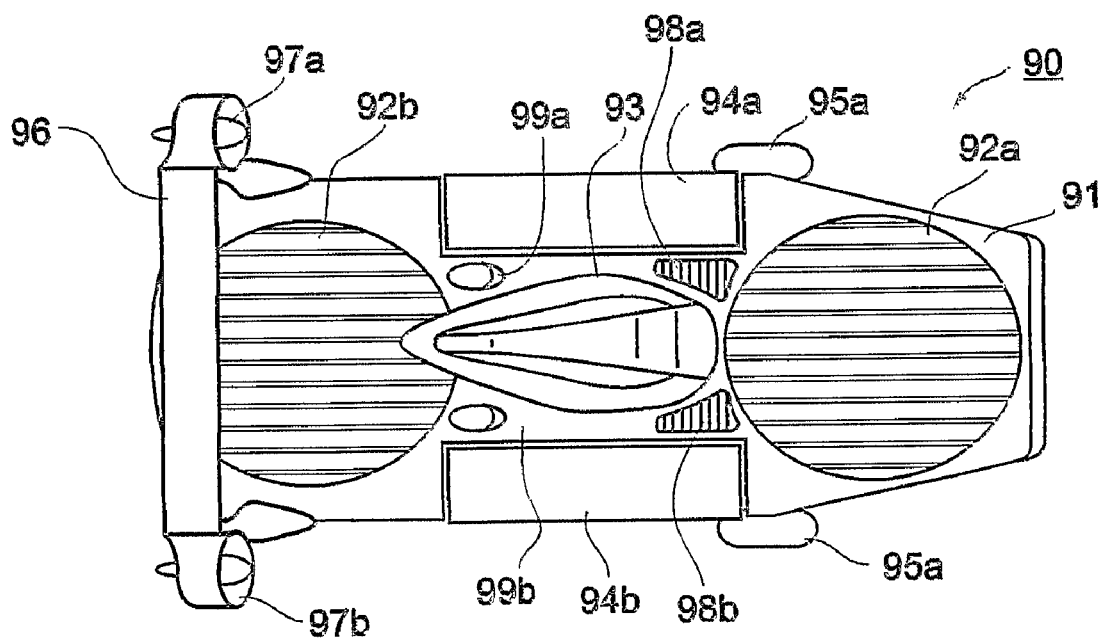

FIGS. 9a and 9b are side and top views, respectively, illustrating another vehicle, generally designated 90, of a slightly modified construction from vehicle 60 described above. Thus, vehicle 90 illustrated in FIGS. 9a and 9b also includes a fuselage 91, a pair of ducted-fan type lift-producing propellers 92a, 92b at the opposite ends of the fuselage, a pilot's compartment 93 centrally of the fuselage, and a pair of payload bays 94a, 94b laterally of the pilot's compartment 93. Vehicle 90 further includes a front landing gear 95a, a rear landing gear 95b, a horizontal stabilizer 96, and a pair of pusher propellers 97a, 97b, at the rear end of fuselage 91.

Figure 10:
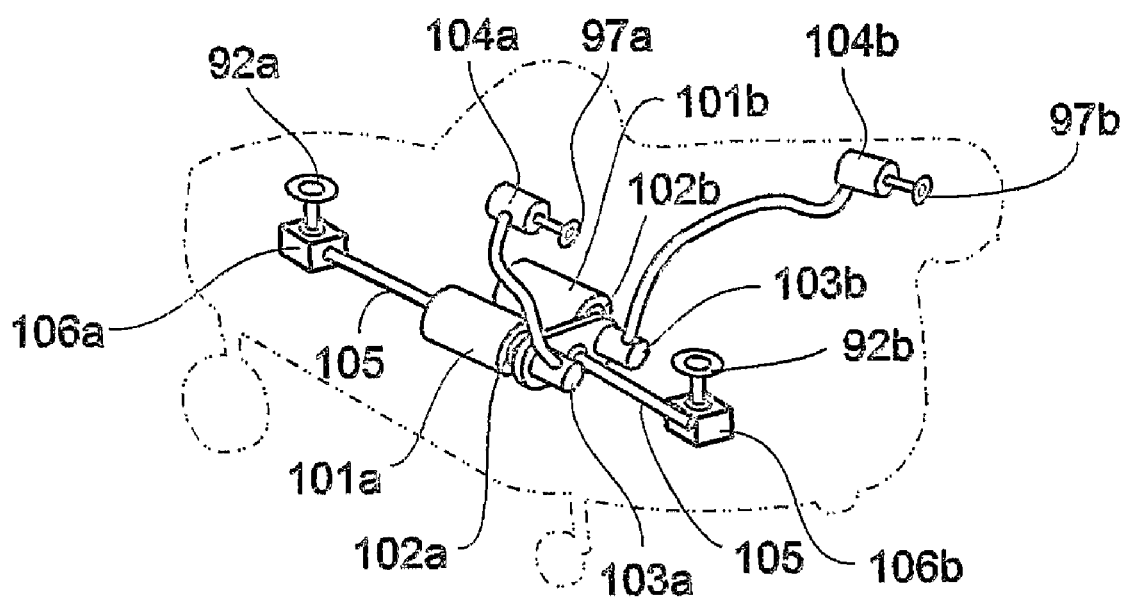
FIG. 10 is a diagram illustrating the drive system in the vehicle of FIGS. 9a and 9b.

FIG. 10 schematically illustrates the drive system in vehicle 90. Thus as shown in FIG. 10, vehicle 90 also includes two engines 101a, 101b for driving the two ducted fans 92a, 92b and the two pusher propellers 97a, 97b, respectively, as in vehicle 60. However, whereas in vehicle 60 the two engines are located in separate engine compartments in the two pylons 61a, 61b, in vehicle 90 illustrated in FIGS. 9a and 9b both engines are incorporated in a common engine compartment, schematically shown at 100 in FIG. 9a, underlying the pilot's compartment 93. The two engines 101a, 101b (FIG. 10), may also be turbo-shaft engines as in FIG. 7. For this purpose, the central portion of the fuselage 91 is formed with a pair of air inlet openings 98a, 98b forward of the pilot's compartment 93, and with a pair of air outlet openings 99a, 99b rearwardly of the pilot's compartment.

As shown in FIG. 10, the two engines 101a, 101b drive, via the over-running clutches 102a, 102b, a pair of hydraulic pumps 103a, 103b which, in turn, drive the drives 104a, 104b of the two pusher propellers 97a, 97b. The two engines 101a, 101b are further coupled to a drive shaft 105 which drives the drives 106a, 106b of the two ducted fans 92a, 92b, respectively.

Figure 11A:
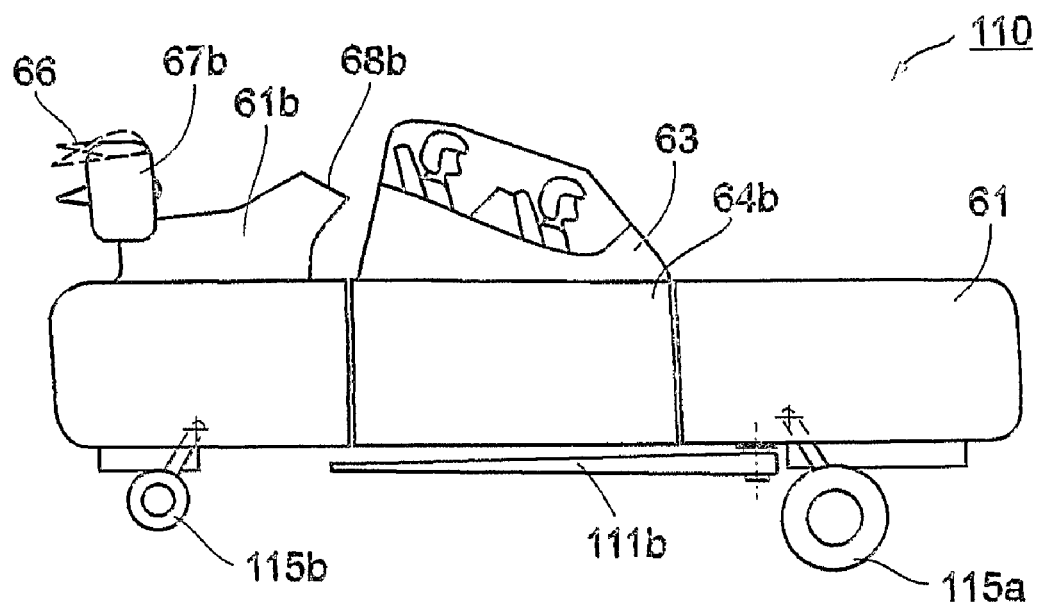
FIGS. 11a and 11b are side and top views, respectively, illustrating a VTOL vehicle constructed in accordance with any one of FIGS. 6a-10 but equipped with deployable stub wings, the wings being shown in these figures in their retracted stowed positions.
Figure 11B:
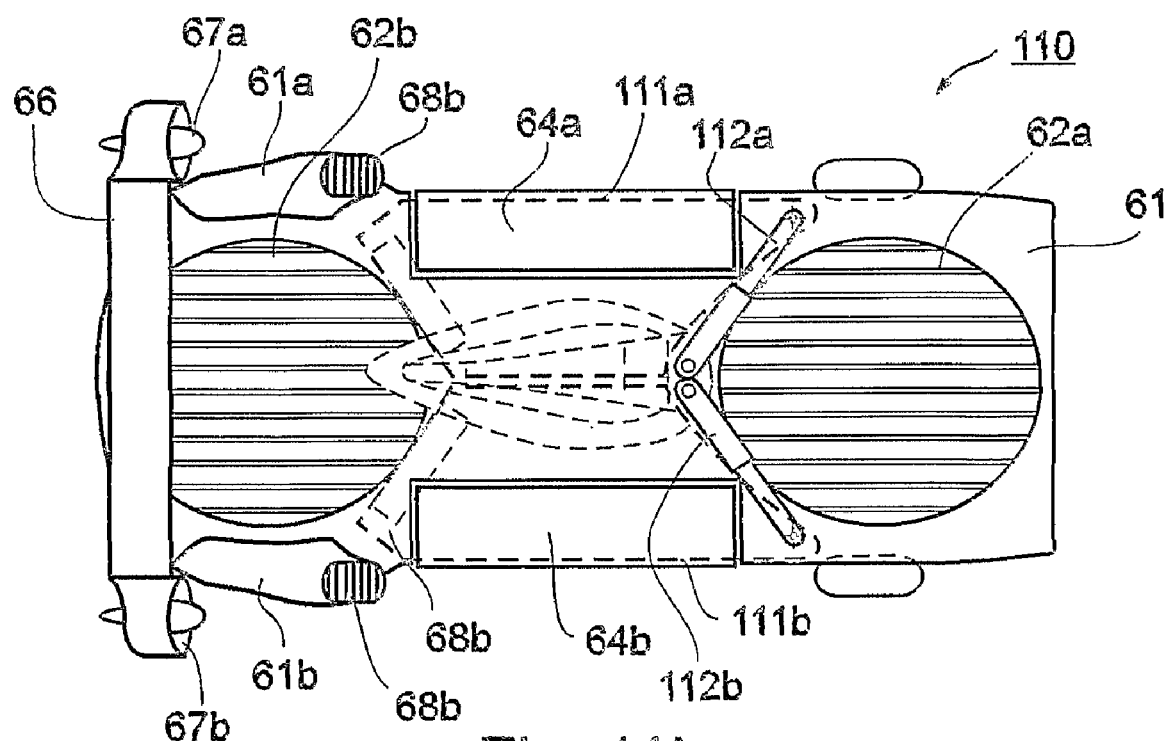
Figure 11C:
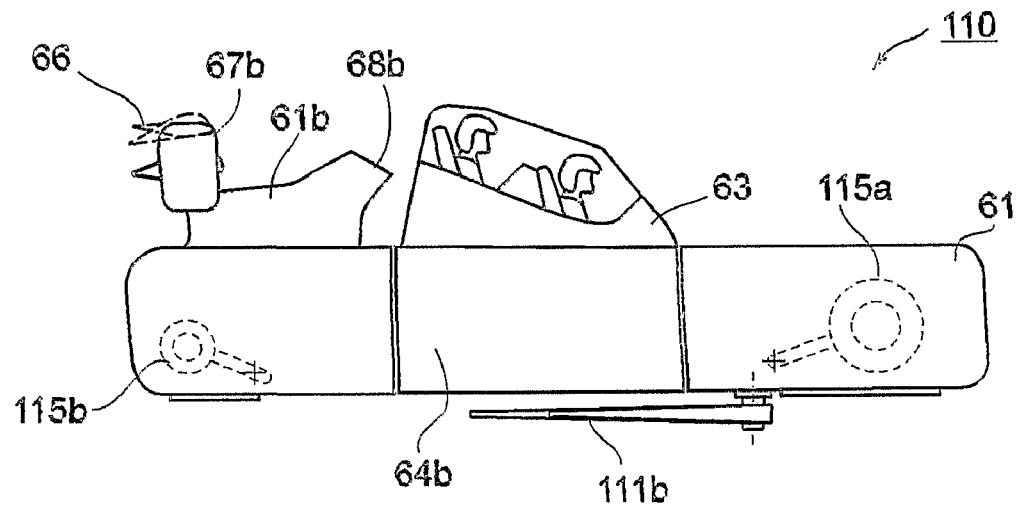
FIGS. 11c and 11d are views corresponding to those of FIGS. 11a and 11b but showing the stub wings in their deployed, extended positions.
Figure 11D:
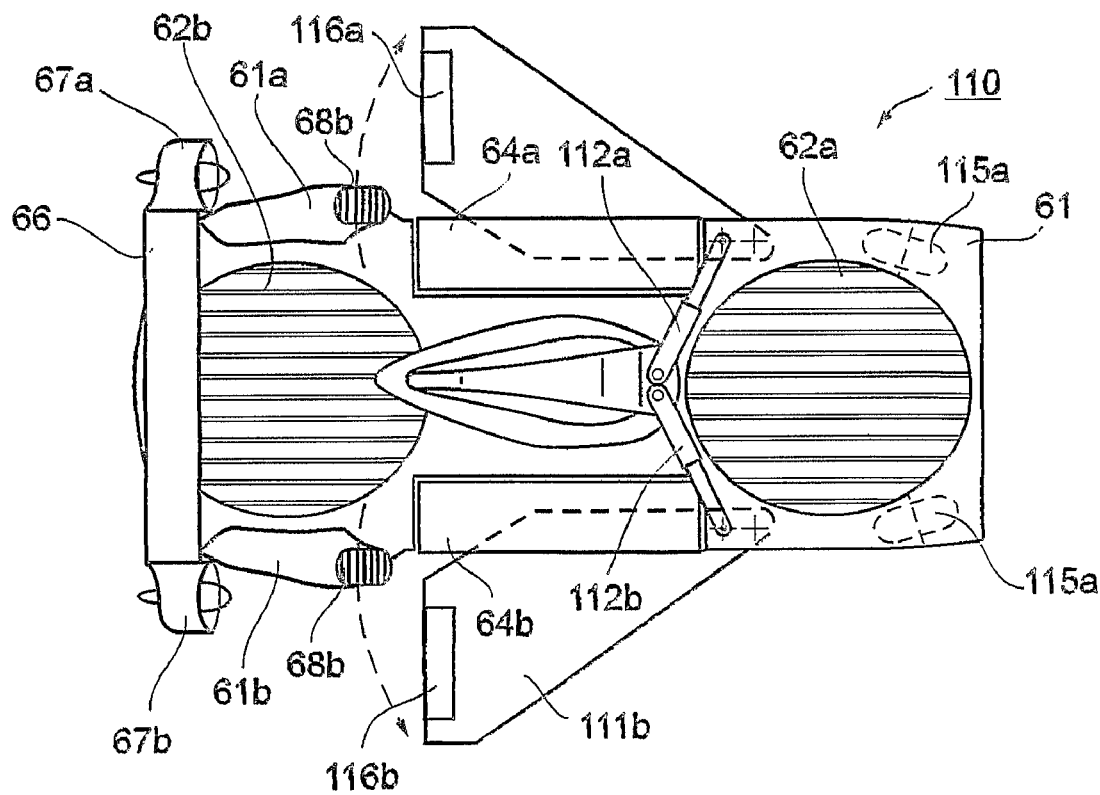

FIGS. 11a-11d illustrate another vehicle, therein generally designated 110, which is basically of the same construction as vehicle 60 described above with respect to FIGS. 6a-6c, 7, 8 and 8a-8d; to facilitate understanding, corresponding elements are therefore identified by the same reference numerals. Vehicle 110 illustrated in FIGS. 11a-11d, however, is equipped with two stub wings, generally designated 111a, 111b, each pivotally mounted to the fuselage 61, under one of the payload bays 64a, 64b, to a retracted position shown in FIGS. 11a and 11b, or to an extended deployed position shown in FIGS. 11c and 11d for enhancing the lift produced by the ducted fans 62a, 62b. Each of the stub wings 111a, 111b is actuated by an actuator 112a, 112b driven by a hydraulic or electrical motor (not shown). Thus, at low speed flight, the stub wings 111a, 111b, would be pivoted to their stowed positions as shown in FIGS. 11a and 11b; but at high speed flight, they could be pivoted to their extended or deployed positions, as shown in FIGS. 11c and 11d, to enhance the lift produced by the ducted fans 61a, 61b. Consequently, the blades in the ducted fans would be at low pitch producing only a part of the total lift force.

The front and rear landing gear, shown at 115a and 115b, could also by pivoted to a stowed position to enable higher speed flight, as shown in FIGS. 11c and 11d. In such case, the front end of the fuselage 61 would preferably be enlarged to accommodate the landing gear when in its retracted condition. Vehicle 110 illustrated in FIGS. 11a-11d may also include ailerons, as shown at 116a, 116b (FIG. 11d) for roll control.

Figure 12:
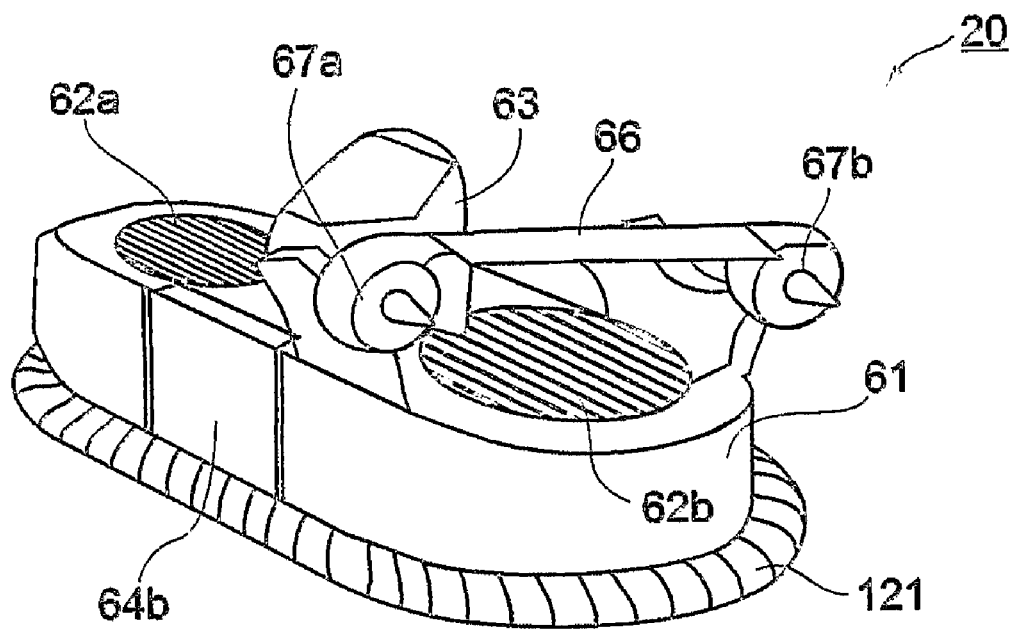
FIG. 12 is a perspective rear view of a vehicle constructed in accordance with any one of FIGS. 6a-10 but equipped with a lower skirt for converting the vehicle to a hovercraft for movement over ground or water.

FIG. 12 illustrates how the vehicle, such as vehicle 60 illustrated in FIGS. 6a-6d, may be converted to a hovercraft for traveling over ground or water. Thus, the vehicle illustrated in FIG. 12, and therein generally designated 120, is basically of the same construction as described above with respect to FIGS. 6a-6d, and therefore corresponding parts have been identified with the same reference numerals. In vehicle 120 illustrated in FIG. 12, however, the landing gear wheels (65a, 65b, FIGS. 6a-6d) have been removed, folded, or otherwise stowed, and instead, a skirt 121 has been applied around the lower end of the fuselage 61. The ducted fans 62a, 62b, may be operated at very low power to create enough pressure to cause the vehicle to hover over the ground or water as in hovercraft vehicles. The variable pitch pusher propellers 67a, 67b would provide forward or rear movement, as well as steering control, by individually varying the pitch, as desired, of each propeller.

Vehicles constructed in accordance with the present invention may also be used for movement on the ground. Thus, the front and rear wheels of the landing gears can be driven by electric or hydraulic motors included within the vehicle.

Figure 13:
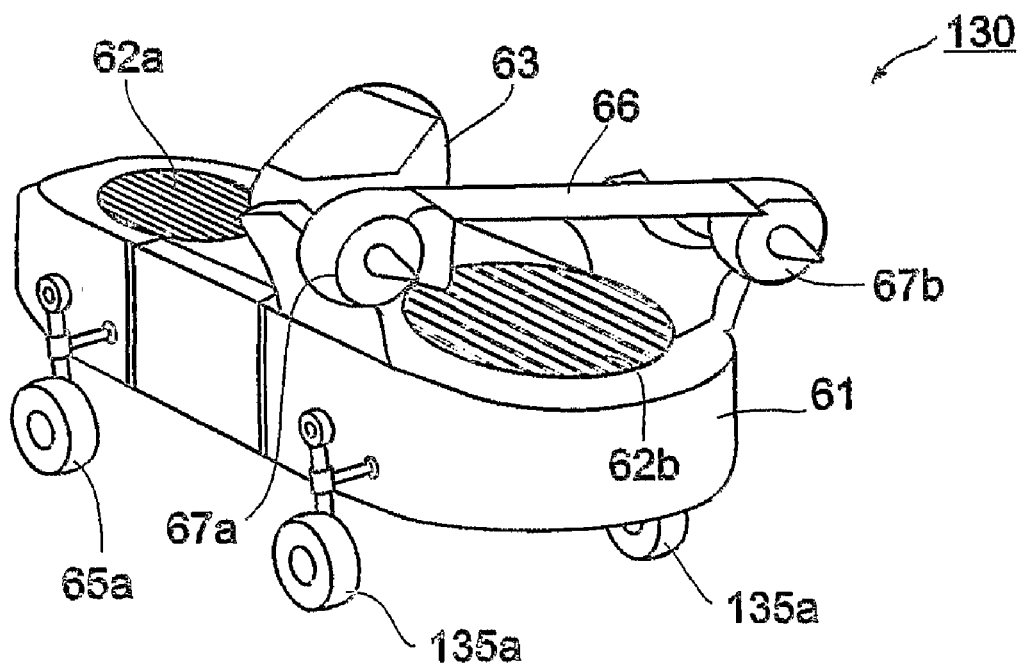
FIG. 13 is a perspective rear view of a vehicle constructed in accordance with any one of FIGS. 6a-10 but equipped with large wheels for converting the vehicle for ATV (all terrain vehicle) operation.

FIG. 13 illustrates how such a vehicle can also be used as an ATV (all terrain vehicle). The vehicle illustrated in FIG. 13, therein generally designated 130, is basically of the same construction as vehicle 60 illustrated in FIGS. 6a-6d, and therefore corresponding parts have been identified by the same reference numerals to facilitate understanding. In vehicle 130 illustrated in FIG. 13, however, the two rear wheels of the vehicle are replaced by two (or four) larger ones, bringing the total number of wheels per vehicle to four (or six). Thus, as shown in FIG. 13, the front wheels (e.g., 65a, FIG. 6c) of the front landing gear are retained, but the rear wheels are replaced by two larger wheels 135a (or by an additional pair of wheels, not shown), to enable the vehicle to traverse all types of terrain.

When the vehicle is used as an ATV as shown in FIG. 13, the front wheels 65a or rear wheels would provide steering, while the pusher propellers 67a, 67b and main lift fans 62a, 62b would be disconnected but could still be powered-up for take-off if so desired. The same applies also with respect to the hovercraft version illustrated in FIG. 12.

It will thus be seen that the invention thus provides a utility vehicle of a relatively simple structure which is capable of performing a wide variety of VTOL functions, as well as many other tasks and missions, with minimum changes in the vehicle to convert it from one task or mission to another.

FIGS. 14a-14e are pictorial illustrations of alternative vehicle arrangements where the vehicle is relatively small in size, having the pilot's cockpit installed to one side of the vehicle. Various alternative payload possibilities are shown.

Figure 14A:
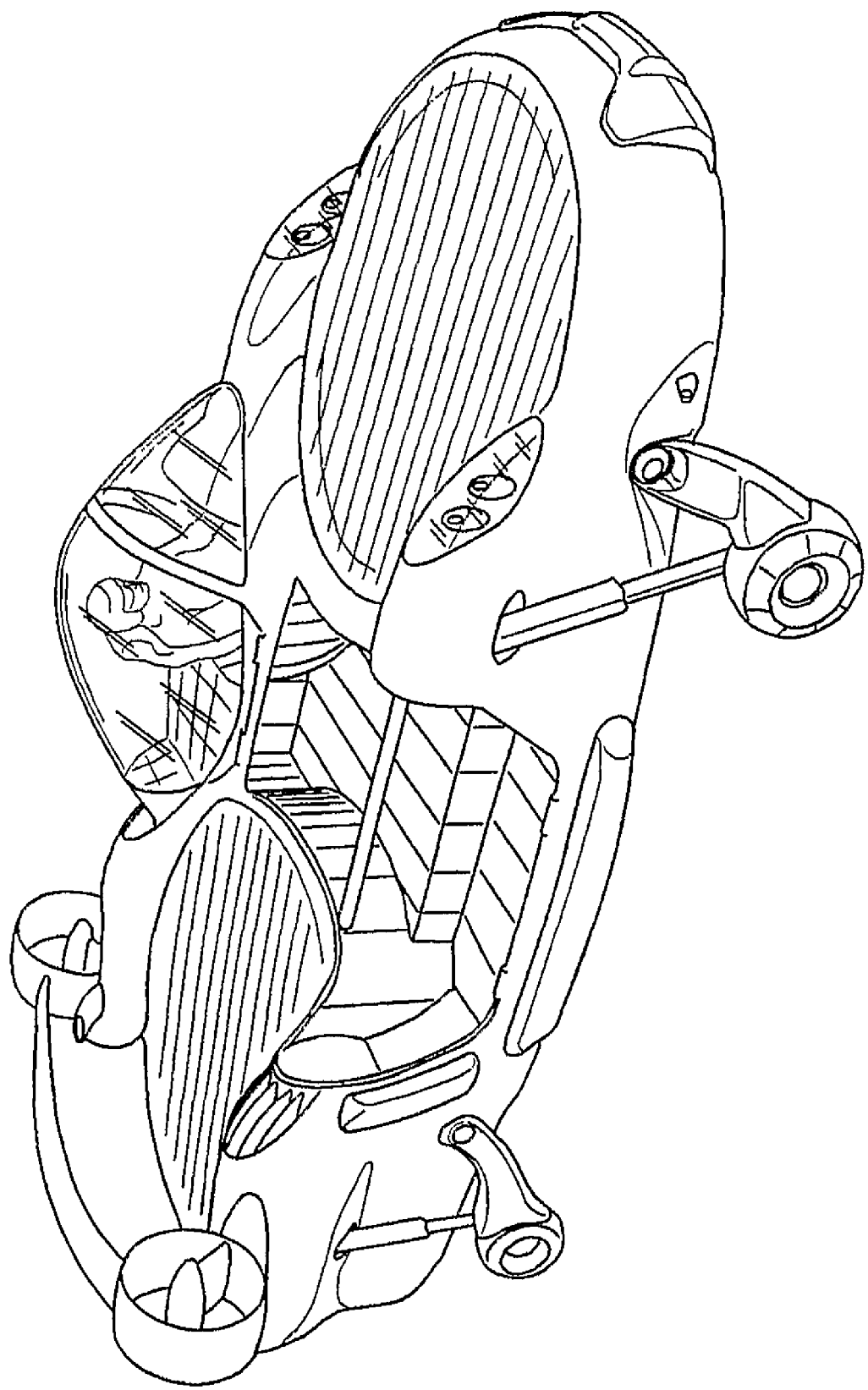
FIGS. 14a-14e are a pictorial illustration of an alternative vehicle arrangement wherein the vehicle is relatively small in size, having the pilot's cockpit installed to one side of the vehicle. Various alternative payload possibilities are shown.

FIG. 14a shows the vehicle in its basic form, with no specific payload installed. The overall design and placement of parts of the vehicle are similar to those of the 'larger' vehicle described in FIG. 8. with the exception of the pilot's cockpit, which in the arrangement of FIG. 14 takes up the space of one of the payload bays created by the configuration shown in FIG. 8. The cockpit arrangement of FIG. 14a frees up the area taken up by the cockpit in the arrangement of FIG. 8 for use as an alternative payload area, increasing the total volume available for payload on the opposite side of the cockpit. It is appreciated that the mechanical arrangement of engines, drive shafts and gearboxes for the vehicle of FIG. 14. may be that described with reference to FIG. 7.

Figure 14B:
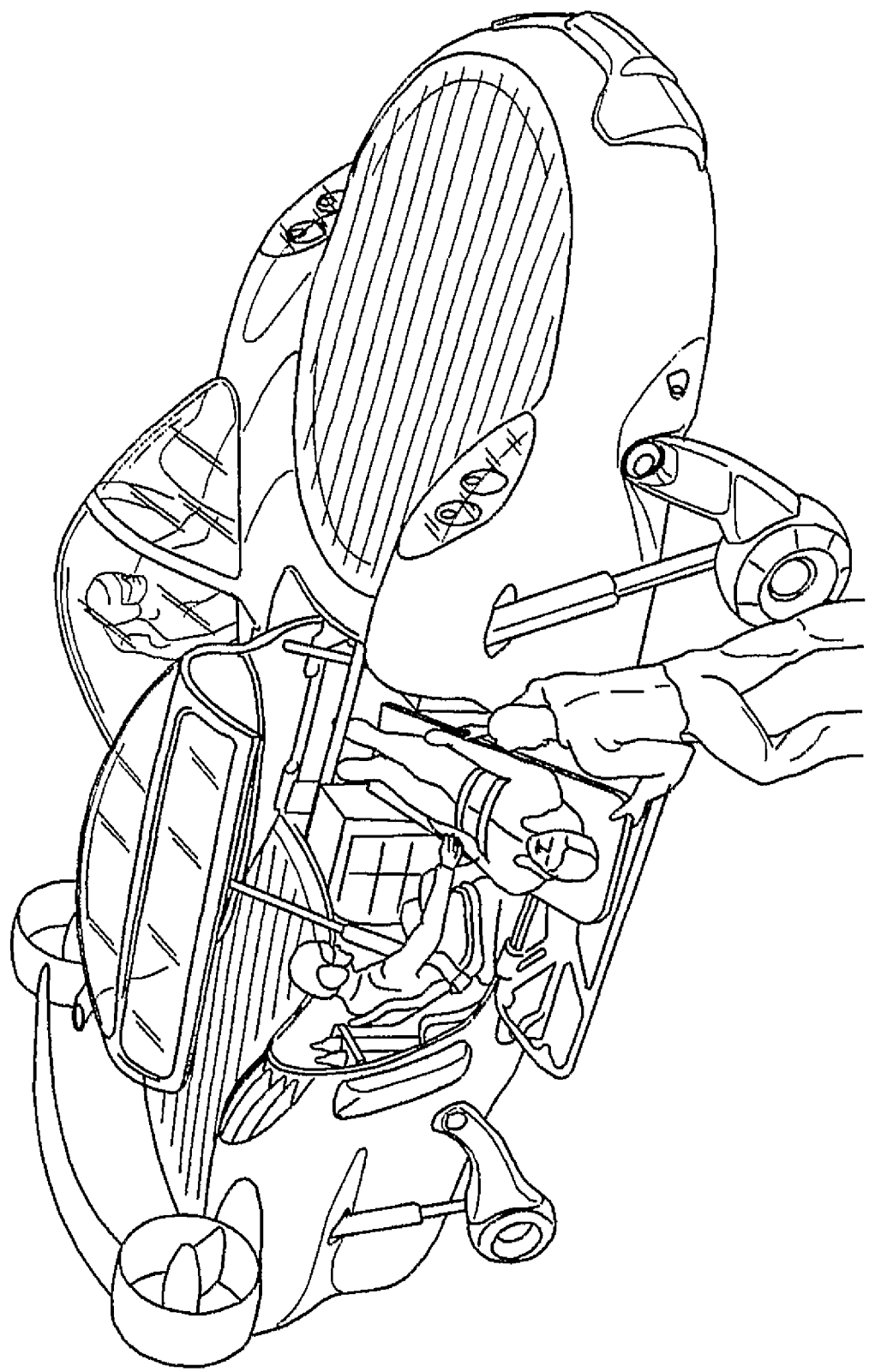

FIG. 14b illustrates how the basic vehicle of FIG. 14a may be used to evacuate a patient. The single payload bay is optionally provided with a cover and side door which protect the occupants, and which may include transparent areas to enable light to enter. The patient lies on a stretcher which is oriented predominantly perpendicular to the longitudinal axis of the vehicle, and optionally at a slight angle to enable the feet of the patient to clear the pilot's seat area and be moved fully into the vehicle despite its small size. Space for a medical attendant is provided, close to the outer side of the vehicle.

Figure 14C:
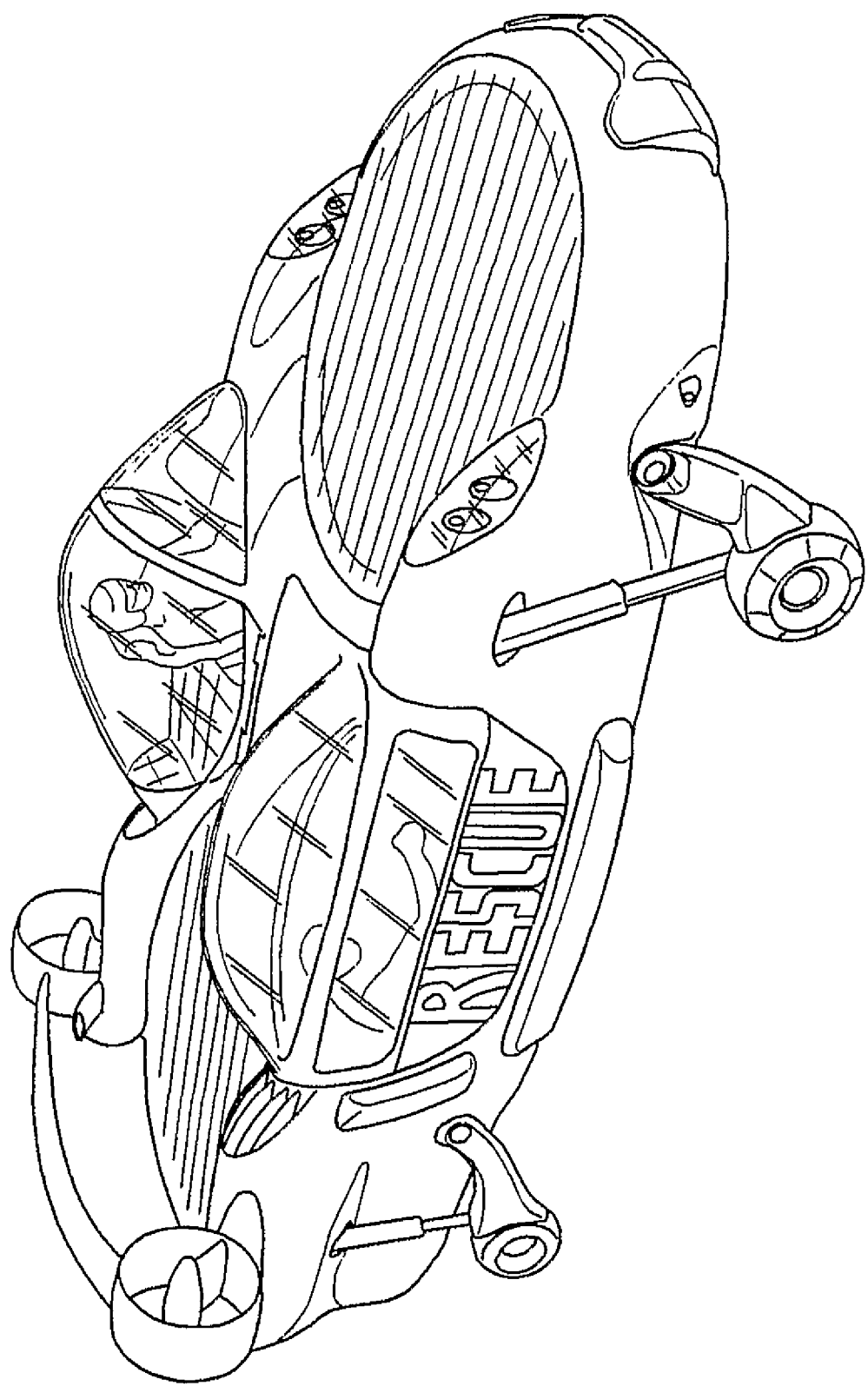

FIG. 14c shows the vehicle of FIG. 14b with the cover and side door closed for flight.

Figure 14D:
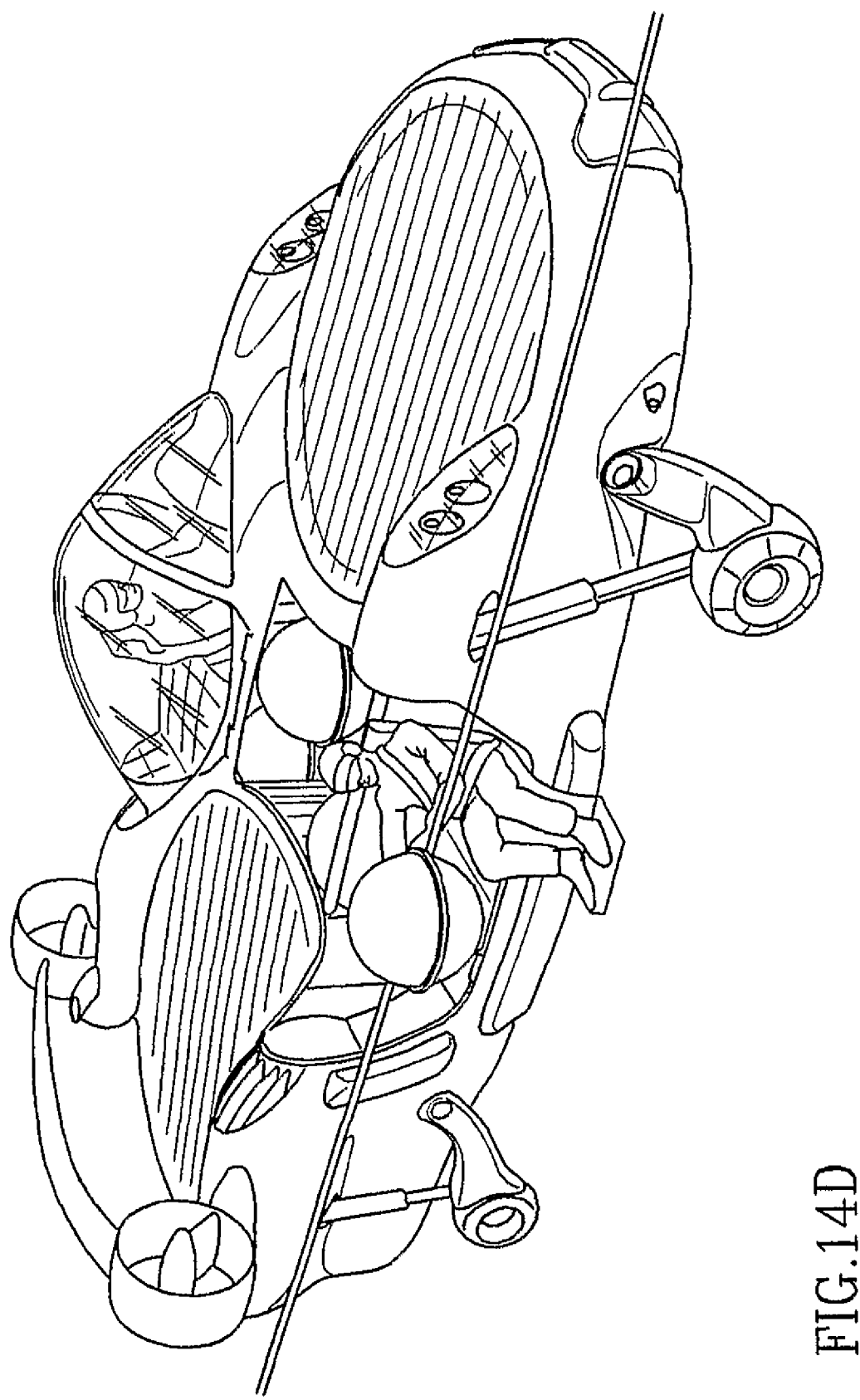

FIG. 14d illustrates how the basic vehicle of FIG. 14a may be used to perform various utility operations such as electric power-line maintenance. In the example shown if FIG. 14d, a seat is provided for an operator, facing outwards towards an electric power-line. For illustration purposes, the operator is shown attaching plastic spheres to the line using tools. Uninstalled sphere halves and additional equipment may be carried in the open space behind the operator. Similar applications may include other utility equipment, such as for bridge inspection and maintenance, antenna repair, window cleaning, and other applications. One very important mission that the utility version of FIG. 14d could perform is the extraction of survivors from hi-rise buildings, with the operator assisting the survivors to climb onto the platform while the vehicle hovers within reach.

Figure 14E:
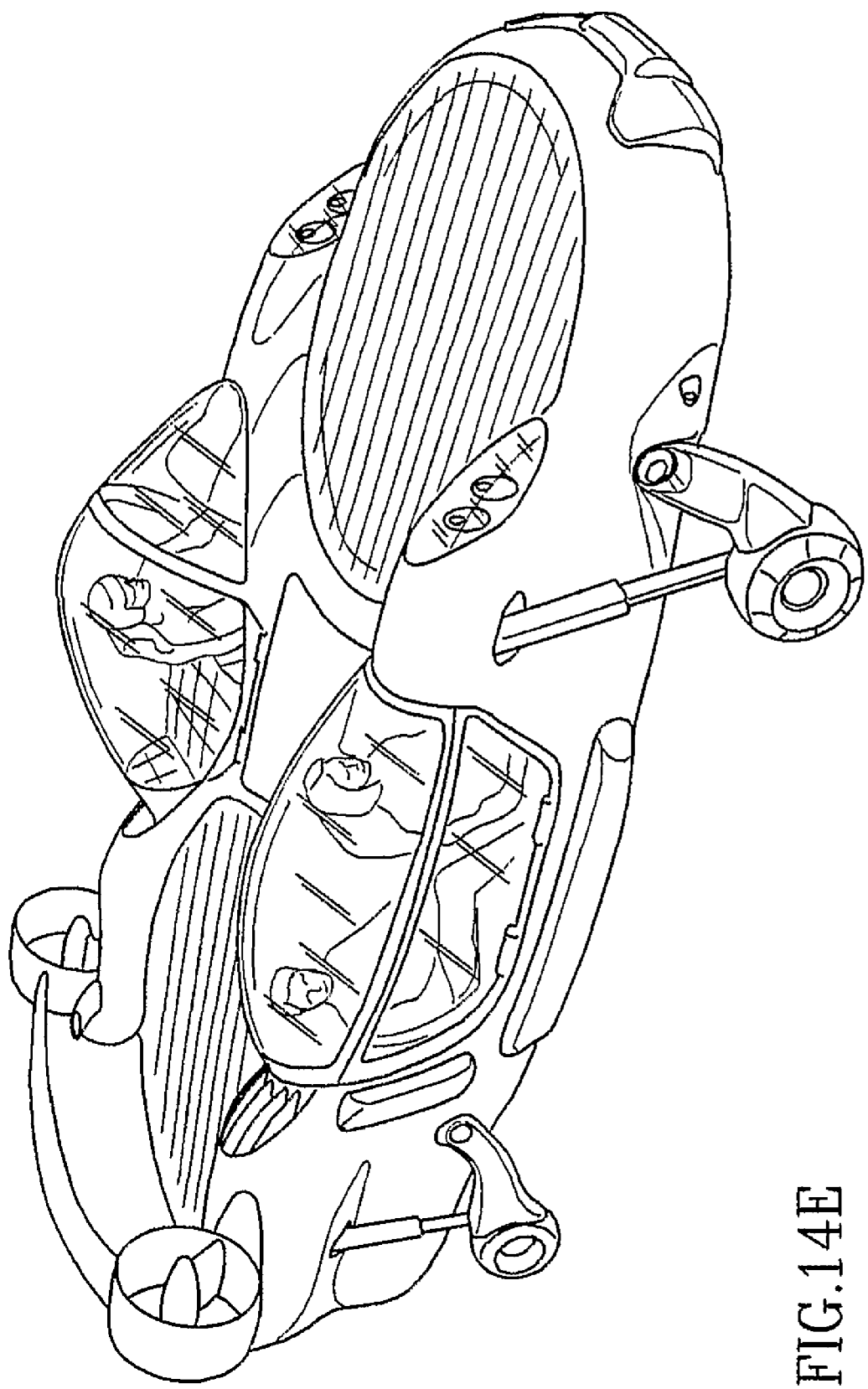

FIG. 14e illustrates how the basic vehicle of FIG. 14a may be used to carry personnel in a comfortable closed cabin, such as for commuting, observation, performing police duties, or any other purpose.

Figure 15:
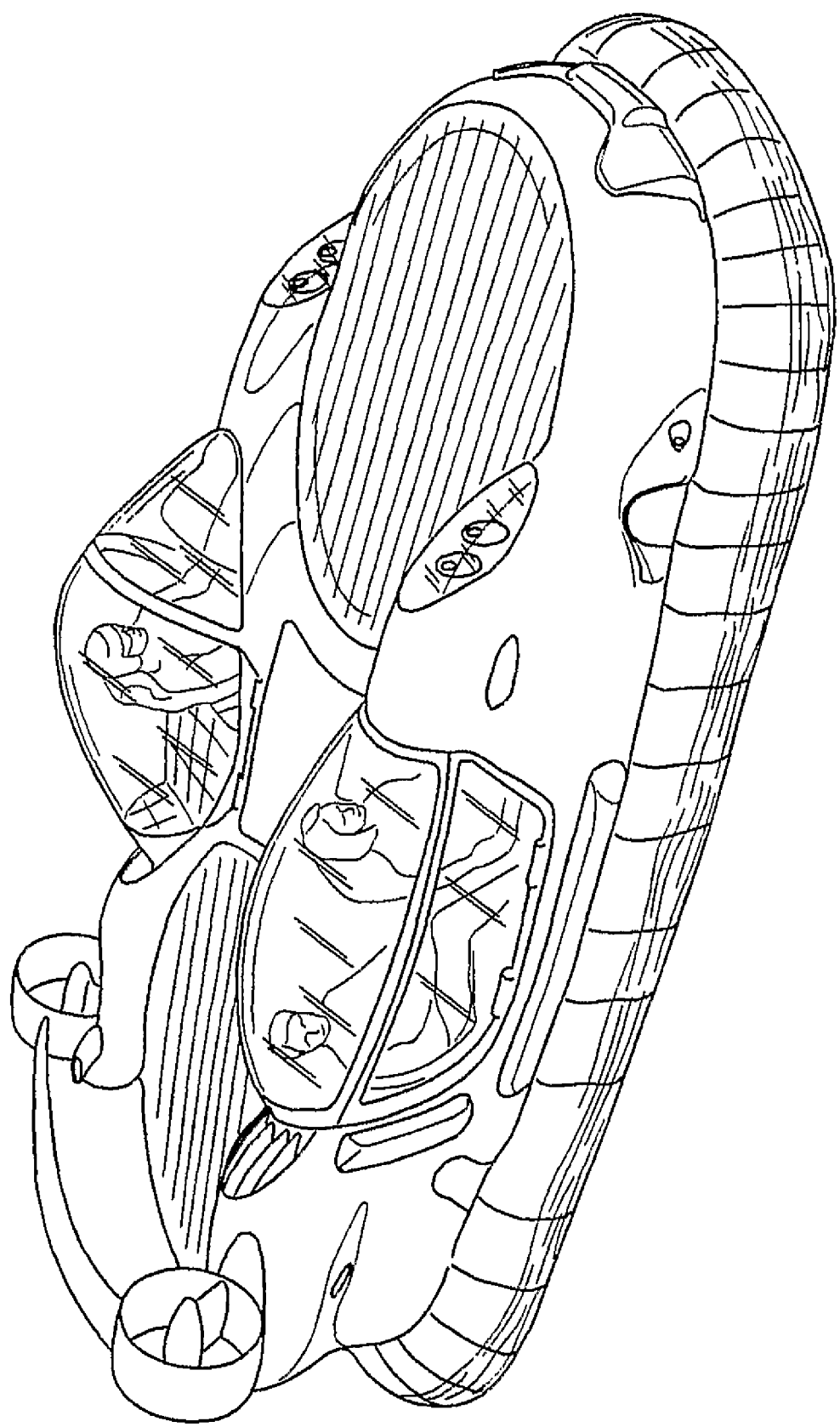
FIG. 15 is a pictorial illustration of a vehicle constructed typically in accordance with the configuration in FIGS. 14a-14e but equipped with a lower skirt for converting the vehicle to a hovercraft for movement over ground or water.

FIG. 15 is a pictorial illustration of a vehicle constructed typically in accordance with the configuration in FIG. 14 but equipped with a lower, flexible skirt for converting the vehicle to a hovercraft for movement over ground or water. While the vehicle shown in FIG. 15 is similar to the application of FIG. 14e, a skirt can be installed on any of the applications shown in FIG. 14.

While FIGS. 14-15 show a vehicle having a cockpit on the left hand side and a payload bay to the right hand side, it is appreciated that alternative arrangements are possible, such as where the cockpit is on the right hand side and the payload bay is on the left hand side. All the descriptions provided in FIGS. 14-15 apply also to such an alternative configuration.

FIG. 16 illustrates four top views of the vehicle of FIGS. 14a-14e with several payload arrangements:

FIG. 16a is the basic vehicle with an empty platform on the right band side of the vehicle. FIG. 16b shows the arrangement of the right band side compartment when configured as a rescue module. FIG. 16c shows the conversion of the RHS compartment for carrying up to two observers or passengers. FIG. 16d has two functional cockpits, needed mostly for pilot's instruction purposes. It should be emphasized that similar arrangements can be configured if so desired, with the pilot's compartment on the RHS of the vehicle, and the multimission payload bay on the left.

FIG. 17 is a see-through front view of the vehicle of FIG. 16a showing various additional features and internal arrangement details of the vehicle. The outer shell of the vehicle is shown in 1701. The forward ducted fan 1703 has a row of inlet vanes 1718 and a row of outlet vanes 1717 used together to maneuver the vehicle in roll and in horizontal side-to side translation. Detail A shows, as an example, the first five vanes being the closest to the RHS of the vehicle. These vanes are shown mounted at angles A5-A1 that are increasing progressively from nearly vertical mounting for vane 5 to some 15 degrees of tilt shown as the angle A1 in the figure. The progressive deflected mounting of the first rows of vanes align their chord line with the local streamlines of the incoming flow. This does not inhibit these vane's fall motion to both directions of deflection around their basic mounting angles. It should also be emphasized, that a similar, anti-symmetric arrangement of the vanes is used on the opposite side of the duct shown (LHS of the vehicle). Similarly, the vanes attached at the inlet to the aft duct, are also tilted as required to orient themselves with the local inflow angle at each transverse position along the duct, where the angle is preferably averaged over the longitudinal span of each vane. This unique configuration of vanes can be varied in angles as a result of aerodynamic behavior of the incoming flow and due to engineering limitations. This configuration can be also used with any row of inlet vanes or outlet vanes installed on any single or multiple ducted fan vehicles.

The RHS engine of the vehicle 1708, is shown mounted inside its enclosure 1702, and below the air inlet 1709. It is connected to a 90 degree gearbox 1710, which is connected through a shaft (not shown) to a lower 90 degree gearbox 1720. From there, through a horizontal shaft, the power is transmitted to the main gearbox 1721 that also supports the lift producing rotor 1716. A similar arrangement for the LHS engine may be used (not shown). The pilots compartment (cockpit) 1706 has a transparent top (canopy) of which the outer panel 1713 is hinged, to permit the pilot 1711 to enter and exit the cockpit. The pilot's seat 1712 may either be normal, or a rocket deployed ejection seat to facilitate quick egress of the pilot from the cockpit through the canopy, if the need arises. The pilot's controls 1714 are connected to the vehicles flight control system. The vehicle's RHS landing gear wheel 1719 is shown resting on the ground, and the LHS landing gear wheel 1715 is shown optionally retracted into the fuselage for reducing the drag in high speed flight. The vehicles two pusher fans 1704, 1705 are shown mounted on the aft portion, with the wing/stabilizer 1707 generally spanning above and between said fans.

Figure 18:
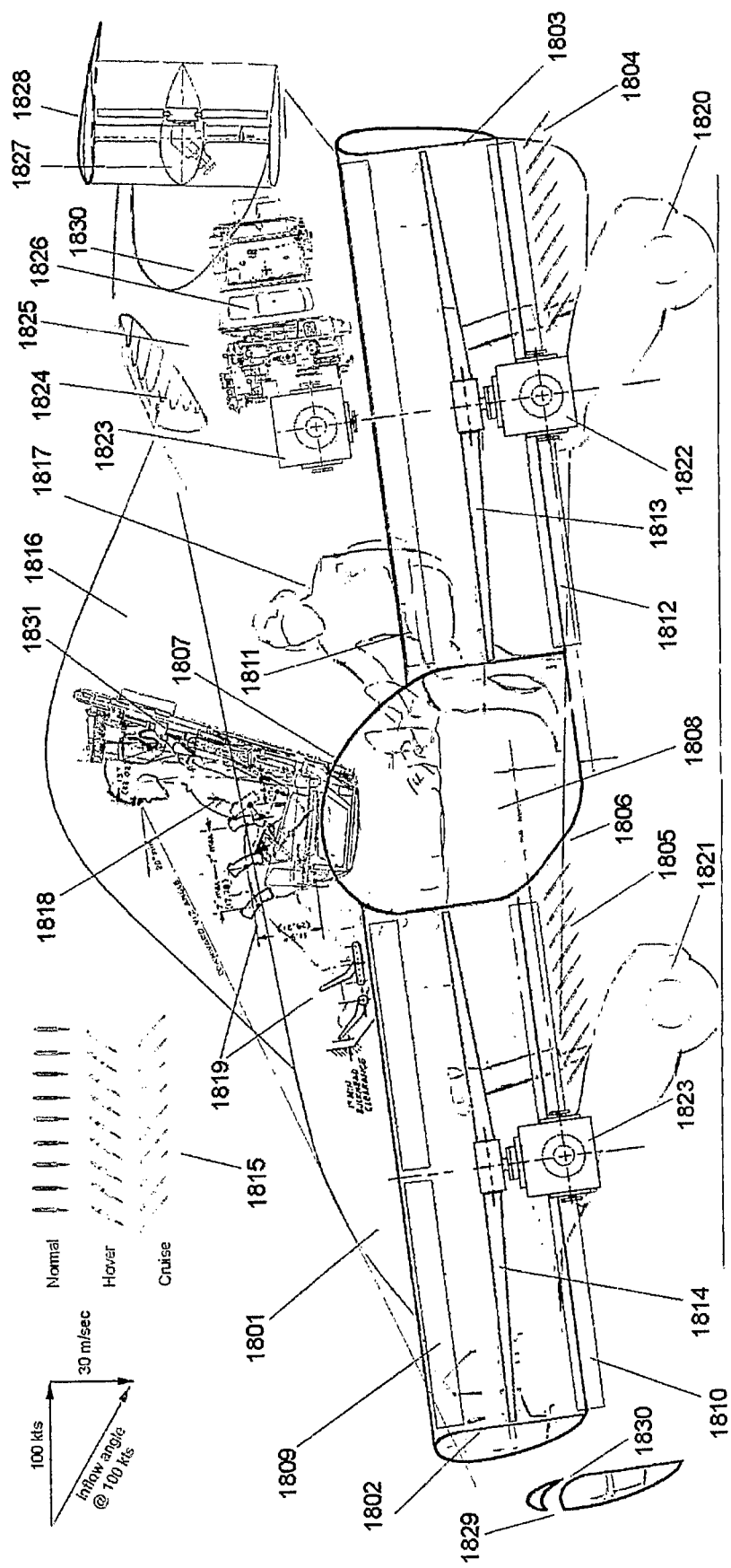
FIG. 18 is a longitudinal cross-section of the vehicle of FIG. 16b showing various additional features and internal arrangement details of the vehicle.

FIG. 18 is a longitudinal cross-section of the vehicle of FIG. 16b showing various additional features and internal arrangement details of the vehicle. The outer shell 1801 covers the whole of the vehicle, and transitions to the engine's enclosure 1825. Inside the shell, a forward duct 1802 and an aft duct 1803 are mounted, inside which a forward main lift propeller 1814 and an aft main lift propeller 1813 are mounted. The ducts and propellers are preferably statically disposed within the vehicle such that they are inclined forward (generally between 5 and 10 degrees although other values may be used) with respect to the vertical and rotated along the transverse axis of the vehicle, to better accommodate the incoming airflow at high speed. The forward duct 1802 has rows of longitudinal vanes 1809 at its inlet, as well as rows of longitudinal vanes 1810 at the exit. These vanes are predominantly used to control the vehicle in roll as well as lateral side-to-side translation. A similar set of longitudinally oriented vanes 1811 & 1812 are mounted at the entrance and exit of the aft duct 1803, respectively. Optionally, additional vanes, mounted in a transverse orientation may be mounted at the exit of the forward and aft duct, shown respectively as 1805 & 1804. These vanes are movable, and used to deflect the air exiting from the ducts, as shown schematically in 1815 for various flight regimes of the vehicle. FIG. 18 is generally a cross section through the center of the vehicle looking right, although it was decided to leave the pilot's compartment, and LHS engine and pusher fan installation visible for reference. The lower area of the center fuselage section of the vehicle 1808 serves as the main fuel tank. The outer shape of this body to its fore-aft sides is molded to serve the geometrical needs of both ducts 1802 & 1803. The lower side of the center fuselage has a cutout 1806 to ease the flow exiting the forward duct 1802 to align itself with the overall air flow around the vehicle at high speed flight. The upper portion 1807 of the center fuselage 1808 is suitably curved for accelerating the air entering the aft duct 1803, and thereby create a low pressure area on the top of the fuselage, relieving some of the lift production burden off the main lifting propellers 1813 & 1814. This upper portion 1807 of the center fuselage can also facilitates the mounting of a parachute/parafoil which will be used in emergency situations either to get to the ground safely or even to continue forward flight with the pusher fans thrust. The pilot 1818 is shown seated on his seat 1831 which may either be normal, or a rocket deployed ejection seat to facilitate quick egress of the pilot from the cockpit through the canopy, if the need arises. The pilot's controls 1819 are connected to the vehicles flight control system. Also shown in FIG. 18 is one of the two the engines used in the vehicle shown as 1826 mounted inside its outer shell 1825 and below the air intake 1824. The 90 degree gearbox 1823 transmits the rotational power from the engine 1826 to the lower gearbox through a shaft. This lower gearbox (gearbox, shaft not shown) then connects to the main aft lifting propeller gearbox 1822, which also supports the propeller 1813. An interconnect shafting mechanism (not shown) further distributes the power to the forward gearbox 1823 that also supports the forward main lifting propeller. Also visible in FIG. 18 is one of the pusher fans 1827, and a cross section through the stabilizer 1828 mounted above and between the pusher fans. It can also be noticed that a curved line 1830 forms a break in the smooth lines of the engine enclosure 1825, and the forward boundary for a deep cutout into enclosure 1825. The cutout is used to direct outside air to the pusher fans. The general shape of the curved line 1830 can also be seen in any one of the top views of FIG. 16. The forward end of the forward duct 1802 may have an optional forward facing circumferential slot 1829 that runs generally across the forward ¼ circle of the duct 1802. The slot faces the incoming flow, in a region of the flow that is high (near stagnation) pressure. The air coming into the slot is accelerated due to the geometric internal shape that is generally contracting, and is channeled through a second, inner slot 1830, at an air velocity that is greater than the flow inside the duct, and generally tangentially with the inside wall of the duct 1802. The resulting low pressure area created by this fast airflow from the slot and into the duct, affects the air above it flowing over the outer (upper) lip of the duct and provides suction to attach the latter flow to the duct's inner surface, and avoid flow separation at high speed. A second role played by the slots 1829 & 1830 is to direct some of the air flowing through duct 1802 through an additional opening, thereby reducing the amount of air flowing in above the duct's lip, and so also reducing the overall pitching moment (having an adverse effect on the vehicle) created by the forward duct at high speed flight. It should be noted that the slot 1829 may also have an optional door or doors to facilitate opening of the bypass airflow only as flight speed is increased. Such door/doors, if used, my be activated externally through an actuator or mechanism, or alternatively rely on the pressure distribution and difference between the inside and outside of the duct, to self-activate a spring loaded door or doors, as required. The landing gear wheels 1821 & 1820 are shown in the landing gear's extended position. An option (not shown) exists for retracting all four landing gears into the fuselage shell 1801 to reduce drag in high speed flight.

Figure 19:
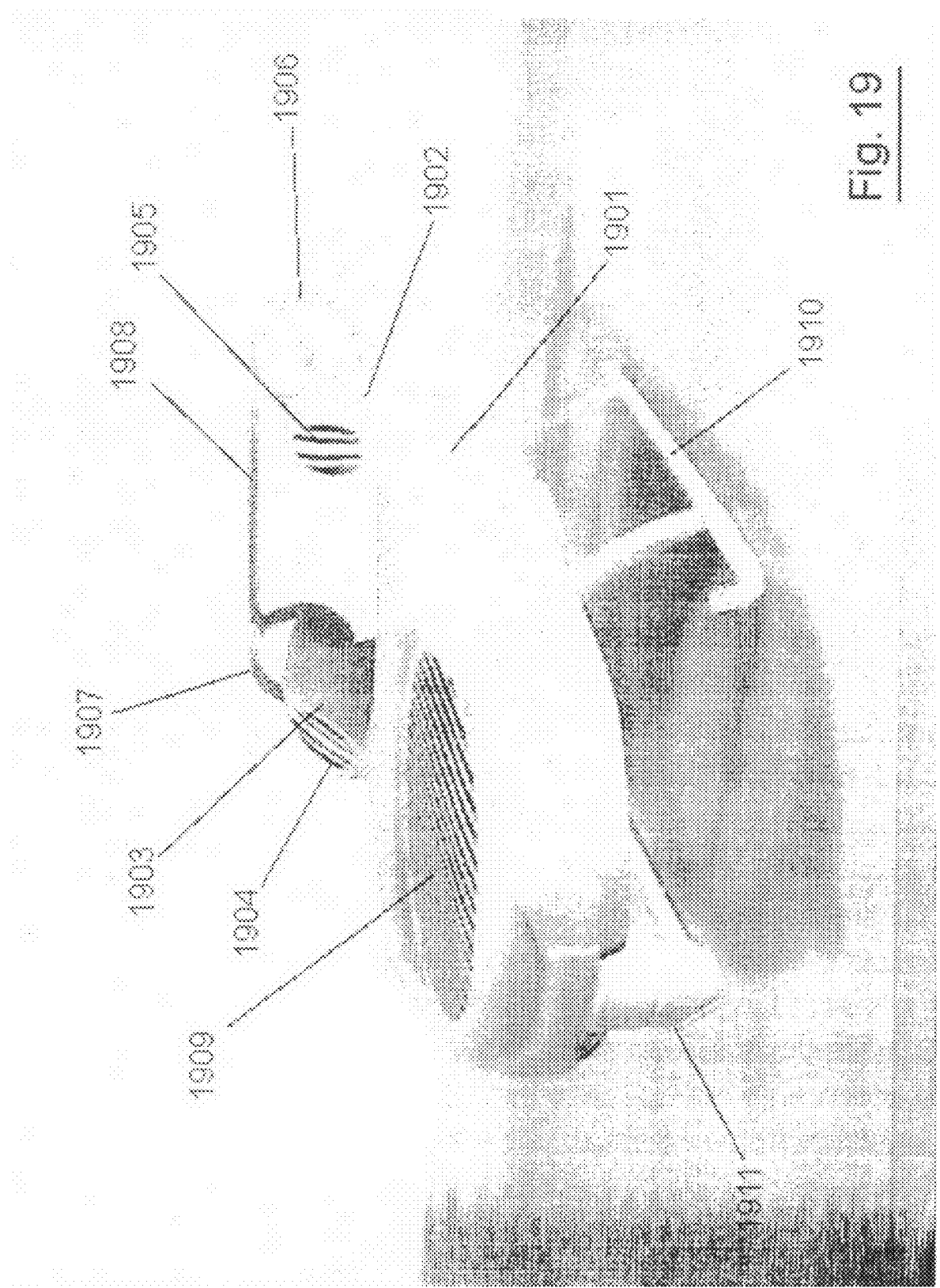
FIG. 19 is a pictorial illustration of an Unmanned application of the vehicle having similar design to the vehicle of FIGS. 16-18, but lacking a pilot's compartment.

FIG. 19 is a pictorial illustration of an Unmanned application of the vehicle. Evident in the picture is the vehicles outer shell 1901 that is lacking any pilot's enclosure. Also visible is the forward duct 1909 with the rows of longitudinally mounted inlet vanes. The RHS engine enclosure 1903 is shown with an intake 1904 generally installed close to the top and to the front of the engine enclosure 1903. A similar arrangement can be seen for the LHS engine enclosure 1902 and the LHS engine intake port 1905. Two pusher fans 1906 & 1907 are shown, with a stabilizer 1908 spanning between them. The vehicle's fixed skid type landing gear is shown in 1910, and a typical pictorial installation of an observation system in 1911.

Figure 20:
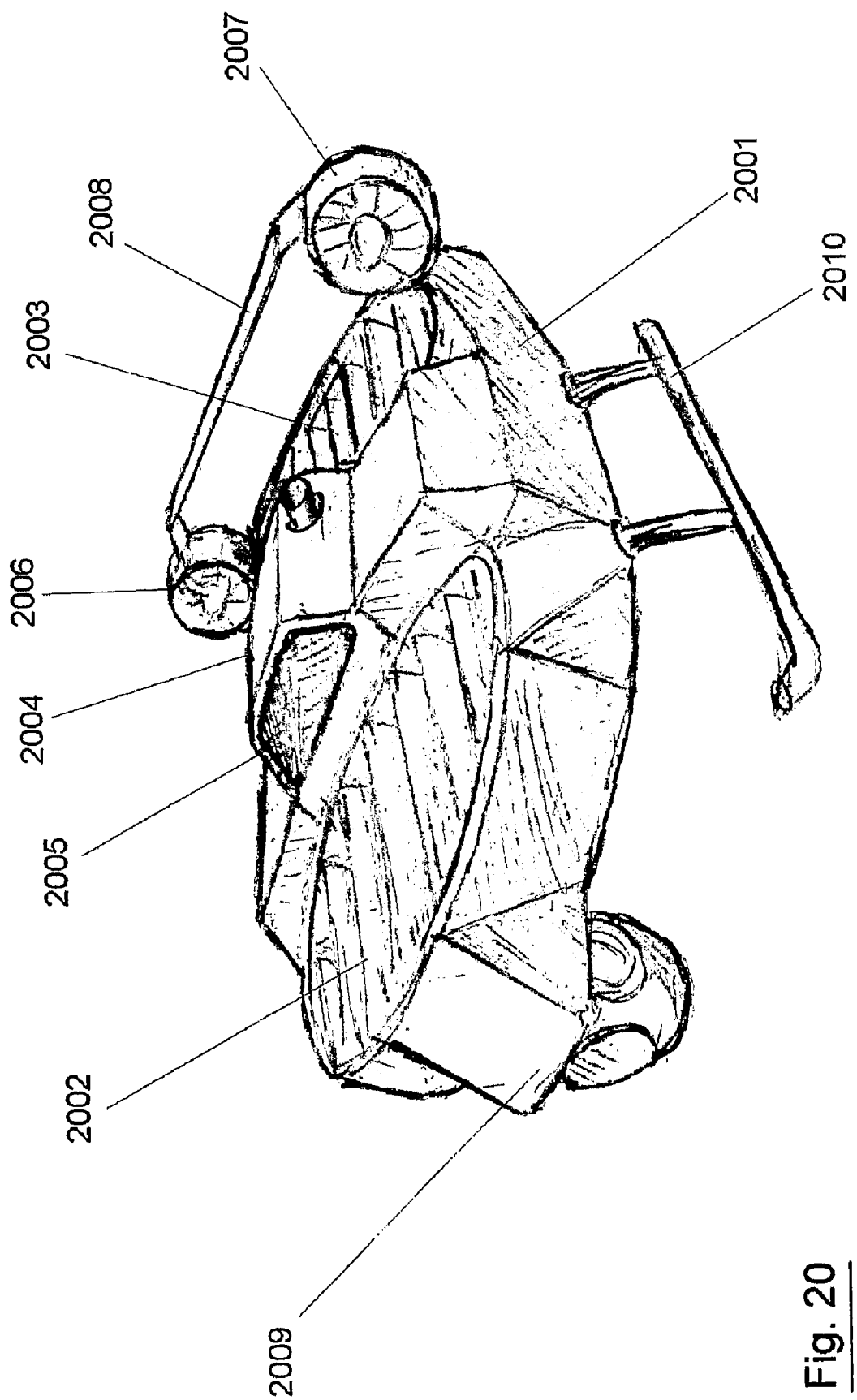
FIG. 20 is a further pictorial illustration of an optional Unmanned vehicle, having a slightly different engine installation than that of FIG. 19.

FIG. 20 is a further pictorial illustration of an optional Unmanned vehicle, having a slightly different engine installation than that of FIG. 19. Here, in a manner similar to that of FIG. 19, the fuselage outer shell 2001 is also lacking a pilot's compartment. However, the vehicle's engine is mounted inside the fuselage in the area schematically shown as 2006. An air intake 2005 supplies air to the engine. Two pusher fans 2006 & 2007 are used, as well as a stabilizer 2008. The forward duct 2002 and aft duct 2003 have longitudinally mounted vanes. A typical pictorial installation of an observation system is shown in 2009. The vehicle's fixed skid type landing gear is shown in 2010.

Figure 21:
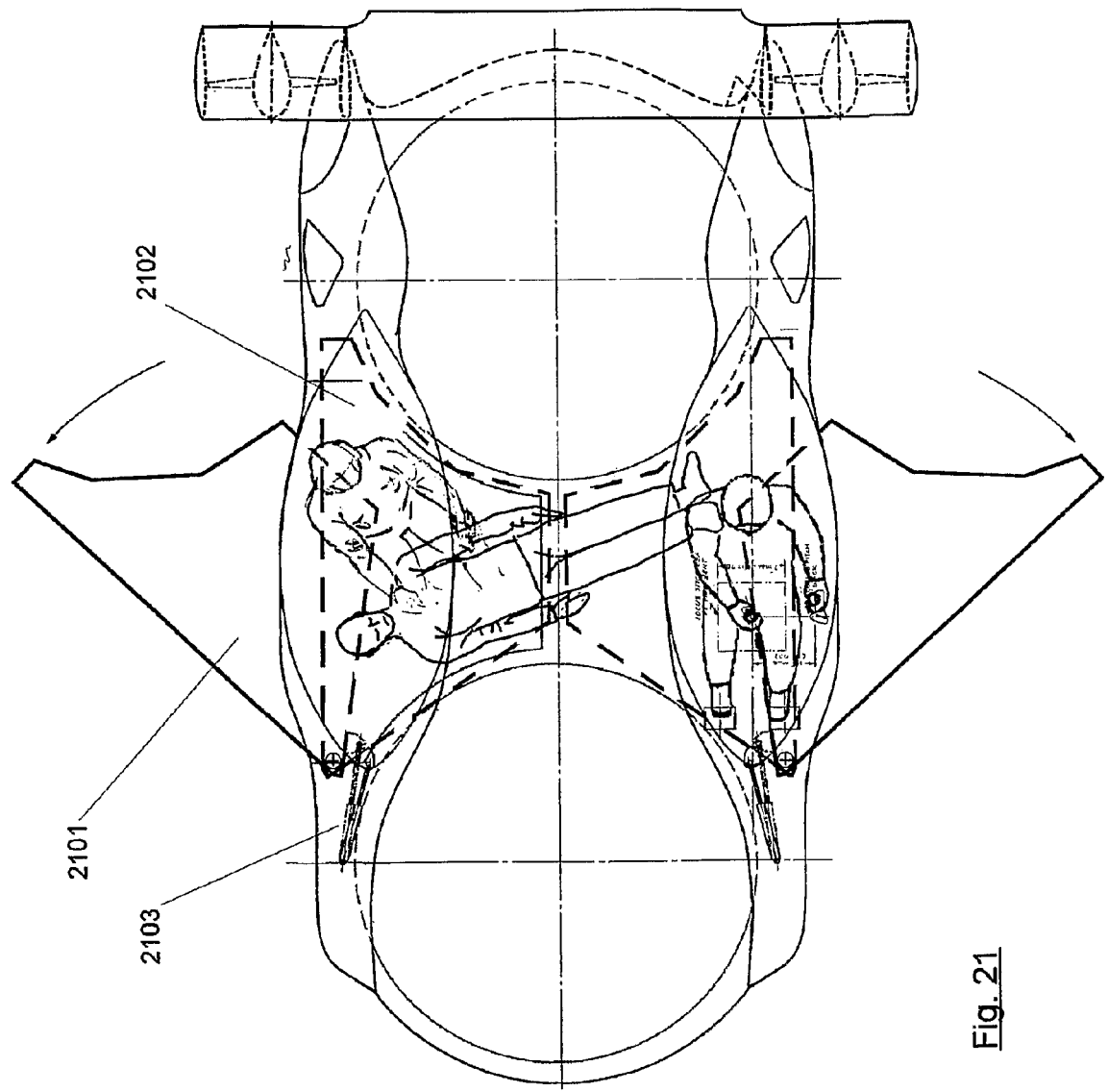
FIG. 21 is a top view showing the vehicle of FIG. 16b as equipped with a extendable wing for high speed flight.

FIG. 21 is a top view showing the vehicle of FIG. 16b equipped with an extendable wing for high speed flight. The RHS wing is designated 2101 in the extended position and 2102 when folded under the fuselage. An actuator 2103 is used for extending and retracting the wing as desired. The LHS wing is similar, as evident in the drawing.

Figure 22:
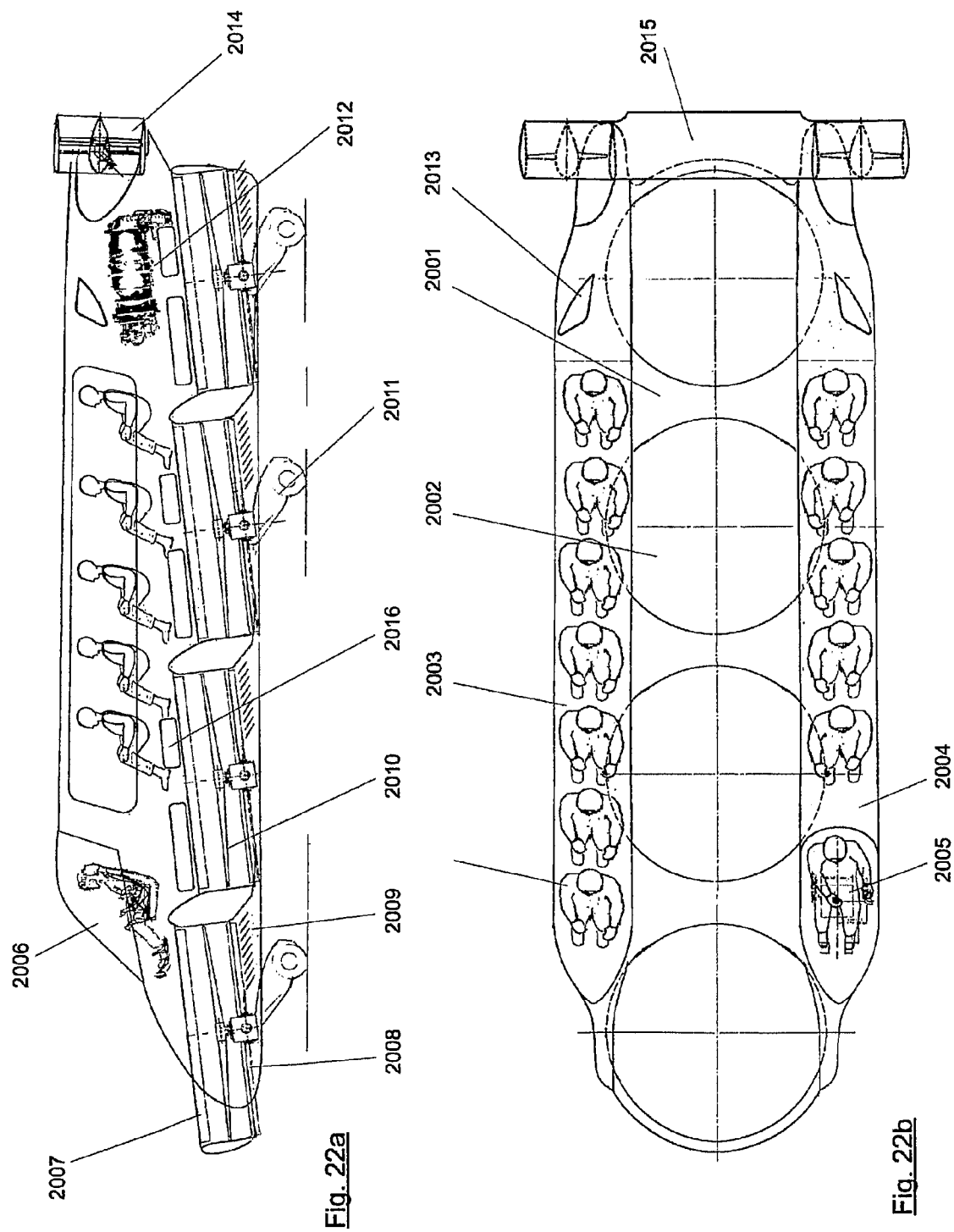
FIGS. 22a and 22b are side and top views, respectively, illustrating a VTOL vehicle having a plurality of lifting fans to facilitate increased payload capability.

FIG. 22a-22b are side and top views, respectively, illustrating a VTOL vehicle that employs a plurality of lift generating fans, arranged one behind the other, all connected to a common chassis, for the purpose of carrying an increased payload over that which is possible with two lifting ducted fans. A chassis designated 2001 houses a number of ducted fans 2002 for generating lift. The fans may be tilted slightly forward as shown in FIG. 22a to achieve higher speed in cruise. Two elongated cabins 2003 and 2004 are preferably located on both sides of the ducted fans to accommodate passengers or other cargo. A pilot 2005 may be seated in a cockpit 2006 at the front end of one of the cabins, such as the left cabin 2004. Two engines 2012 are located to the aft of the cabins and have air intakes 2013. Two variable pitch pusher fans 2014, enclosed in shrouds, are mounted to the rear of the cabins. A stabilizer 2015 is mounted between the pusher fans to facilitate nose-down trimming moments in forward flight. Multiple inlet roll, yaw and side force control vanes 2007 are preferably mounted longitudinally in all ducts, supplemented by similar vanes 2008 at the duct's exits. Transversally mounted guide vanes 2009 may also be mounted to reduce friction losses and flow separations of the flow exiting from the ducts. Side openings 2016 may be optionally installed to enable outside air to be mixed with inflow from above, reducing the impact that the cabins may have on thrust augmentation of the ducted fans as well as the control effectiveness of the vanes installed in the inlets to these ducted fans. A variable pitch fan (rotor) 2010 is mounted in each duct. Preferably, one half of the fans (or as close to half as possible, such as in the case of a vehicle similar to that shown in FIG. 22 but having an odd number of lifting ducted fans) turn in the opposite direction as the other half. A plurality of landing gears 2001 support the vehicle on the ground and serve to attenuate the landing impact. Some of the wheels employed in the landing gear may be powered, or alternatively, forward ground movement can be accomplished through the use of the variable pitch pusher fans.

Figure 23:
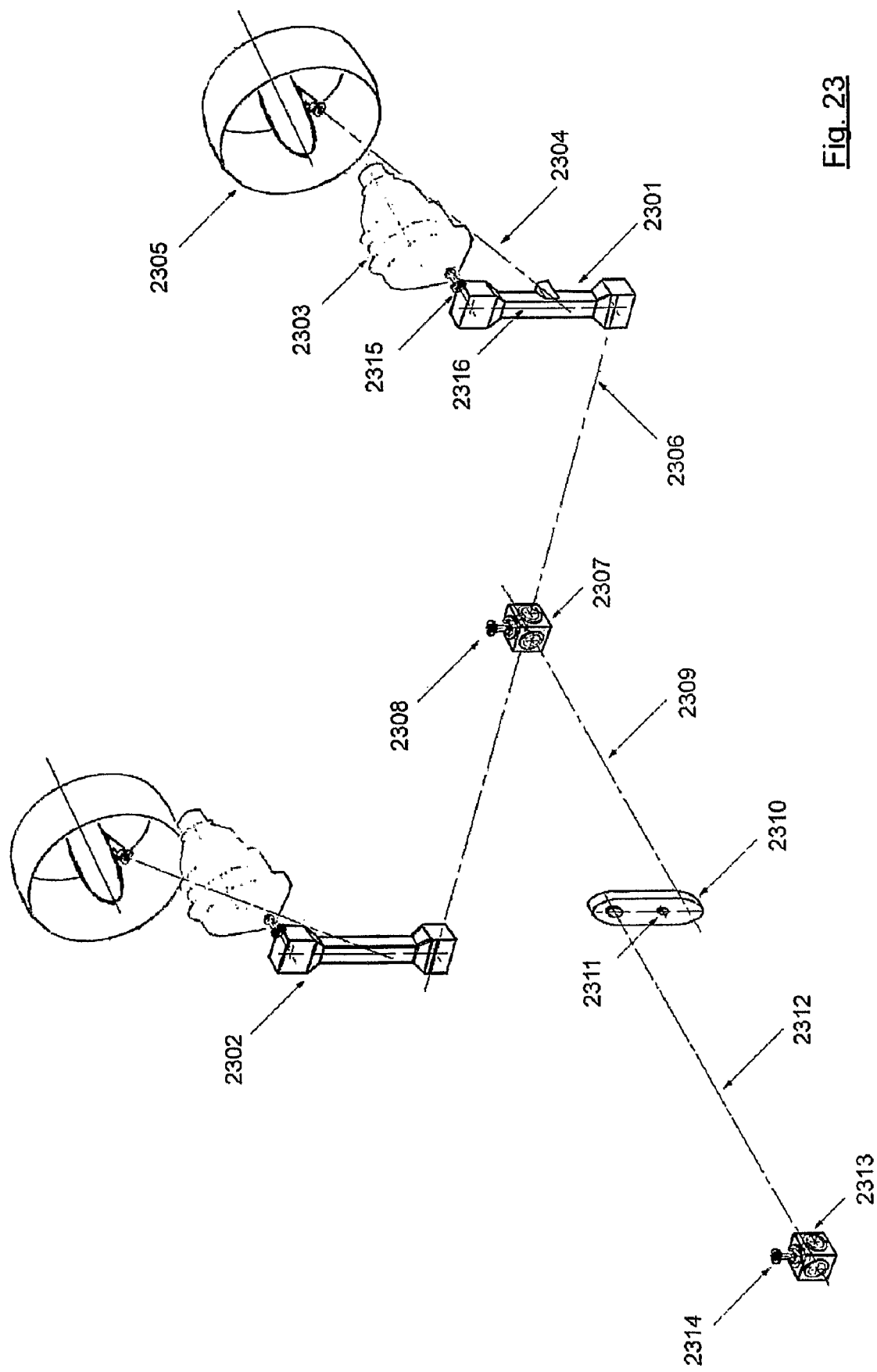
FIG. 23 is a schematic view of the power transmission system used in the vehicles of FIGS. 14-19.

FIG. 23 shows an optional arrangement of a power distribution system for transmitting the power from each of the rear mounted engines to the two lifting fans and two pusher fans such as found in the vehicles shown in FIGS. 14-19. As can be seen, two engines 2303 are preferably used to drive the two main lift rotors and the two pusher fans through a series of shafts and gearboxes. The power takeoff (PTO) of each engine is connected through a short shaft 2315 to the RHS and LHS Aft Transmissions designated 2302 and 2301 respectively. From these transmissions, the power is distributed both to the aft pusher props through diagonally oriented shafts 2304 as well as to the Aft Rotor Gearbox 2307 through two horizontally mounted shafts 2306. The two main lift rotors are connected to their respective gearboxes through prop flanges 2308. The shaft interconnecting both main lift rotors is divided into two segments designated as 2309 and 2312, connected by a Center Gearbox 2310 through flexible joints. This center gearbox serves mainly to move the rotation center in parallel and connect both shafts 2309 and 2312 without affecting the direction of rotation (i.e. employing an uneven number of plane gears mounted along its length). At least one of the intermediate gears in Center Gearbox 2310 has a shaft that is open to the outside designated as 2311, enabling power for accessories on either side of the face of Gearbox 2310, resulting in opposing directions of rotation (rotors not shown). The rotors preferably turn in opposite directions to eliminate torque imbalance on the vehicle.

Figure 24:
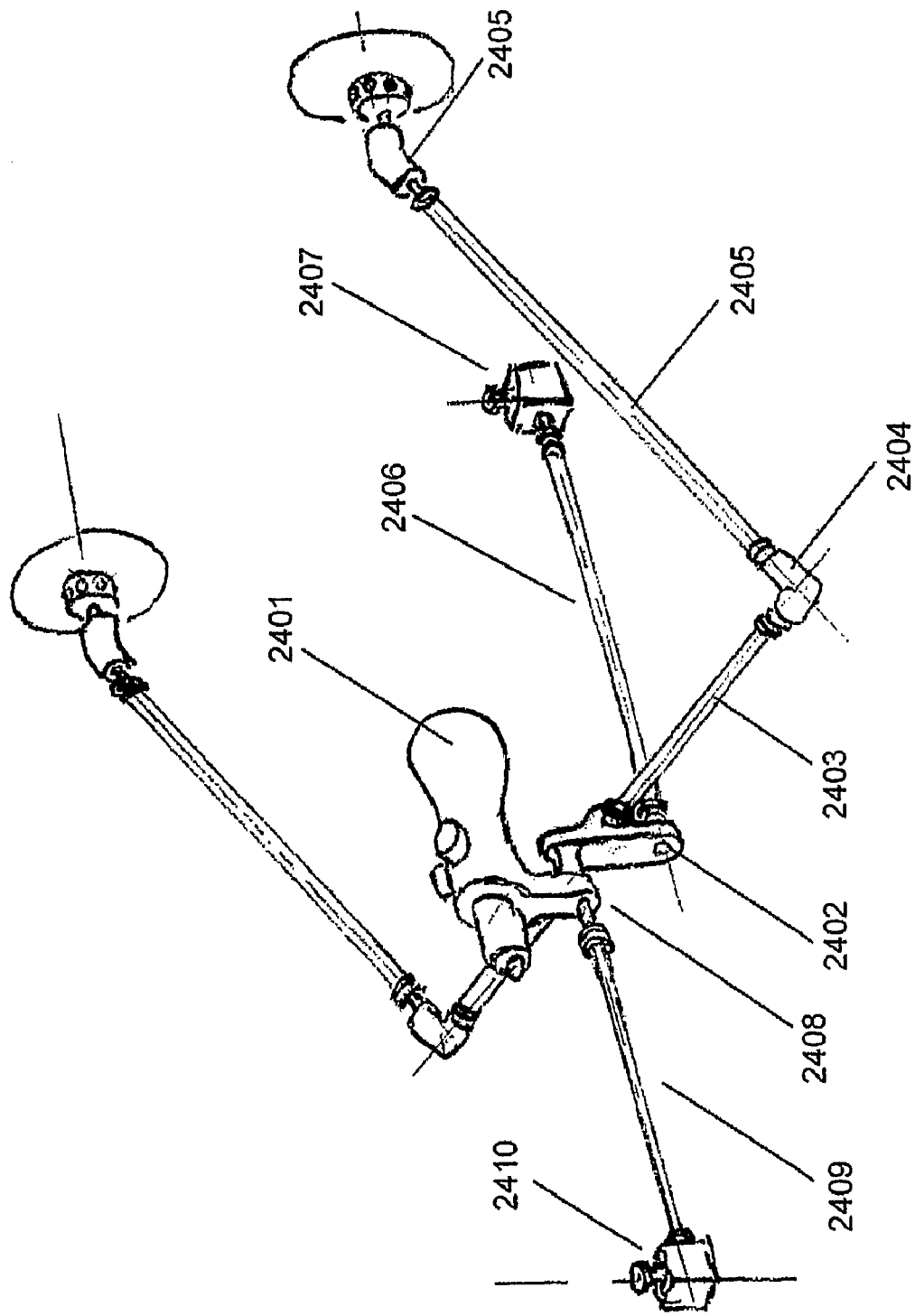
FIG. 24 is a schematic view of the power transmission system used in the vehicle of FIG. 20.

FIG. 24 shows an optional arrangement of a power distribution system for transmitting the power from a centrally mounted engine, or from two engines forming a 'twin-pack', to the two lifting fans and two pusher fans such as found in the vehicles typical of FIG. 9 and FIG. 20. As can be seen, the engine, designated as 2401 is used to drive the two main lift rotors and the two pusher fans through a series of shafts and gearboxes. The power takeoff (PTO) of the engine designated as 2408 is connected through a short shaft to a central Transmission designated 2402. An extension of the same shaft designated as 2409 transmits power directly to the forward lift fan gearbox designated as 2410. From the central transmission 2402, the power is distributed both to the aft lift fan gearbox through a shaft designated as 2406 as well as to two angled gearboxed such as 2404 through two horizontally mounted shafts 2403. From the angled gearboxes, two diagonal shafts 2405 transmit power to the aft pusher prop gearboxes 2405. The central transmission 2402 may also have an additional shaft that is open to the enabling power for accessories (rotors not shown). The rotors preferably turn in opposite directions to eliminate torque imbalance on the vehicle.

FIG. 25*a* shows a schematic cross section and design details of an optional single duct unmanned vehicle. The vehicle includes a power plant designated as 2502, which may be based on turboshaft technology as shown schematically in FIG. 25*a*, although other means of propulsion are possible. A circumferential duct designated as 2501 surrounds the rotor (lifting fan) designated as 2504. The duct 2501 may also serve to house the flight control and communication equipment as well as the fuel for the duration of the mission. A fuel sump with pump is designated as 2505. A gearbox designated as 2503 is used to reduce the rotational speed of the engine's shaft to match that required by the fan 2504. Two layers of vanes (2506 and 2508) are used to control the vehicle in roll, pitch, yaw and lateral and longitudinal translations. The vanes layers are preferably oriented in multiple planes as will be explained with reference to FIG. 25*c*. A payload typically consisting of a video camera may be housed in the clear spherical compartment designated by 2512.

FIG. 25*b* shows an alternative lifting fan arrangement where two rotors 2510 and 2511 rotate in opposite direction to cancel the torque effect that one fan, such as 2504, would have on the vehicle. A slightly larger gearbox designated as 2509 is used to rotate the two rotors in opposite directions through concentric shafts.

FIG. 25*c* shows different arrangements of vanes in the inlet to the duct, generally designated as view "A" in FIG. 25*a*, but also typical for the bottom (exit) layer of vanes 2508. While the arrangements of FIG. 25*c* show a number of possibilities, many additional arrangements are possible. The common principle in the in-plane vanes arrangements of FIG. 25*b* designated 2513 thru 2519 is that typically one half of the vanes are oriented at an angle (typically 90 degrees but other angles are possible) to the other half, so as to produce any combination of force components that will result in a single equivalent force in any direction and magnitude in the plane of the vanes, be it the inlet vanes designated as 2506 in FIG. 25*a* or the exit vanes designated as 2508 in FIG. 25*a*. Various vane configurations are possible, such as the square pattern in FIG. 2516, the cross pattern in FIG. 2517, and the weave pattern in FIG. 2518.

Figure 26:
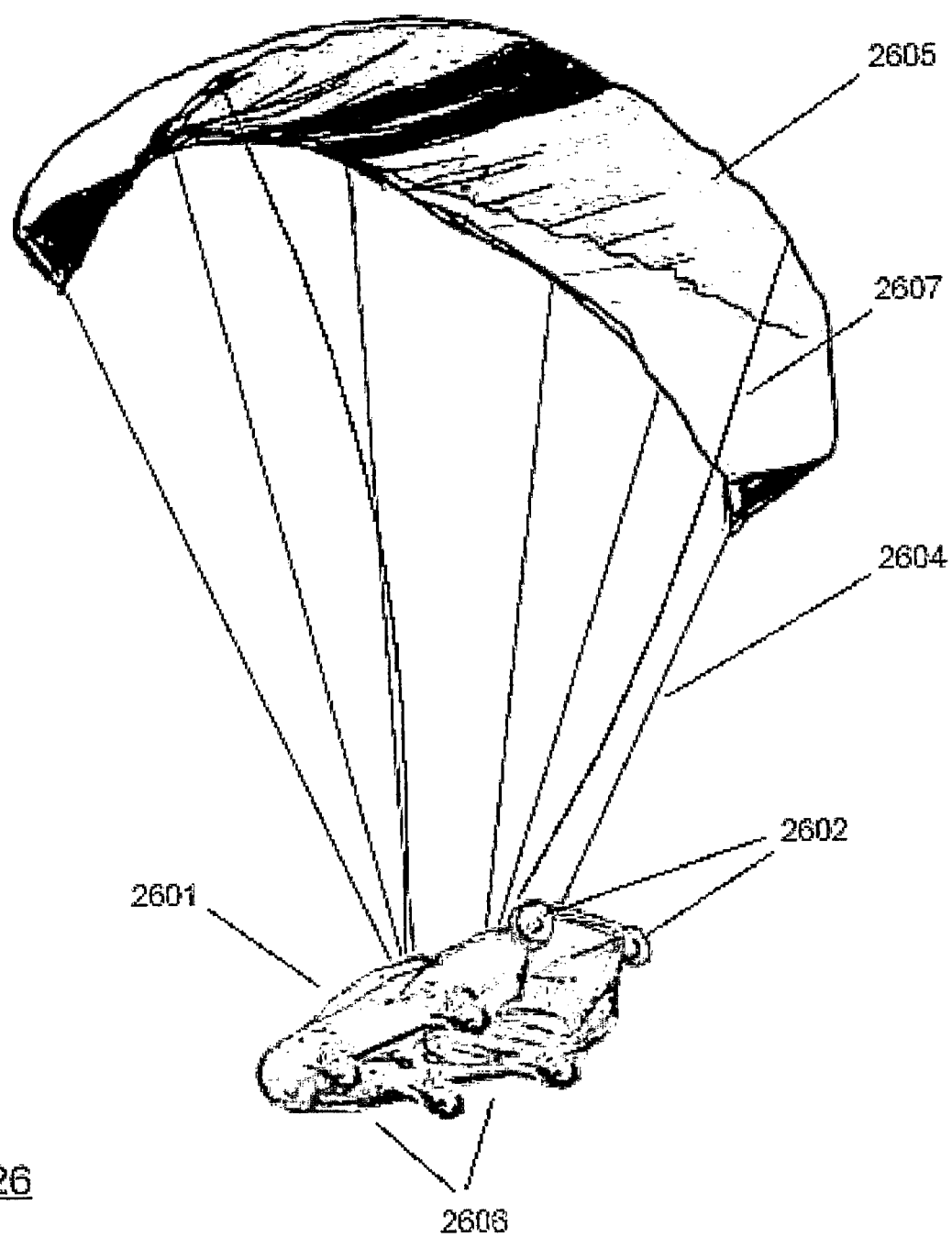
FIG. 26 is a pictorial illustration of a ram-air-'parawing' based emergency rescue system.

FIG. 26 is a pictorial illustration of a ram-air-'parawing' based emergency rescue system. In an emergency, or for other purposes such as extended range, the ducted fan vehicle (manned or unmanned) designated as 2601 need not rely on its lifting fans (2606) to generate lift, but may instead release a lift generating ram-air 'parawing' shown pictorially and designated as 2605. Optionally, the 'parawing' may be steered through the use of steering cables shown schematically and designated as 2607. In the event that the vehicle's pusher fans designated as 2602 are operative, the vehicle can carry on in level flight to its destination. Upon reaching its destination, the vehicle can release the 'parawing' (2605) and continue flying using its lift fans (2606), or may elect to land using the 'parawing (2605) still attached to the vehicle. Alternatively, if the pusher fans (2602) are not producing sufficient thrust, the 'parawing' (2605) will glide the vehicle down to land, preferably extending its glide ratio significantly over a spherical 'standard' parachute.

Figure 27:
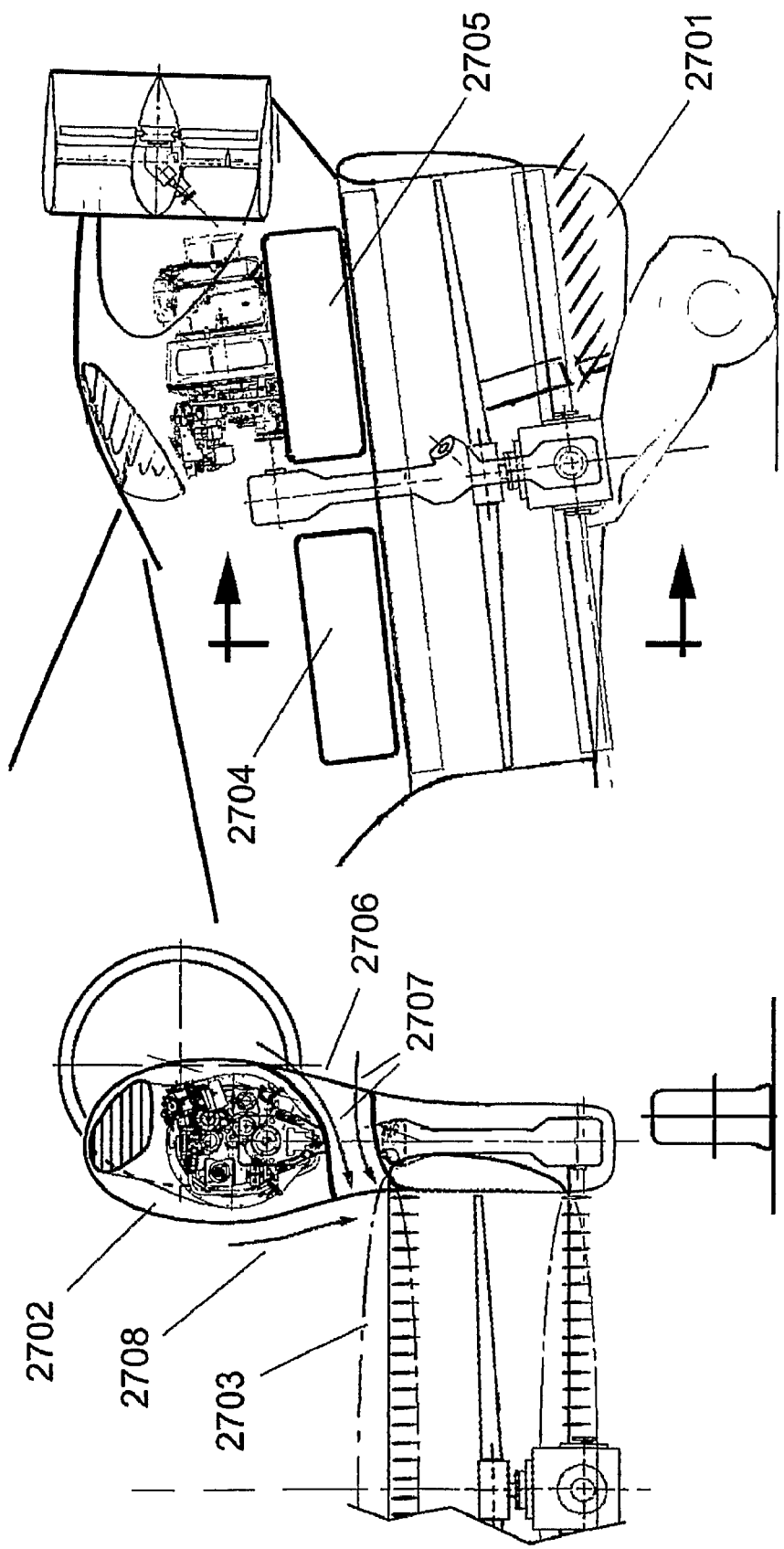
FIG. 27 illustrates optional means of supplying additional air to lift ducts shielded by nacelles from their sides.

FIG. 27 illustrates optional means of supplying additional air to lift ducts shielded by nacelles or aerodynamic surfaces from their sides, typical of the aft lift fans of the vehicles described in FIGS. 1, 5, 6, 8, 9 and 11-22. In FIG. 27, a lift generating ducted fan designated as 2703 is preferably partially shielded from the air around it by a nacelle 2702. Openings for the air, designated as 2704 and 2705, permit outside air to flow (2707) in through a channel (2706) from the sides and combine with the inflow from above (2708) to create relatively undisturbed flow conditions for the ducted fan (2703). With the openings 2704 and 2705 in place, the impact of the nacelle on thrust augmentation of the ducted fan as well as the control effectiveness of the vanes is minimized. Preferably, the exit portions of openings 2704 and 2705 meet and is substantially aligned with an upper lip of the duct of ducted fan 2703.

Figure 28A:
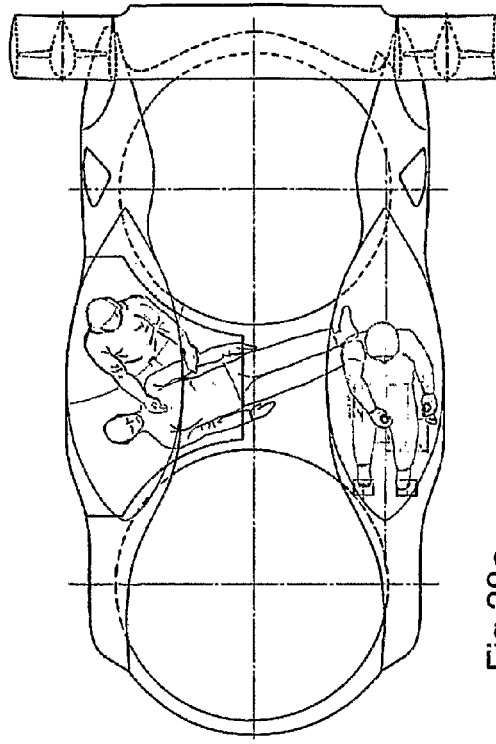
FIGS. 28a-28e are more detailed schematic top views of the medical attendant station in the rescue cabin of the vehicle described in 14b, 14c and 16b.
Figure 28E:
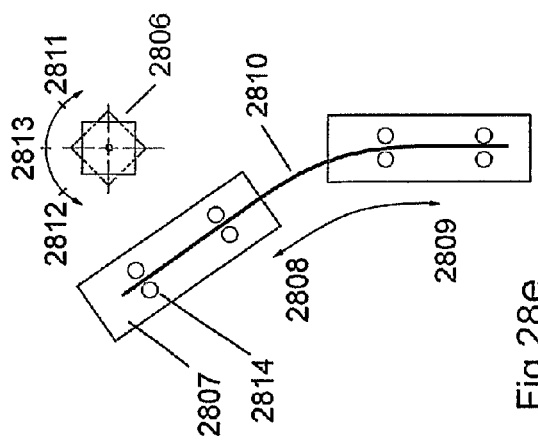
Figure 28D:
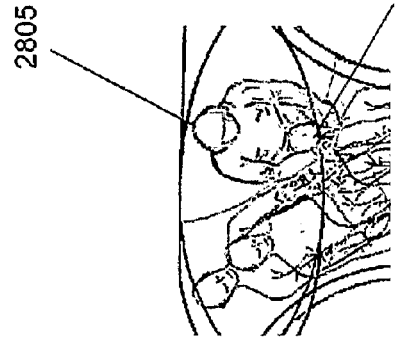
Figure 28C:
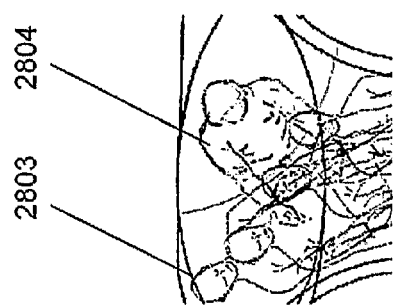
Figure 28B:
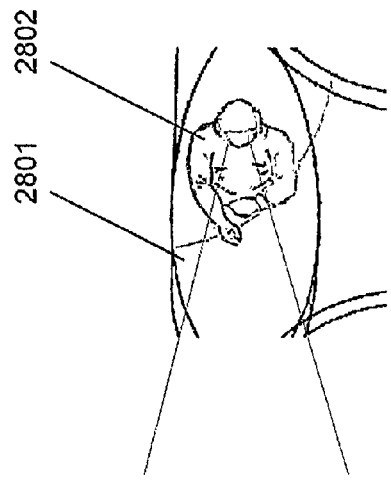

FIGS. 28*a*-28*e* are more detailed schematic top views of the medical attendant station in the rescue cabin of the vehicle described in 14*b*, 14*c* and 16*b*. FIG. 28*a* shows schematically how the cabin is laid out with respect to the vehicle. FIG. 28*b* illustrates the medical attendant designated as 2802 seated facing forward, resting his/her arms on table 2801. FIG. 28*c* shows the medical attendant in seat's intermediate position, enabling medical attendant to reach comfortable the chest and abdomen area of patient designated as 2803, lying on a litter/stretcher that is free to move along a rail on table 2801, and can be locked in place in any intermediate position. FIG. 28*d* shows the medical attendant in extreme rotated position (2805), and patient litter moved to extreme 'inside cabin' position, to enable medical attendant to reach patient head from behind, necessary for performing procedure of clearing patient's airways. FIG. 28*e* is a schematic depiction of a swiveling seat 2806 that can be used by medical attendant 2802. Also shown schematically in FIG. 28*e* is patient's litter 2807 that is able to move along guiding rail 2810 guided by four wheels or rollers 2814, although a different number of wheels or rollers can be used. When the attendant is facing forward, as 2802 in FIG. 28*b*, and for example when there is no patient on board, the seat 2806 in FIG. 28*e* swivels to its rightmost position as schematically shown in 2811. When the litter is loaded it is normally placed as shown pictorially in FIG. 28*a*, and schematically as 2808 in FIG. 28*e*. In this position, the attendant 2802 swivels on seat 2806 to intermediate position 2813 and has access to patient's chest and abdomen. This seat position corresponds to attendant's position shown pictorially in FIG. 28*c* as 2804. When need arises for attendant to reach the head of patient 2803 from behind, the litter 2807 is moved along track 2810, while attendant now shown in FIG. 28*c* as 2805 swivels seat 2806 to leftmost position, shown schematically in FIG. 28*e* as 2812.

Figure 29:
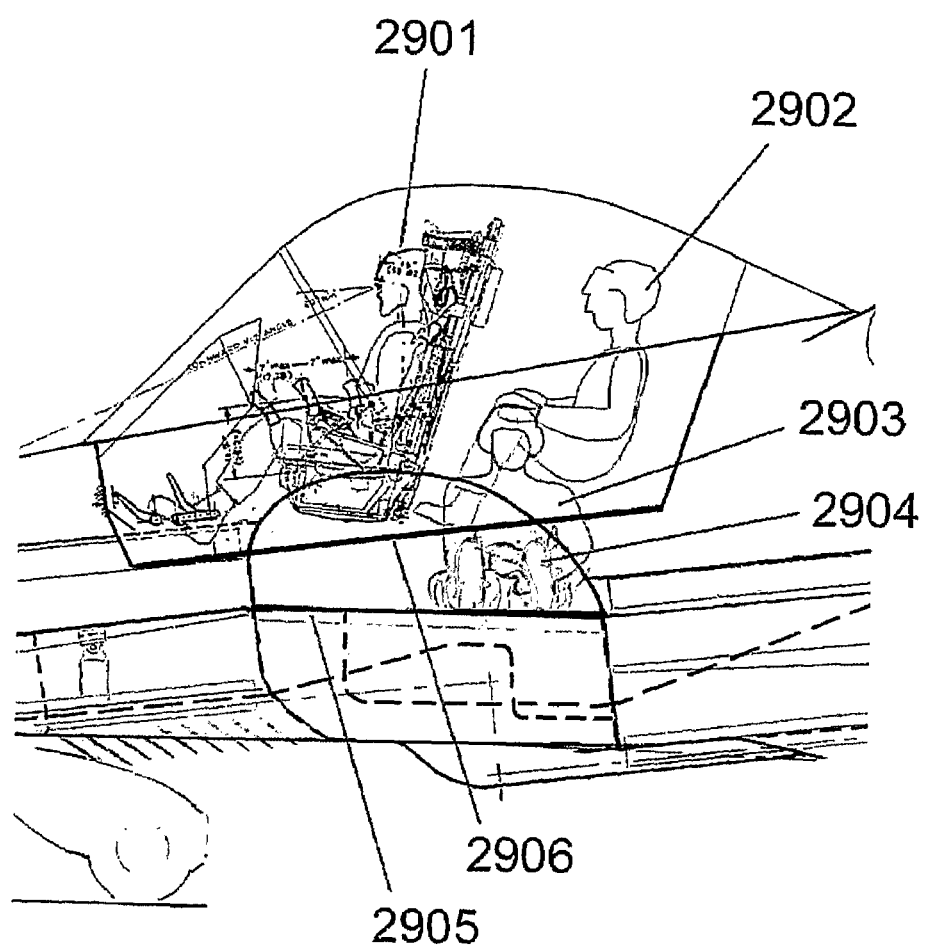
FIG. 29 illustrates in side view some optional additions to the cockpit area of the vehicles described in FIGS. 14-18.

FIG. 29 illustrates in side view various optional additions to the cockpit area of the vehicles described in FIGS. 14-18. The pilot designated as 2901 is shown together with optional room for a crew member or passenger 2902 behind the pilot. Also shown are the medical attendant 2903, and the patient lying in an extreme 'inside cabin' position 2904 on the cabin table 2905. The cockpit floor designated as 2906 may be sealed to separate the pilot's compartment from the cabin.

FIGS. 30*a-d* show a vehicle that is generally similar to that shown in FIG. 18, but which shows alternative internal arrangements for various elements including cabin arrangement geometry to enable carriage of 5 passengers or combatants. FIG. 30*a* is a top view schematically showing the position of each occupant. FIG. 30*b* is a longitudinal cross section showing placement of equipment and passengers inside the vehicle, and FIGS. 30*c* and 30*d* are local lateral sections of the vehicle. A typical passenger or combatant 3002 is shown in FIG. 30*c*. The top of the cabin 3001 is raised above that of FIG. 18 to accommodate passengers or combatants in center section of vehicle. A single main transmission unit (3004) is shown that is an alternative power transmission scheme to that of FIG. 18. Power is transmitted from engine 3003 to main transmission unit 3004. One angled shaft 3005 transmits power to the aft pusher fan 3009, and a second, generally horizontal shaft 3006 transmits power to the aft lift rotor gearbox 3010. The shaft 3006 is housed inside airfoil shaped housing 3008 that also supports mechanically the aft lift rotor gearbox 3010. A center fuselage secondary transmission 3007 is connected to each of the main lift rotor gearboxes 3010, 3011, and also houses attachment for auxiliary equipment.

Figure 31:
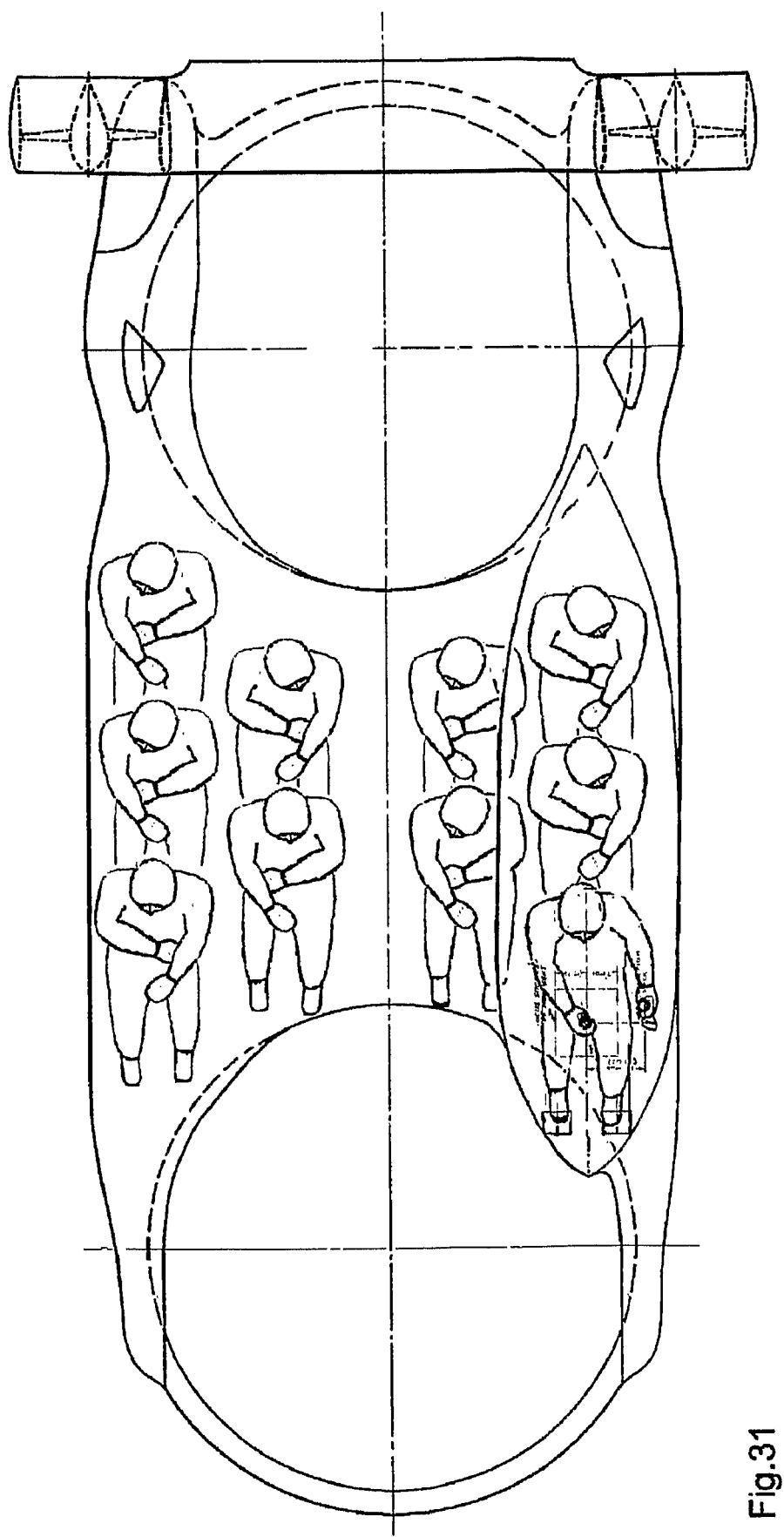
FIG. 31 shows a top view of vehicle generally similar to that shown in FIG. 30a-d, however the fuselage is elongated to provide for 9 passengers or combatants.

FIG. 31 shows a top view of vehicle generally similar to that shown in FIG. 30*a-d*, but where the fuselage is elongated to provide for 9 passengers or combatants.

FIGS. 32*a-g* illustrate means for enabling the external airflow to penetrate the forward facing side 3201 of the forward ducted fan of the vehicles described in FIGS. 1-21 and FIGS. 30-31 while in forward flight. One configuration that may be used to obtain such airflow penetration is shown in FIG. 32*b* and generally also shown at the forward end of FIG. 32*a*. Rows of generally vertical open slots 3204 for enabling throughflow of air are shown, with remaining duct structure including an upper lip 3202 and a lower ring 3205. Airfoil shaped vertical supports 3203 serve to stabilize the structure and provide protection for the fan inside the duct. The slots 3204 remain open at all times. A second configuration for obtaining such airflow penetration is shown in FIG. 32*c* where the whole forward wall of the forward duct is cut to obtain two generally rectangular openings 3206 with an optional center support 3207. An additional option, which is an expansion of the method of FIG. 32*b*, is shown in FIGS. 32*d* and 32*e* where externally actuated rotating valves 3208 are mounted inside each slot 3204. When the vehicle is hovering, the slots are closed by the valves as shown in FIG. 32*e*. When the vehicle is in forward flight and flow of air into the duct is desired, the externally actuated valves 3208 rotate to the 'open' position shown in FIG. 32*d*, where the airflow 3209 is free to flow through the slots. An alternative to the concept of FIGS. 32*d-e*, is shown in FIGS. 32*f-g* where each of the vertical supports 3203 is attached to upper lip 3202 and lower ring 2305 by hinges that enable multiple vertical supports to pivot around multiple vertical axes 3210 and assume the position shown in FIG. 32*g*, where the multiple slots 3204 are closed to the external airflow.

FIGS. 33*a-e* illustrate alternative means for enabling the internal airflow to exit through the walls of the aft ducted fan of the vehicles described in FIGS. 1-21 and FIGS. 30-31, while in forward flight. One configuration for obtaining such airflow exit is shown in FIG. 33*b* and generally also shown at the aft end of the vehicle shown in FIG. 33*a*. Rows of generally vertical open slots 3304 for enabling exit of air are shown, with remaining duct structure including upper lip 3302 and lower ring 3305. Airfoil shaped vertical supports 3303 serve to stabilize the structure and provide protection for the fan inside the duct. The slots 3304 preferably remain open at all times. A second possible option of obtaining such airflow exit is shown in FIG. 33*c* where the whole rear wall of the aft duct is cut to obtain two generally rectangular openings 3306 with an optional center support 3307. An additional option, which is an expansion of the method of FIG. 33*b*, is shown in FIG. 33*d* and FIG. 33*e* where externally actuated rotating valves 3308 are mounted inside each slot 3304. When the vehicle is hovering, the slots are closed by the valves, as shown in FIG. 33*e*. When the vehicle is in forward flight and exit of air through the duct wall is desired, the externally actuated valves 3308 rotate to the 'open' position, as shown in FIG. 33*d*, where the airflow 3309 is free to flow through the slots. An alternative to the concept of FIGS. 33*d-e* is shown in FIGS. 33*f-g* where each of the vertical supports 3203 is attached to upper lip 3202 and lower ring 2305 by hinges that enable multiple vertical supports to pivot around multiple vertical axes 3210 and assume the position shown in FIG. 33*g*, where the multiple slots 3204 are closed to the external airflow.

Figure 34A:
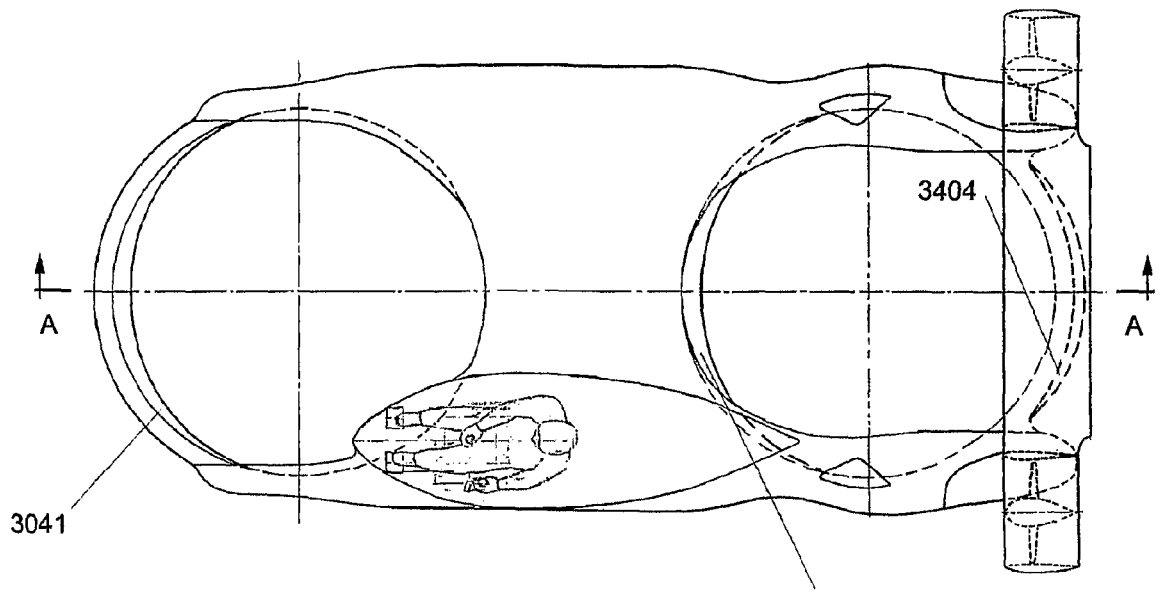
FIG. 34 illustrates means for directing the internal airflow to exit with a rearward velocity component for the purpose of minimizing the momentum drag of the vehicle in forward flight.
Figure 34B:
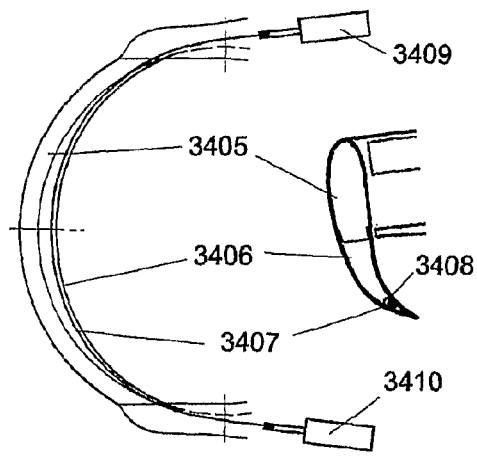

FIGS. 34*a-c* illustrate alternative means for directing the internal airflow to exit with a rearward velocity component for the purpose of minimizing the momentum drag of the vehicle in forward flight. As shown, the lower forward portion of the forward duct 3401 is curved back at an angle that increases progressively along the circle-shaped forward duct wall, reaching a maximum angle at the center section. The curvature may vary from vertical all around the duct, such as at hover, to 30-45 degrees from vertical inclined backwards at center and decreasing progressively to the sides of the duct. In a similar manner, the lower forward center fuselage 3402, the lower aft portion of the center fuselage 3403 and the lower aft portion of the aft duct 3404 are curved back to direct the flow exiting from the ducts to better align with the incoming flow when the vehicle is in forward flight. The above geometrical reshaping of the ducts exits may be fixed (i.e. built into the shape of the ducts) as in FIG. 34a, or alternatively, may be of variable geometry such as flexible lower portion of ducts as shown in FIG. 34b. Various means of obtaining change of geometry to said lower duct portion are available. One option, illustrated in FIG. 34b shows the upper, fixed part of the duct 3405, to which is attached a flexible or segmented lower part 3406. The outer sleeve 3408 of a flexible 'push-pull' cable 3407 is connected to bottom of the flexible or segmented lower part 3406, whereby an actuator 3409, or optionally two actuators shown schematically as 3409 and 3410, mounted inside the fuselage would pull the cable 3407, thereby affecting the geometry of the duct as desired. The lower aft portion of the center fuselage 3404 is moved back in a manner similar to the lower forward portion of the forward duct 3401 as explained, but with the difference that moving the aft duct lower part backwards involves pushing a flexible 'push-pull' cable rather then pulling by the actuator/s from inside the fuselage, as was the case in FIG. 34b.

FIGS. 35a-c illustrate additional alternative means for enabling the external airflow to penetrate the walls of the forward duct and the internal airflow to exit through the walls of the aft ducted fan of the vehicles described in FIGS. 1-21 and FIGS. 30-31, while in forward flight, for the purpose of minimizing the momentum drag of the vehicle. As shown in FIG. 35a, the forward part of the forward duct has an upper section 3501, an opening for incoming airflow 3502 and a lower ring 3506. Similarly, the aft portion of the aft duct has an upper section 3504, an opening for incoming airflow 3505 and a lower ring 3506. Optional center supports 3509, 3510 are provided at the forward and aft ducts respectively for supporting the lower rings 3503 and 3506. FIGS. 35b and 35c show an enlarged cross-section through the forward duct with an optional flow blocker 3507. Flow blocker 3507 is preferably a rigid, curved barrier that slides up into the upper lip when in forward flight, and slides back down to block the flow when in hover.

FIG. 35c shows how the flow blocker 3507 is mechanically lowered, such as by actuators or other means not shown, to engage ring 3506 or other similar means on lower ring to block the external airflow, and preserve the straight cylindrical shape of the ducts down to the duct exits, while the vehicle is in slow flight or hover. A similar arrangement can be applied to the aft end of the aft duct. It is appreciated that flow blocker 3507 can either be one piece for each duct, or divided into two segments, such as where the option of adding vertical supports 3509 and 3510 is used.

Figure 36A:
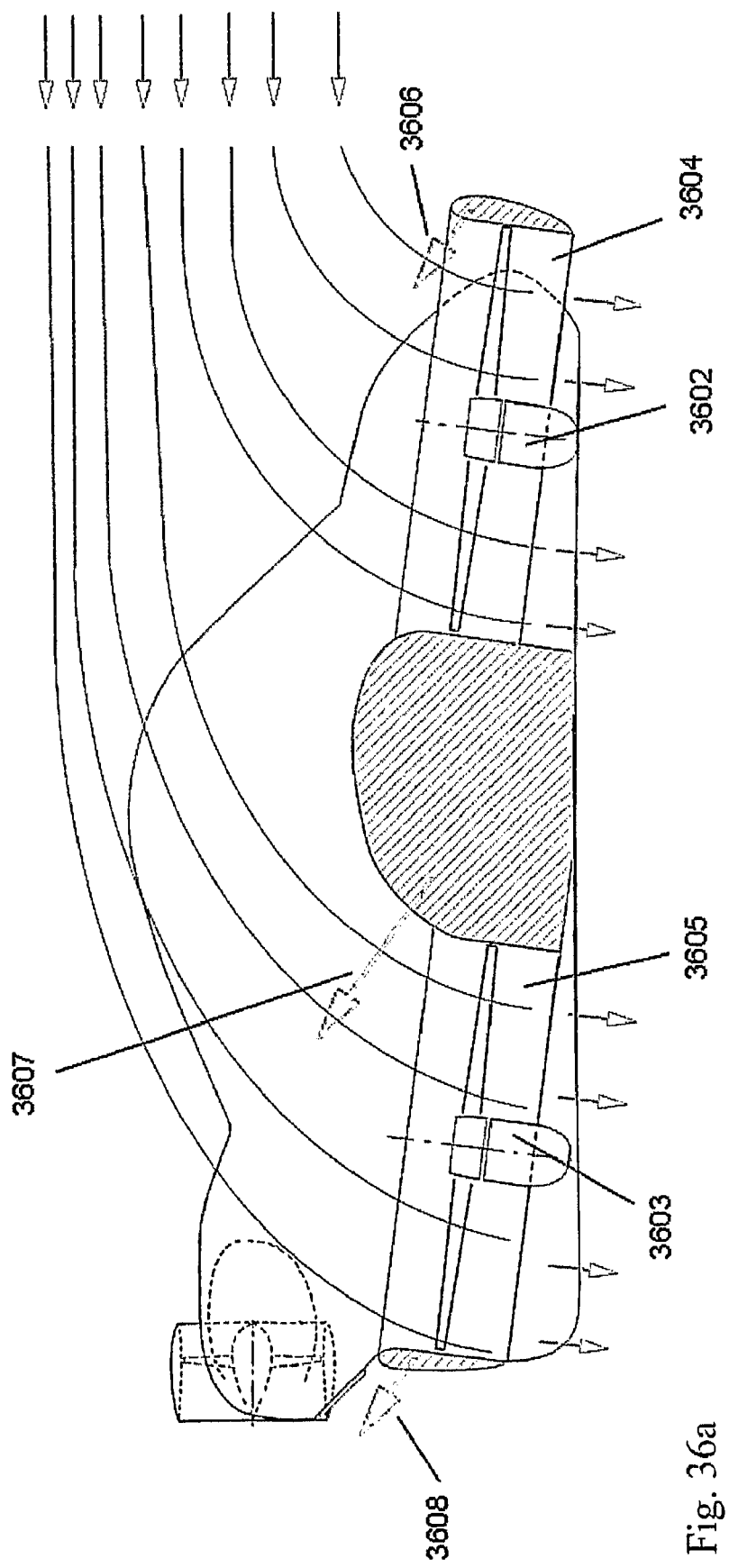
FIGS. 36a-b illustrate the general form of airflow streamlines, with and without provisions for enabling the flow to penetrate through the walls of the forward and aft ducted fans.

FIG. 36a shows in schematic form the airflow streamlines 3601 that are characteristically formed in the vicinity of vehicles such as those described in FIGS. 1-21 and FIGS. 30-31. Due to the dominant effect that the rotors 3602, 3603 and the ducts 3604, 3605 have on the flow, the streamlines leave the vehicle at an angle to the incoming flow. The resulting pressure distribution on the vehicle's surface result in considerable drag forces 3606, 3607, 3608 that are caused by the momentum change of the flow, hence termed 'momentum drag'.

Figure 36B:
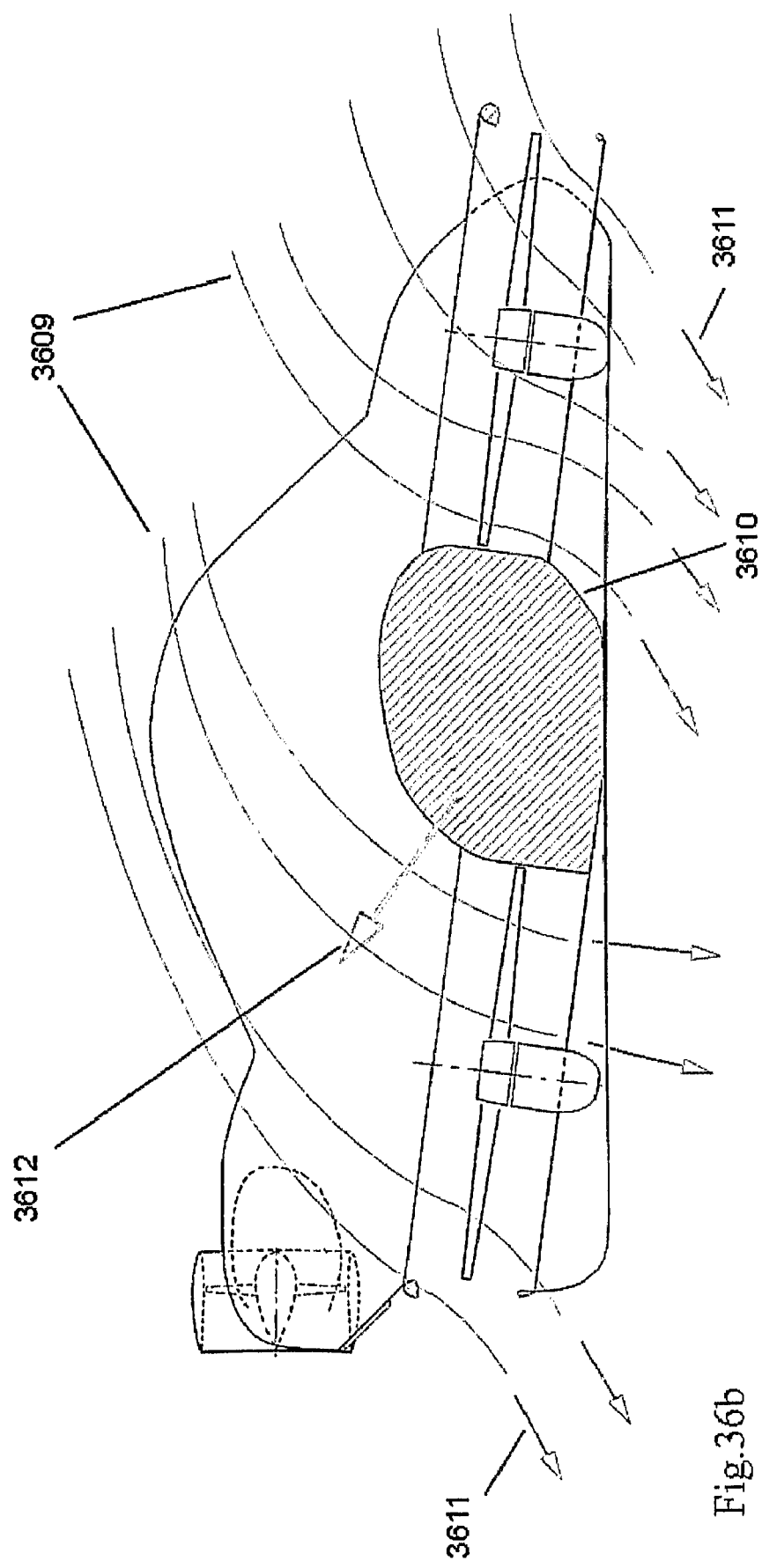

FIG. 36b shows in schematic form the airflow streamlines 3609 that are characteristically formed in the vicinity of vehicles such as those described in FIGS. 1-21 and FIGS. 30-31, however contrary to the flow field of FIG. 36a, where both forward and aft lift creating ducted fans had rigid and sealed boundaries, in FIG. 36b means for enabling the external airflow to penetrate the walls of the forward duct and the internal airflow to exit through the walls of the aft ducted fan are incorporated, for example as described in FIG. 32-FIG. 35. In addition, a curved cutout 3610 is also employed in the center body section, as suggested in 3402 in FIG. 34. as shown, the exiting flow 3611 now assumes a general direction that is similar to the direction it had prior to contacting the vehicle's surface, however, behind the center body section, the flow is still guided downwards, and a momentum drag component 3612 is still present on the center body.

Figure 37A:
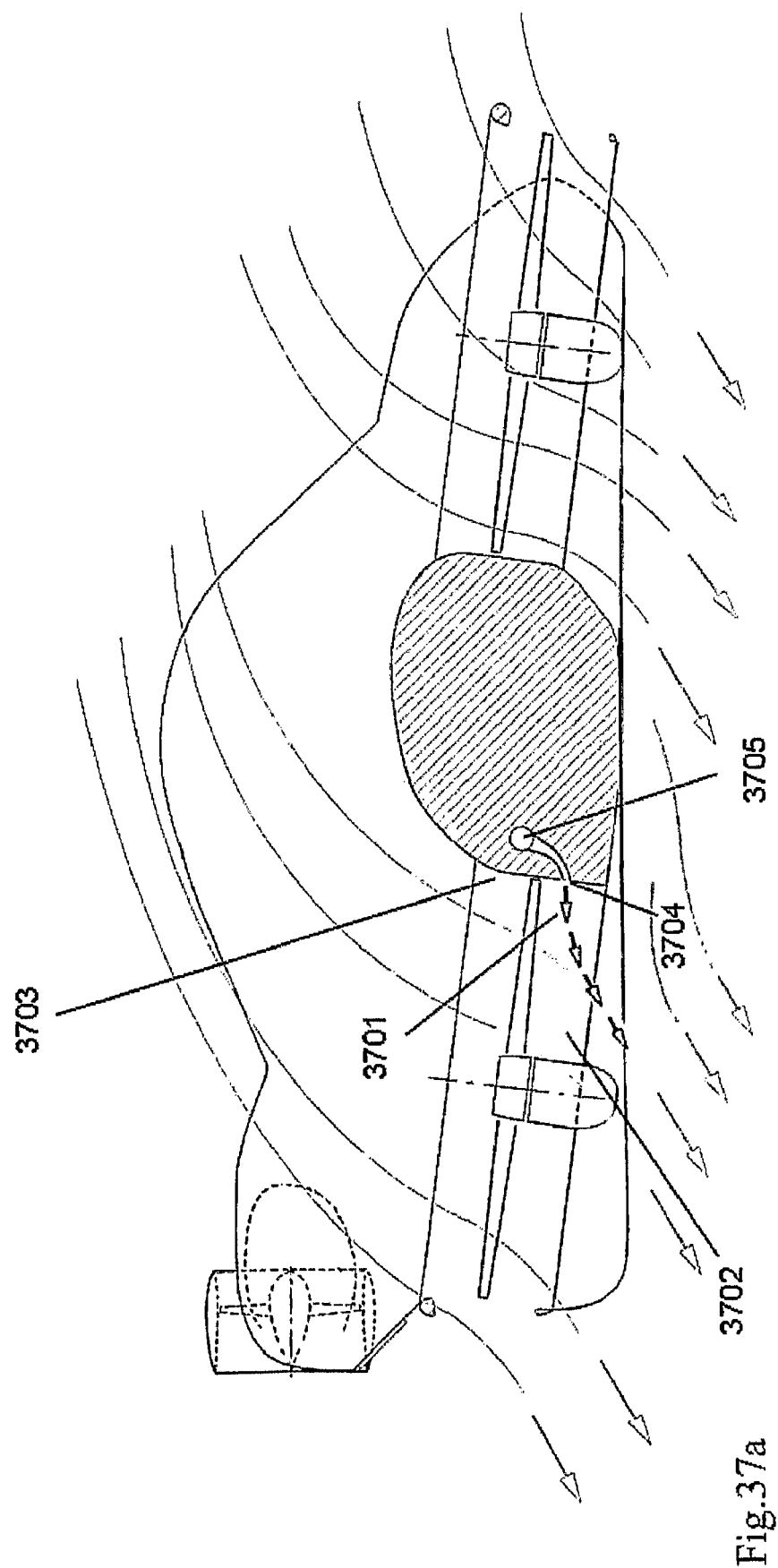
FIGS. 37a-d illustrate optional means for directing the flow exiting the aft duct behind the center fuselage to the rear of the vehicles described in FIGS. 1-21 and FIGS. 30-31, while in forward flight, for the purpose of minimizing the momentum drag of the vehicle.

FIG. 37a shows a cross section of the vehicle with an alternative means of re-directing the exiting flow on the center body side 3703 of the aft ducted fan. Such means is achieved by blowing auxiliary air 3701 backwards into the aft duct 3702 through slots 3704 arranged circumferentially on generally the forward half of the aft duct wall. The auxiliary air 3701 causes the flow inside aft duct 3702 to separate from center body side 3703 and exit the duct at a direction similar to the direction it had prior to contacting the vehicle's surface. Sources for auxiliary air are not shown in FIG. 37a, but common to turbine powered vehicles may be air provided by the turbine engine's compressors, and ducted to the slots 3704 through air ducts 3705 inside the vehicle's body. It should be emphasized that, while generally facing horizontally backwards, and while located between the plane of the rotor and the exit from the duct, the auxiliary air flow 3701 could be directed upward or downward, and slots 3704 could vary in geometry and vertical position along center body side 3703, as deemed necessary for creating the minimal amount of momentum drag on said center body.

Figure 37B:
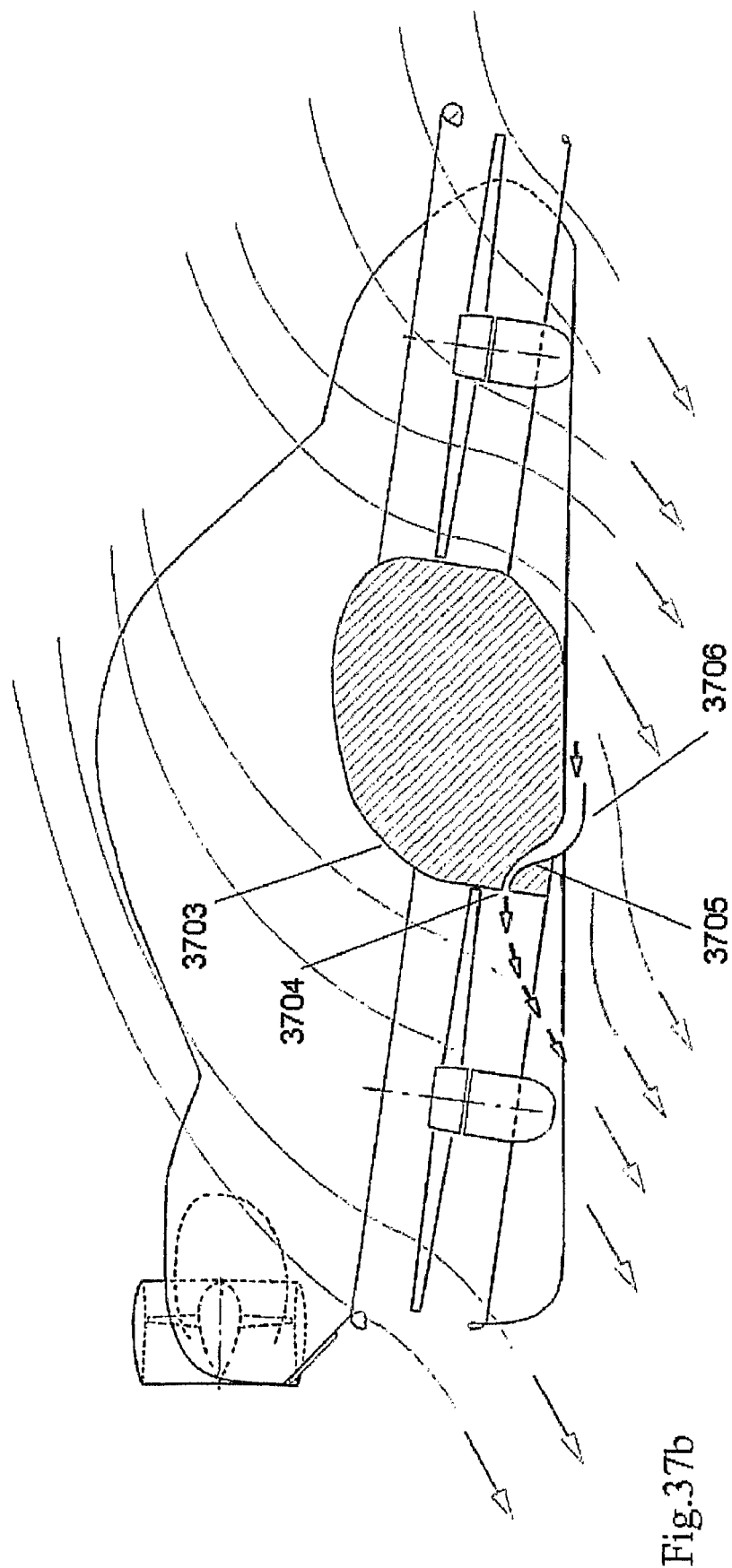

FIG. 37b shows an arrangement similar to FIG. 37a, however the source of auxiliary air scoops generally shown as 3706, either protruding from the surface of the vehicle as illustrated by 3706 or 'flush' with the surface as sometimes employed in air vehicle design. The scoops 3706 are connected to air ducts 3705 transferring the air captured by said scoops to the slots 3704. In should be added that such air scoops 3706, air ducts 3705 and slots 3704 could optionally employ varying cross-sectional areas such as to cause the air to accelerate and exit at higher velocity through slots 3704 than the free stream velocity it entered through scoops 3706. This increase in airspeed would be beneficial to facilitate desired flow conditions when air coming out of slots 3704 combines with relatively high speed air flowing inside ducted fan enclosure, especially in the vicinity of the center body side 3703.

Figure 37C:
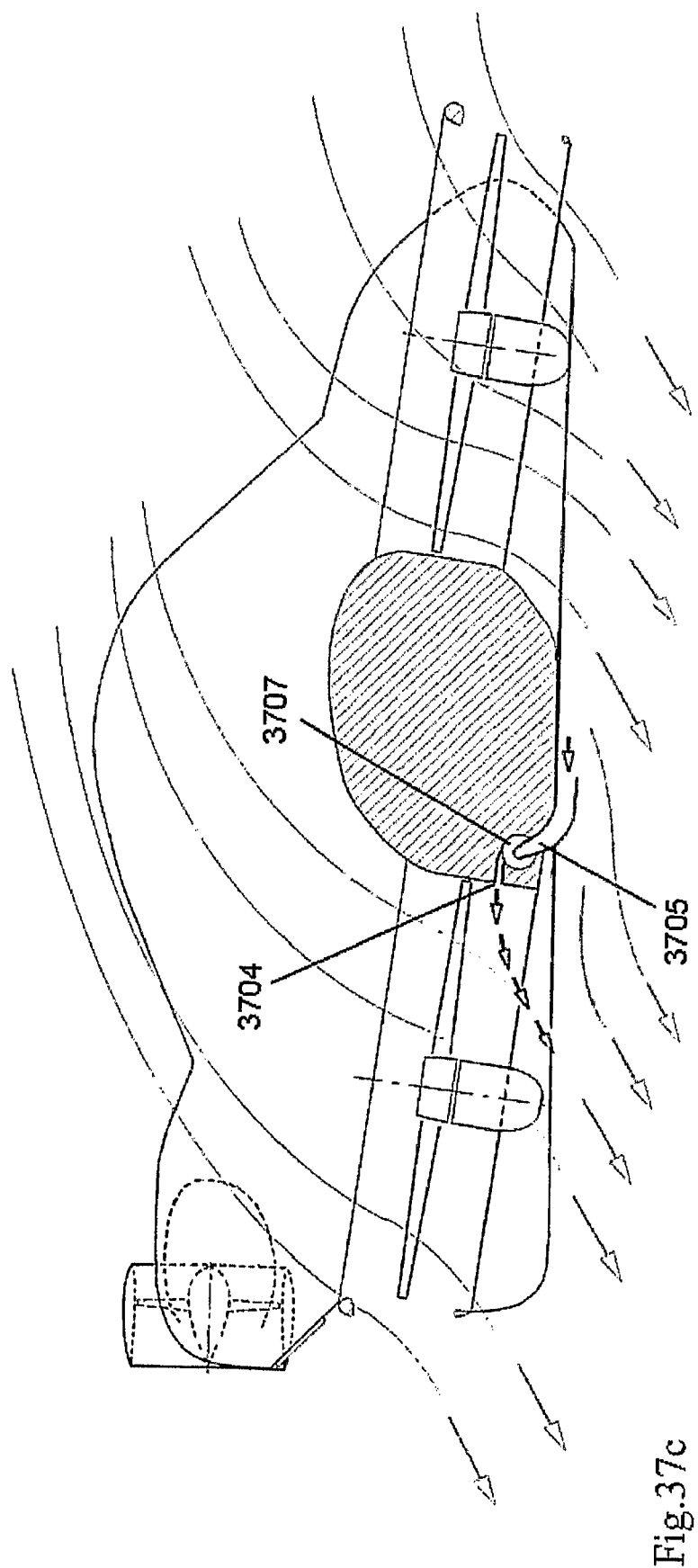

FIG. 37c shows an arrangement similar to FIG. 37b, however auxiliary air pumps or compressors generally shown as 3707 are added in line with air ducts 3705 to further enhance air blowing through slots 3704 into the aft ducted fan.

Figure 37D:
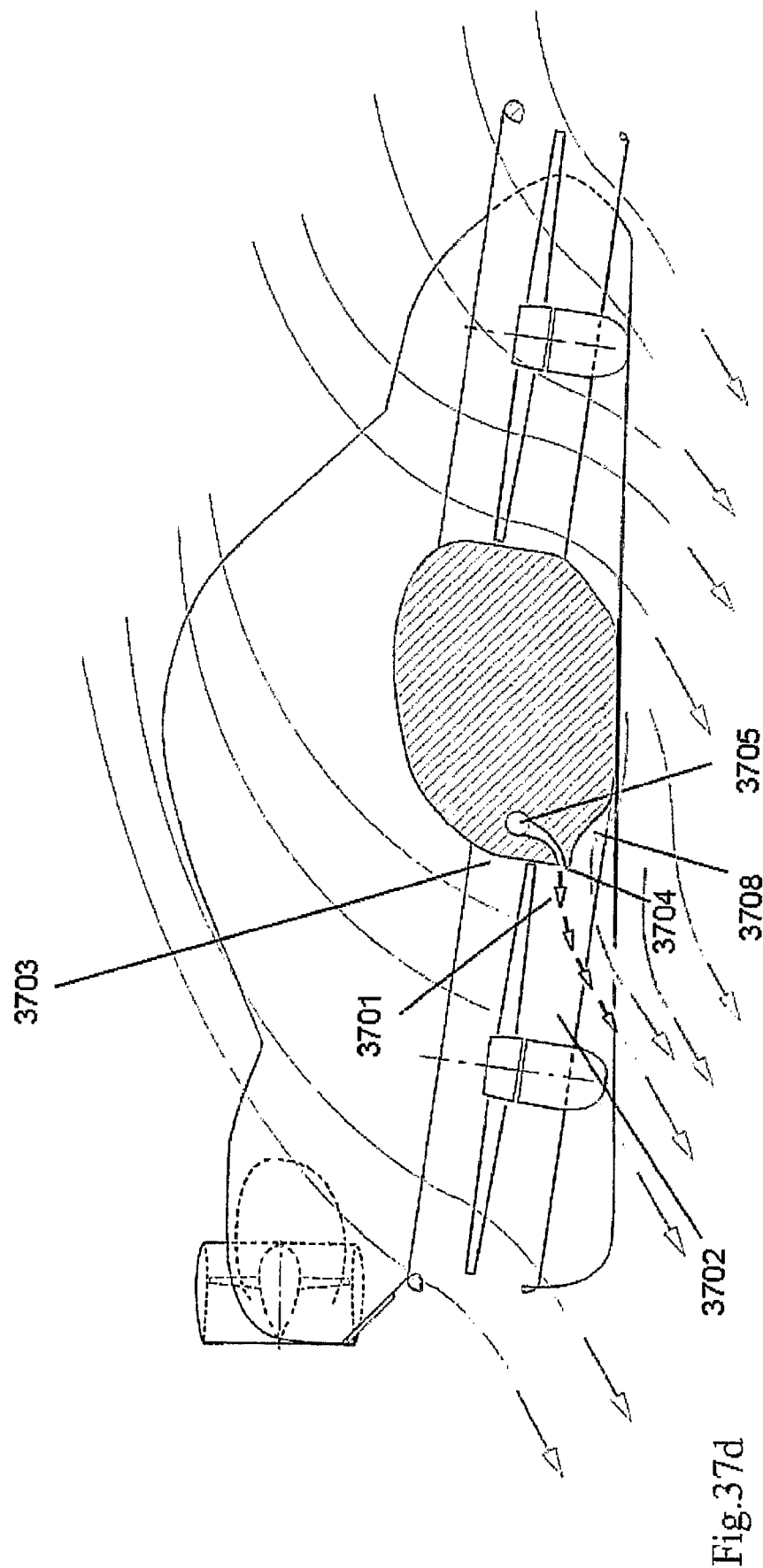
Figure 38A:
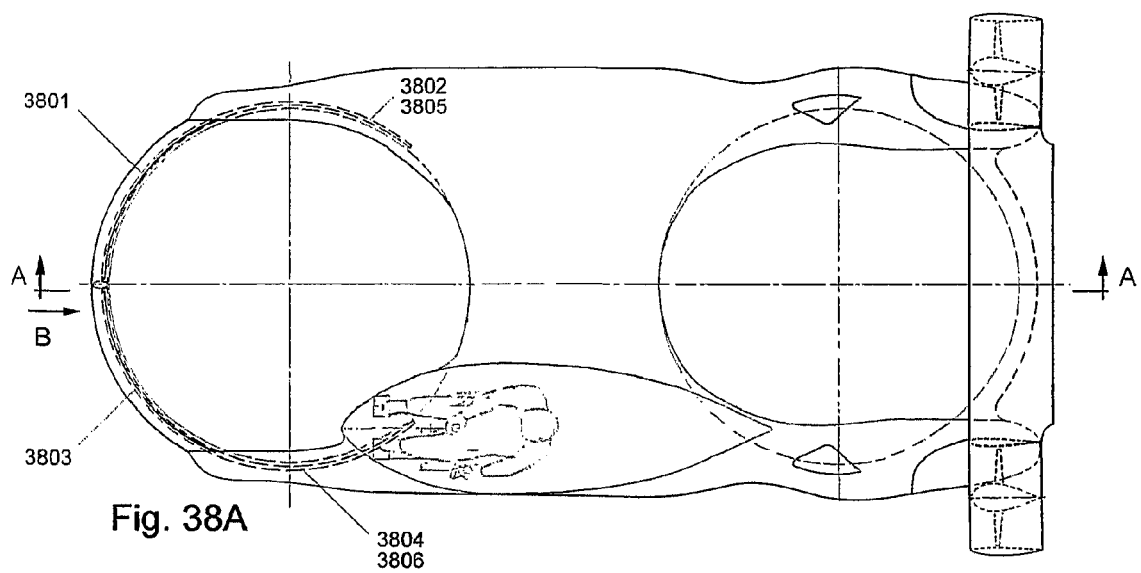
FIGS. 38A-E illustrates an alternative means to that shown in FIGS. 35a-c for enabling the external airflow to penetrate the walls of the ducted fans of the vehicles described in FIGS. 1-21 and FIGS. 30-31 while in forward flight, for the purpose of minimizing the momentum drag of the vehicle.
Figure 38B:
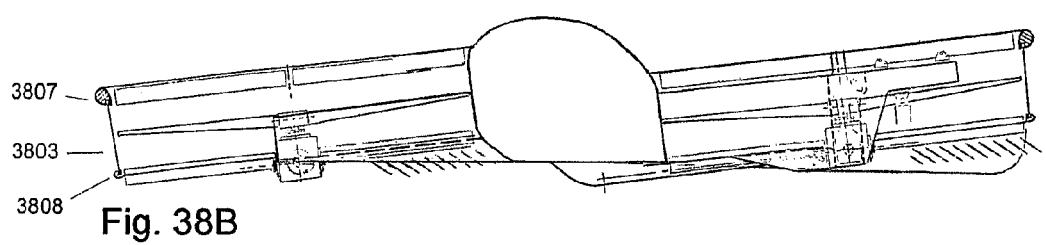
Figure 38C:
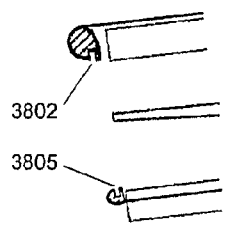
Figure 38D:
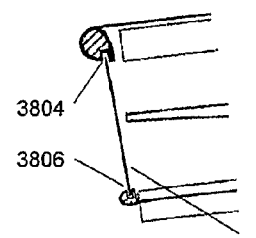
Figure 38E:
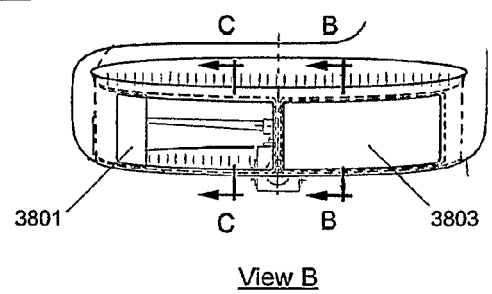

FIG. 37d shows an arrangement similar to FIG. 37a, however in addition to the auxiliary air injected into the duct through slots 3704, a re-shaping of the bottom of the fuselage shown schematically in 3708 is done, in order to enhance mixture of free stream air flowing below the vehicle into the new streamlines formed from the point of air injection into the duct. The re-shaping of the bottom of the fuselage as shown, is also applicable for FIGS. 37b-37c. It should be mentioned that re-shaping of the bottom fuselage as shown in 3708 may in itself achieve sufficient reduction of the momentum drag, so that such re-shaping means as shown in 3708 may be employed independently in said duct, without reverting to any auxiliary air blowing at all.

FIGS. 38A-E illustrate means, alternative to those of FIGS. 35a-c for enabling the external airflow to penetrate the walls of the ducted fan of the vehicles described in FIGS. 1-21 and FIGS. 30-31 while in forward flight. As shown in FIGS. 38A-E, the forward part of the forward duct features two rigid, generally circular curved barriers 3801 and 3803 that move inside slides 3802, 3805 and 3804,3806 respectively. When in their 'closed' position, as shown for barrier 3803 in View B and section B-B, the barriers prevent air from entering the duct. When moving to an 'open' position such as shown for illustration purposes for an intermediate position of barrier 3801, the barriers slide back along their upper and lower slides that are formed into upper duct rings 3802,3804 and lower duct rings 3805,3806 respectively, extending back as independent upper and lower slides attached to the outer sides of the duct, inside the vehicle, as clearly shown in the top view of FIG. 38A. The barriers can hence move to a 'full aft' position where the duct wall is open for air to penetrate into the duct, when in forward flight. The barriers 3801,3803 would then slide back forward to block the flow when in hover. A similar arrangement can be applied to the aft end of the aft duct.

While the invention has been described with respect to several preferred embodiments, it will be appreciated that these are set forth merely for purposes of example, and that many other variations, modifications and applications of the invention will be apparent.

What is claimed is:

1. A ducted fan vehicle comprising:
   a forward duct and an aft duct disposed in a fuselage and defining a center body between said ducts;
   at least two lift-producing propellers, each disposed in one of said ducts; and
   means for introducing auxiliary airflow into at least said aft duct to cause an airflow portion close to said center body inside said aft duct to separate from said center body.

2. A ducted fan vehicle according to claim 1 and further comprising at least one slot formed in a forward-facing wall of said aft duct.

3. A ducted fan vehicle according to claim 2 wherein said at least one slot comprises a plurality of said slots arranged circumferentially along said forward-facing wall of said aft duct.

4. A ducted fan vehicle according to claim 1 wherein said means is operative to cause said air flow inside said aft duct to exit said duct at a direction that is generally similar to the direction it had prior to contacting the vehicle's surface.

5. A ducted fan vehicle according to claim 1 wherein said means for introducing auxiliary air flow is a turbine engine compressor of said vehicle.

6. A ducted fan vehicle according to claim 1 wherein said means for introducing auxiliary air flow is either of an air pump and a compressor.

7. A ducted fan vehicle according to claim 1 wherein said means for introducing auxiliary air flow is at least one air scoop connected to said aft duct.

8. A ducted fan vehicle according to claim 2 wherein said at least one slot is located between a plane containing said lift-producing propellers and an outlet end of said aft duct.

9. A ducted fan vehicle according to claim 3 wherein said plurality of slots are located between a plane containing said lift-producing propellers and an outlet end of said aft duct.

10. A ducted fan vehicle according to claim 1 wherein said means for introducing auxiliary air flow is at least one air scoop connected to said aft duct and wherein said at least one air scoop can employ varying cross sectional areas such as to cause related air flow to accelerate and exit said aft duct at higher velocity than the free stream velocity of said air when entering said at least one scoop.

11. A ducted fan vehicle according to claim 1 wherein an aperture is formed in a rearward-facing wall of said aft duct.

12. A ducted fan vehicle according to claim 1 wherein an aperture is formed in a forward-facing wall of said forward duct.

13. A ducted fan vehicle according to claim 1 wherein a first aperture is formed in a rearward-facing wall of said aft duct, and a second aperture is formed in a forward-facing wall of said forward duct.

14. A ducted fan vehicle according to claim 1 wherein the bottom of said fuselage is concavely curved forward of said aft duct.

15. A ducted fan vehicle according to claim 1 and further comprising a curved cutout employed by the lower forward facing body section of said vehicle and configured to affect air flow thereat to assume a general direction that is similar to the direction it had prior to contacting said forward facing body section.

16. A VTOL vehicle comprising:
    a fuselage defining a center body with lower part reshaped to affect airflow in favor of enhancing forward flight by reducing momentum drag; and
    at least one lift-producing propeller disposed in an open-ended duct next to the center body, said duct comprising a duct wall having at least one aperture therein, and a curved barrier enclosing at least portion of said propeller, said curved barrier moveable between open and closed position to thereby control airflow through said aperture into said open-ended duct.

17. A vehicle according to claim 16 wherein said at least one barrier is moveable along curved slides.

* * * * *